(12) United States Patent
Badic et al.

(10) Patent No.: US 11,516,803 B2
(45) Date of Patent: Nov. 29, 2022

(54) METHODS AND DEVICES FOR DEVICE-TO-DEVICE COMMUNICATIONS

(71) Applicant: Intel Corporation, Santa Clara, CA (US)

(72) Inventors: Biljana Badic, Munich (DE); Nuno Manuel Kiilerich Pratas, Gistrup (DK); Jan Ellenbeck, Gruenwald (DE); Christian Drewes, Germering (DE); Thomas Hans-Joerg Reichelmeir, Aschheim (DE); Assi Jakoby, Raanana (IL); Cormac Conroy, Palo Alto, CA (US); Maria Fresia, Munich (DE); Norman Goris, Dortmund (DE); Markus Dominik Mueck, Unterhaching (DE); Giuseppe Patane, Munich (DE); Itzik Shahar, Kadima (IL); Shimon Solodkin, Beer Sheva (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/131,837

(22) Filed: Dec. 23, 2020

(65) Prior Publication Data
US 2021/0120555 A1   Apr. 22, 2021

Related U.S. Application Data

(63) Continuation of application No. PCT/EP2019/080101, filed on Nov. 4, 2019.

(30) Foreign Application Priority Data

Dec. 5, 2018   (EP) .................... 18 210 435

(51) Int. Cl.
*H04W 72/08* (2009.01)
*H04W 72/12* (2009.01)
*H04W 72/04* (2009.01)

(52) U.S. Cl.
CPC ..... *H04W 72/0453* (2013.01); *H04W 72/082* (2013.01); *H04W 72/12* (2013.01)

(58) Field of Classification Search
CPC .................... H04W 72/0453; H04W 72/12; H04W 72/082
(Continued)

(56) References Cited

U.S. PATENT DOCUMENTS

| 2014/0133349 | A1* | 5/2014 | Ninan ............. H04L 41/12 370/254 |
| 2016/0100433 | A1* | 4/2016 | Vajapeyam ........ H04B 17/327 370/329 |
| 2016/0143072 | A1 | 5/2016 | Kondabattini et al. |

FOREIGN PATENT DOCUMENTS

| WO | WO-2018093327 A1 * | 5/2018 | ............ H04L 1/00 |
| WO | 2018122571 A1 | 7/2018 | |

OTHER PUBLICATIONS

International search report issued for corresponding PCT patent application PCT/EP2019/080101 dated Feb. 18, 2020, 14 pages (for informational purpose only).

(Continued)

*Primary Examiner* — Angel T Brockman
(74) *Attorney, Agent, or Firm* — Viering, Jentschura & Partner mbB

(57) ABSTRACT

Methods and devices configured to perform wireless communications, the methods and devices configured to monitor a frequency band for one or more other Radio Access Technologies (RATs); determine one or more periods of a reduced interference with the one or more other RATs in one or more frequencies of the monitored frequency band; and communicate a first signal during the one or more periods in
(Continued)

the more or more frequencies, and communicate a second signal in the frequency band based on the communication of the first signal.

20 Claims, 61 Drawing Sheets

(58) Field of Classification Search
USPC .......................................................... 370/329
See application file for complete search history.

(56) References Cited

OTHER PUBLICATIONS

European search report issued for corresponding European patent application EP 18 210 435.6 dated Jun. 7, 2019, 9 pages (for informational purpose only).

* cited by examiner

FIG 14
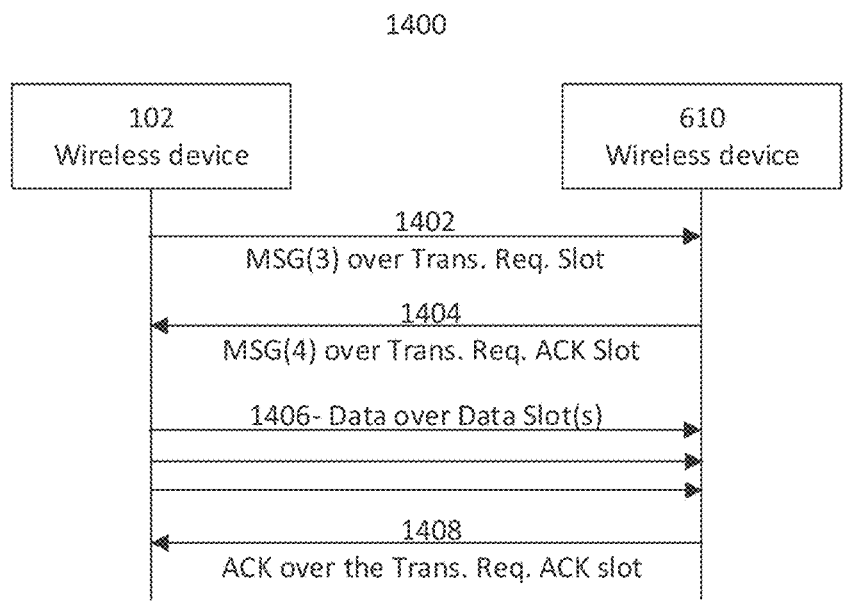
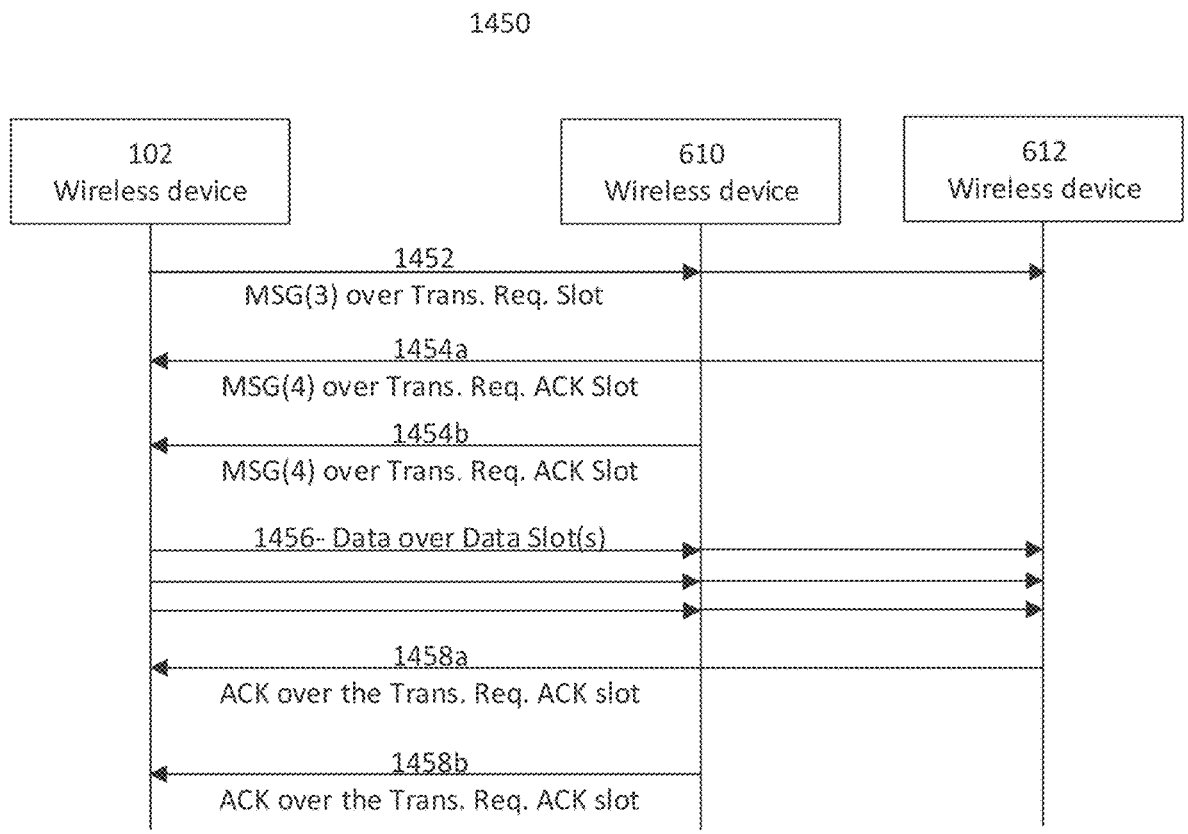

FIG 17
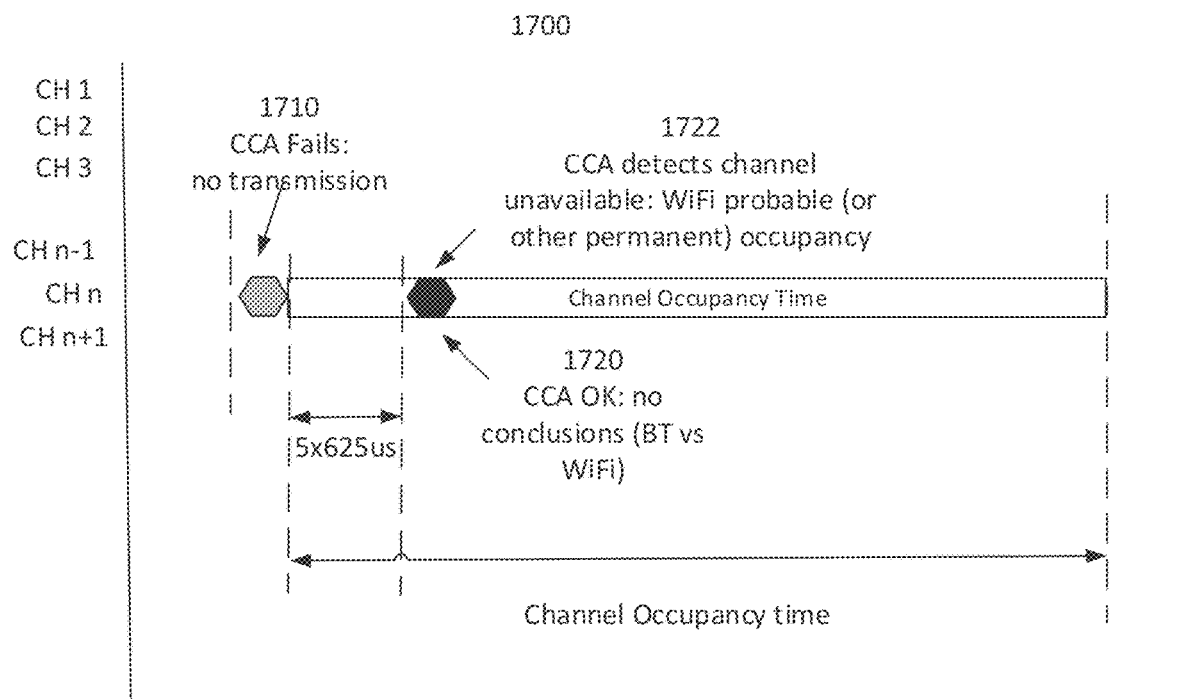
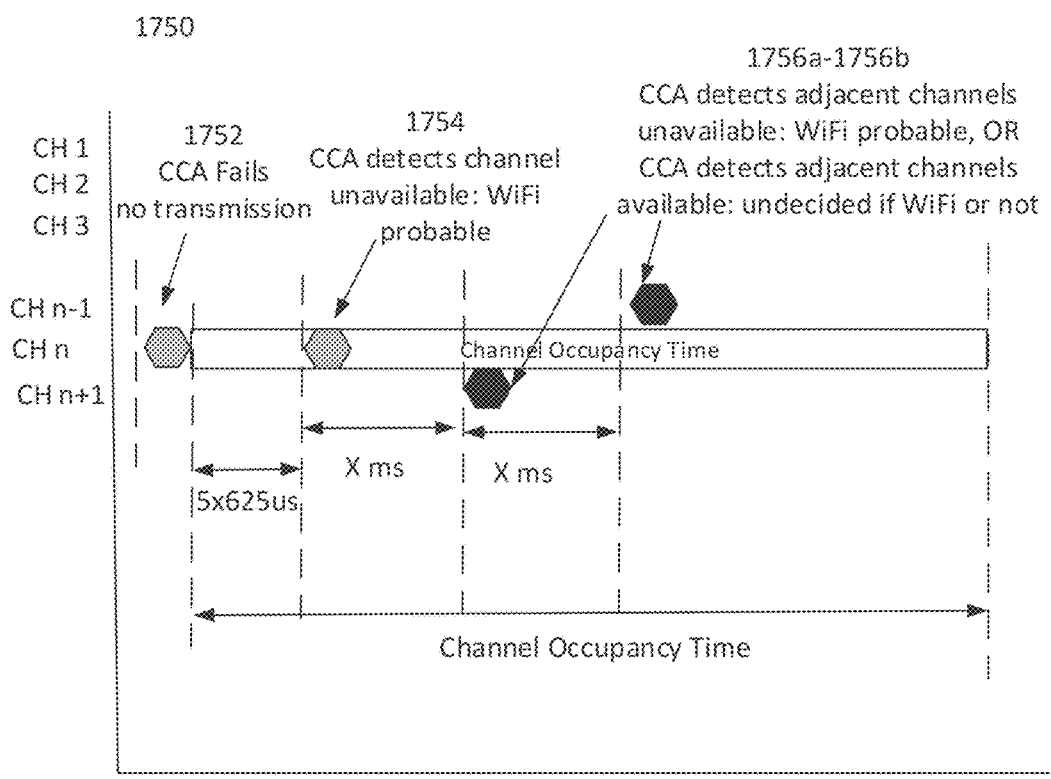

Monitoring a frequency band for one or more other Radio Access Technologies (RATs) — 1782

Determining one or more periods of a reduced interference with the one or more other RATs in one or more frequencies of the monitored frequency band — 1784

Communicating a first signal during the one or more periods in the more or more frequencies, and communicating a second signal in the frequency band based on the communication of the first signal — 1786

FIG 18
1800
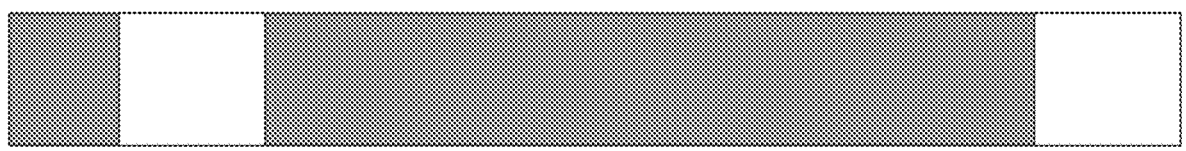
1850
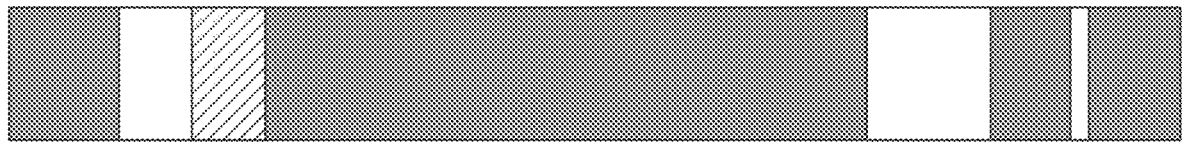
 = High priority
 = Low priority FIG 21
2100
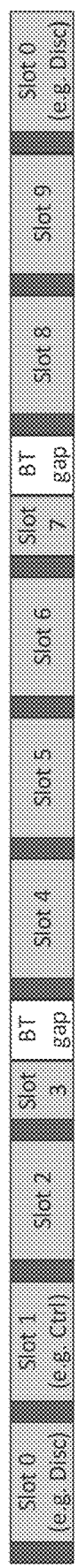
2150

Determining a first resource requirement needed to communicate via a first Radio Access Technologies (RAT) and a second resource requirement needed to communicate via a second RAT, wherein the first RAT has a higher priority to a resource set than the second RAT
2352

Allocating a first subset of the resource set to the first RAT based on the first resource requirement and a second subset of the resource set to the second RAT based on the second resource requirement, wherein the first subset and the second subset are aligned to minimize interruptions in communications of the second RAT due to the first RAT
2354

FIG 27
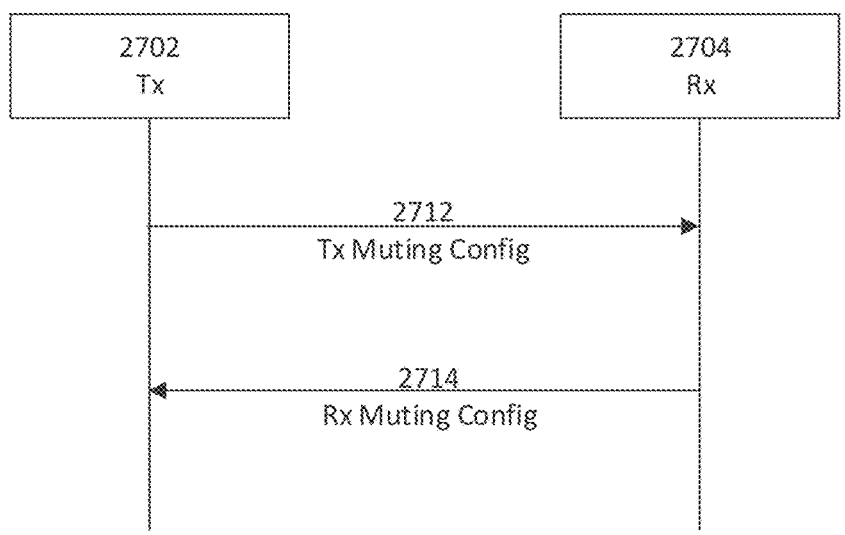
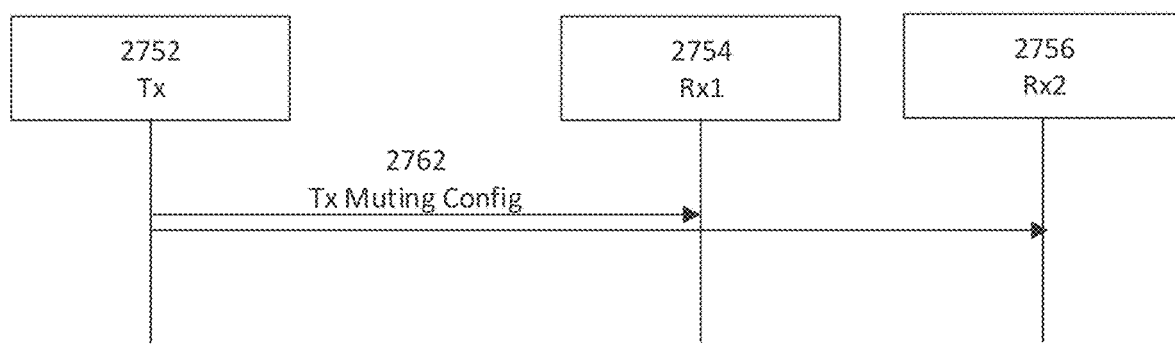

| Slot 0 (Disc) | Slot 1 (Data)* | Slot 2 (Ctrl) | Slot 3 (Data)* | Slot 4 (Ctrl) | Slot 5 (Data) | Slot 6 (Data) | Slot 7 (Data) | Slot 8 (Data) | Slot 9 (Data) |

1 frame, 10 slots

2850

Frame 1: Slot 0 (Disc) | Slot 1 (Data)* | Slot 2 (Ctrl) | Slot 3 (Data)* | Slot 4 (Ctrl) | Slot 5 (Data) | Slot 6 (Data) | Slot 7 (Data) | Slot 8 (Data) | Slot 9 (Data)

Data Slots Muted

Frame 2: Slot 0 (Disc) | Slot 1 (Data)* | Slot 2 (Ctrl) | Slot 3 (Data)* | Slot 4 (Ctrl) | Slot 5 (Data) | Slot 6 (Data) | Slot 7 (Data) | Slot 8 (Data) | Slot 9 (Data)

Data Slots Not Muted

|   | A | B | C | D |
|---|---|---|---|---|
| A |   | 2 | 3 | 8 |
| B |   |   |   |   |
| C |   |   |   |   |
| D |   |   |   |   |

|   | A | B | C | D |
|---|---|---|---|---|
| A |   | 2 | 3 | 8 |
| B | 5 |   | 1 | 3 |
| C | 1 | 4 |   | 1 |
| D | 4 | 2 | 4 |   |

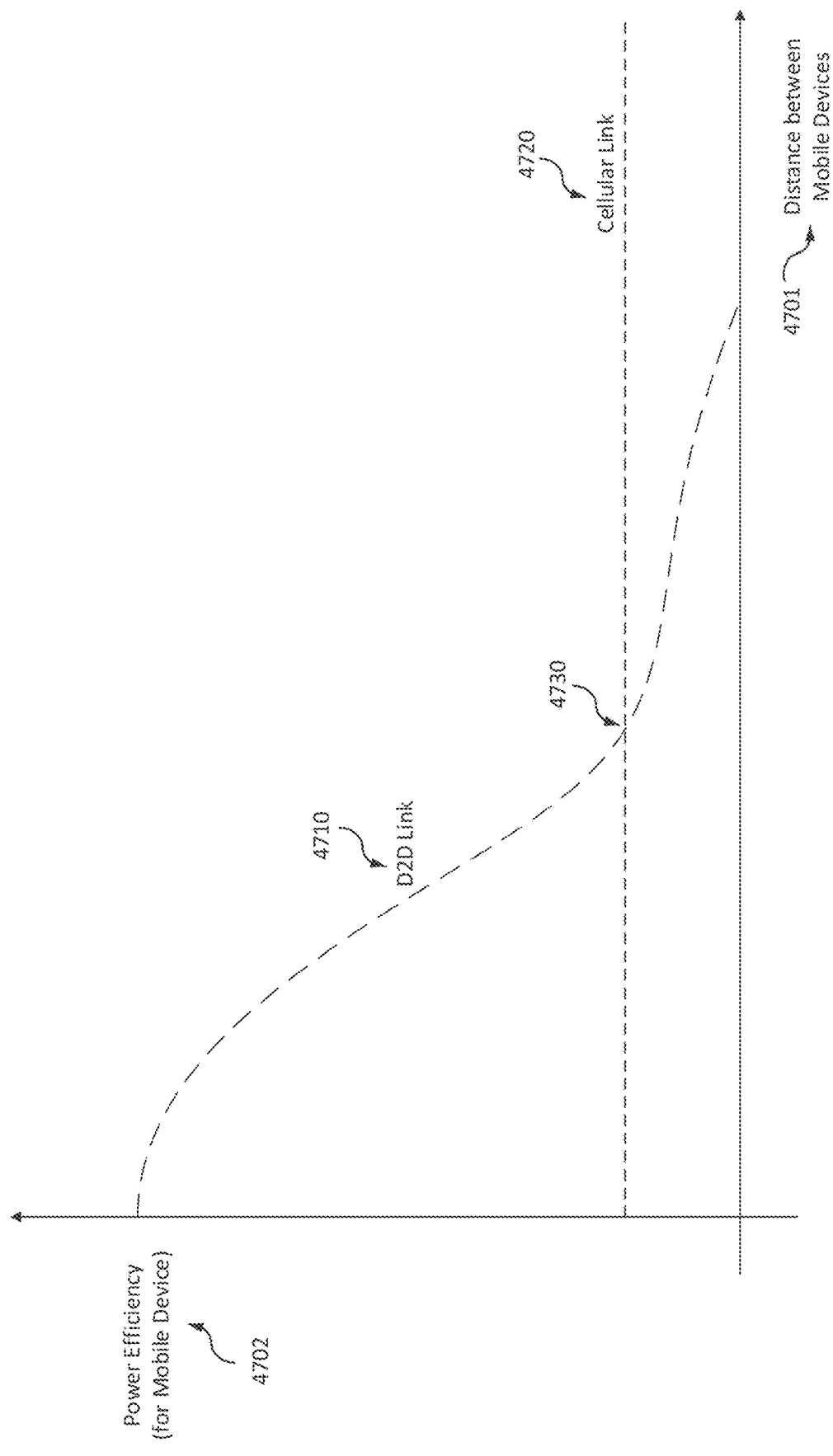

METHODS AND DEVICES FOR DEVICE-TO-DEVICE COMMUNICATIONS

CROSS REFERENCE TO RELATED APPLICATIONS

This application is a continuation of PCT Application Number PCT/EP2019/080101 filed on Nov. 4, 2019, which claims priority to European Application Number 18210435.6 filed on Dec. 5, 2018, the contents of which are both herein incorporated by reference in their entirety.

TECHNICAL FIELD

Various aspects relate generally to device-to-device communications and related methods and devices.

BACKGROUND

Various communication networks use device-to-device (D2D) communications to enable devices to communicate directly with each other. The devices may therefore establish direct communication links with each other and use these links to transfer data between each other.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 14 shows MSCs according to some aspects;

FIG. 17 shows exemplary diagrams illustrating the detection of other systems according to some aspects;

FIG. 17A shows a flowchart illustrating a method for a communication device to perform wireless communication according to some aspects;

FIG. 18 shows diagrams illustrating the reservation of resources for global time alignment between different technologies according to some aspects;

FIG. 21 shows frame structures for coexistence at the frame level according to some aspects;

FIG. 23A shows a flowchart illustrating a method for a communication device to perform wireless communications according to some aspects;

FIG. 27 shows MSCs illustrating signaling exchanges for communicating muting configurations in unicast communications and broadcast/multicast configurations, respectively, according to some aspects;

FIG. 28 shows frame structures illustrating the distribution of control and data slots across a frame in D2D communications according to some aspects;

FIGS. 43A and 43B show an exemplary chart of routing costs for communicating in a mesh network according to some aspects;

FIG. 47 shows a graph illustrating a comparison of power efficiency between cellular and D2D wireless links over distance between wireless devices within a heterogeneous framework according to aspects;

DESCRIPTION

Figure 1:
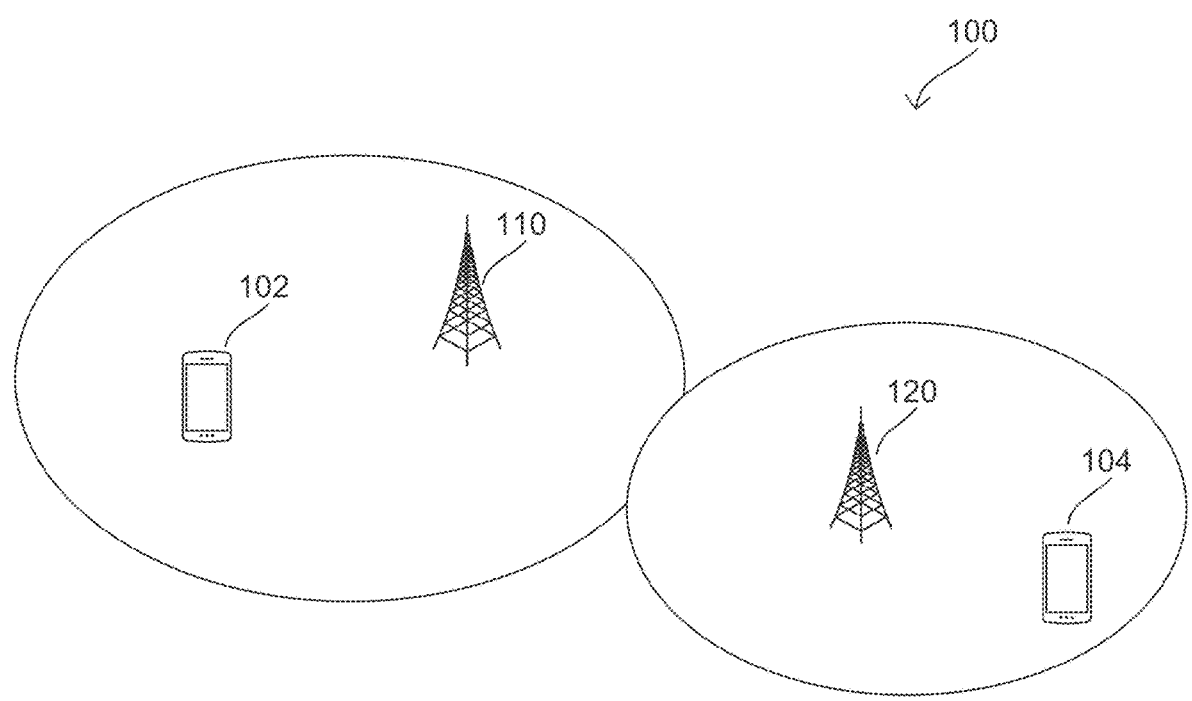
FIG. 1 shows exemplary radio communication network according to some aspects.

The following detailed description refers to the accompanying drawings that show, by way of illustration, specific details and aspects of aspects in which the disclosure may be practiced.

The word "exemplary" is used herein to mean "serving as an example, instance, or illustration." The words "plurality" and "multiple" in the description and claims refer to a quantity greater than one. The terms "group," "set", "sequence," and the like refer to a quantity equal to or greater than one. Any term expressed in plural form that does not expressly state "plurality" or "multiple" similarly refers to a quantity equal to or greater than one. The term "lesser subset" refers to a subset of a set that contains less than all elements of the set. Any vector and/or matrix notation utilized herein is exemplary in nature and is employed for purposes of explanation. Aspects of this disclosure described with vector and/or matrix notation are not limited to being implemented with vectors and/or matrices and the associated processes and computations may be performed in an equivalent manner with sets or sequences of data or other information.

As used herein, "memory" are understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

The term "wireless device" utilized herein refers to user-side devices (both portable and fixed) that can connect to a core network and/or external data networks via a radio access network. "Wireless device" can include any mobile or immobile wireless communication device, including User Equipments (UEs), Mobile Stations (MSs), Stations (STAs), terminal devices, cellular phones, tablets, laptops, personal computers, wearables, multimedia playback and other handheld or body-mounted electronic devices, consumer/home/office/commercial appliances, vehicles, and any other electronic device capable of user-side wireless communications.

The term "network access node" as utilized herein refers to a network-side device that provides a radio access network with which wireless devices can connect and exchange information with a core network and/or external data networks through the network access node. "Network access nodes" can include any type of base station or access point, including macro base stations, micro base stations, NodeBs, evolved NodeBs (eNBs), gNodeBs, Home base stations, Remote Radio Heads (RRHs), relay points, Wi-Fi/WLAN Access Points (APs), Bluetooth master devices, DSRC RSUs, wireless devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax), 5G New Radio (NR), for example, and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as radio frequency (RF) transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

Figure 2:
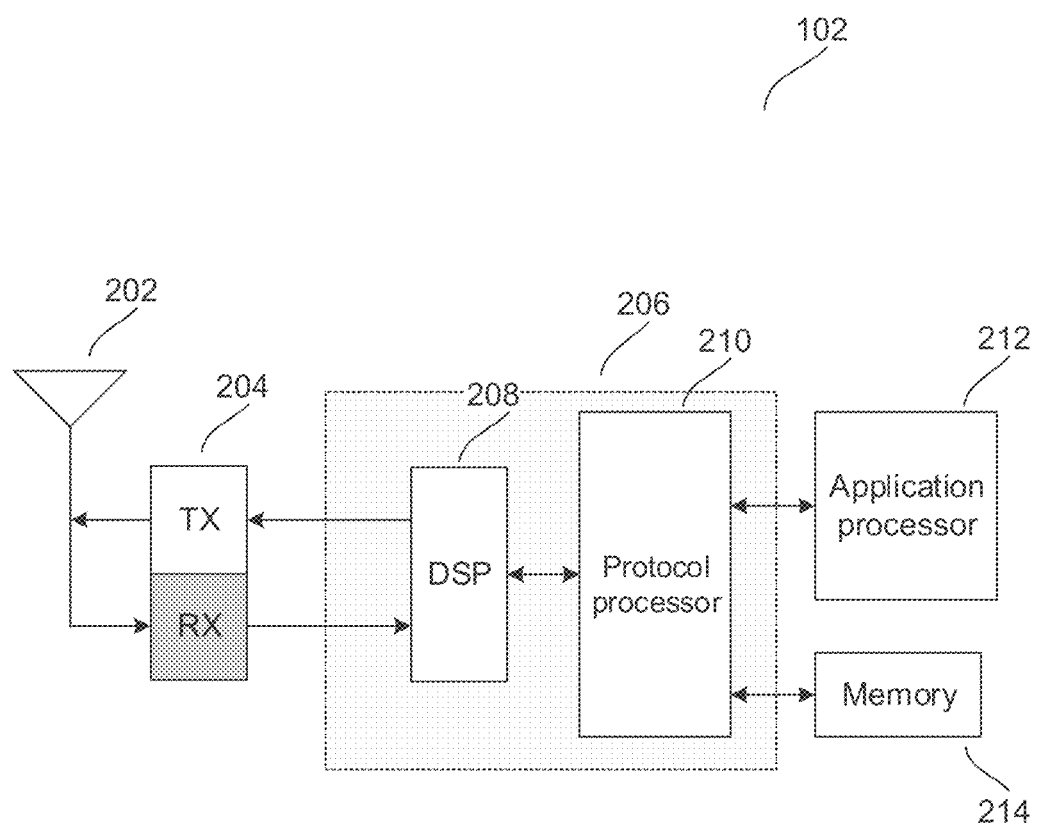
FIG. 2 shows an internal configuration of wireless device according to some aspects.

FIGS. 1 and 2 depict a general network and device architecture for wireless communications. In particular, FIG. 1 shows exemplary radio communication network 100 according to some aspects, which may include wireless devices 102 and 104 and network access nodes 110 and 120. Radio communication network 100 may communicate with wireless devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mmWave, etc.), these examples are demonstrative and may therefore be readily applied to any other type or configuration of radio access network. The number of network access nodes and wireless devices in radio communication network 100 is exemplary and is scalable to any amount.

In an exemplary cellular context, network access nodes 110 and 120 may be base stations (e.g., eNodeBs, NodeBs, Base Transceiver Stations (BTSs), or any other type of base station), while wireless devices 102 and 104 may be cellular wireless devices (e.g., Mobile Stations (MSs), User Equipments (UEs), or any type of cellular wireless device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while wireless device 102 and 104 may be short range wireless devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to wireless devices 102 and 104 (and, optionally, other wireless devices of radio communication network 100 not explicitly shown in FIG. 1). In an exemplary cellular context, the radio access network provided by network access nodes 110 and 120 may enable wireless devices 102 and 104 to wirelessly access the core network via radio communications. The core network may provide switching, routing, and transmission, for traffic data related to wireless devices 102 and 104, and may further provide access to various internal data networks (e.g., control nodes, routing nodes that transfer information between other wireless devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between wireless devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, wireless devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an internal configuration of wireless device 102 according to some aspects, which may include antenna system 202, radio frequency (RF) transceiver 204, baseband modem 206 (including digital signal processor 208 and protocol controller 210), application processor 212, and memory 214. Although not explicitly shown in FIG. 2, in some aspects wireless device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Wireless device 102 may transmit and receive radio signals on one or more radio access networks. Baseband modem 206 may direct such communication functionality of wireless device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of wireless device 102 shown in FIG. 2 depicts only a single instance of such components.

Wireless device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Wireless device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of wireless device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of wireless device 102 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio wireless device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Wireless device 102 may also include application processor 212 and memory 214, Application processor 212 may be a CPU, and may be configured to handle the layers above the protocol stack, including the transport and application layers. Application processor 212 may be configured to execute various applications and/or programs of wireless device 102 at an application layer of wireless device 102, such as an operating system (OS), a user interface (UI) for supporting user interaction with wireless device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of wireless device 102, such as a hard drive or another such permanent memory device. Although not explicitly depicted in FIG. 2, the various other components of wireless device 102 shown in FIG. 2 may additionally each include integrated permanent and non-permanent memory components, such as for storing software program code, buffering data, etc.

In accordance with some radio communication networks, wireless devices 102 and 104 may execute mobility procedures to connect to, disconnect from, and switch between available network access nodes of the radio access network of radio communication network 100. As each network access node of radio communication network 100 may have a specific coverage area, wireless devices 102 and 104 may be configured to select and re-select between the available network access nodes in order to maintain a strong radio access connection with the radio access network of radio communication network 100. For example, wireless device 102 may establish a radio access connection with network access node 110 while wireless device 104 may establish a radio access connection with network access node 112. In the event that the current radio access connection degrades, wireless devices 102 or 104 may seek a new radio access connection with another network access node of radio communication network 100; for example, wireless device 104 may move from the coverage area of network access node 112 into the coverage area of network access node 110. As a result, the radio access connection with network access node 112 may degrade, which wireless device 104 may detect via radio measurements such as signal strength or signal quality measurements of network access node 112. Depending on the mobility procedures defined in the appropriate network protocols for radio communication network 100, wireless device 104 may seek a new radio access connection (which may be, for example, triggered at wireless device 104 or by the radio access network), such as by performing radio measurements on neighboring network access nodes to determine whether any neighboring network access nodes can provide a suitable radio access connection. As wireless device 104 may have moved into the coverage area of network access node 110, wireless device 104 may identify network access node 110 (which may be selected by wireless device 104 or selected by the radio access network) and transfer to a new radio access connection with network access node 110. Such mobility procedures, including radio measurements, cell selection/reselection, and handover are established in the various network protocols and may be employed by wireless devices and the radio access network in order to maintain strong radio access connections between each wireless device and the radio access network across any number of different radio access network scenarios.

Many wireless networks may use time and frequency synchronization to support communications between wireless devices. Slotted communication systems are particularly common, which generally divide a communication schedule into frames that are individually composed of multiple slots. Wireless devices following the communication schedule may then arrange their transmission and reception operations around the slots and frames. Wireless devices may align their operations with the communication schedule through a synchronization process, which may vary in operation depending on the particular radio access technology. In cellular networks, the synchronization is generally provided by the cellular infrastructure, such as where cells broadcast synchronization signals that wireless devices can use to acquire time and frequency synchronization with the cellular network.

Various aspects of this disclosure relate to device-to-device (D2D) networks that are decentralized. Accordingly, wireless devices operating in these D2D networks may not have centralized network infrastructure to assist with synchronization. Wireless devices may instead use external synchronization sources, such as satellite-based synchronization sources (e.g., Global Navigation Satellite System (GNSS)), internal synchronization sources, such as internal device clocks (e.g., based on Coordinated Universal Time (UTC)), or peer-based synchronization sources (e.g., another D2D device broadcasting its own synchronization signal, which may be in turn based on an internal synchronization source of this device).

Figure 3:
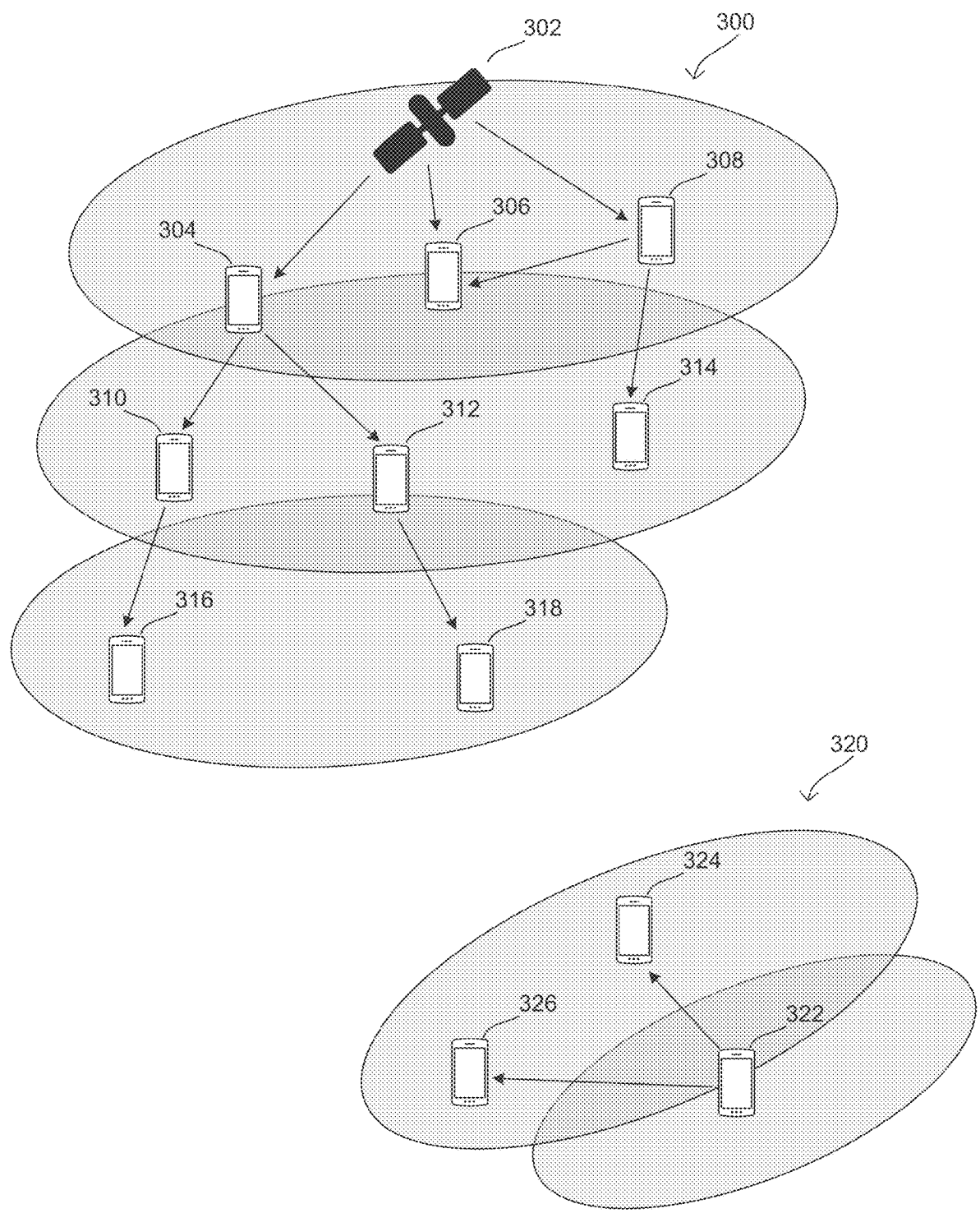
FIG. 3 shows an exemplary synchronization arrangement of wireless devices according to some aspects.

Various aspects of this disclosure may use a tiered system of synchronization, where certain synchronization tiers of devices may act as synchronization masters, synchronization relays, and synchronization slaves. FIG. 3 shows an exemplary synchronization arrangement of wireless devices according to some aspects. As shown in FIG. 3, there may be satellite-based synchronization cluster 300 and peer-based synchronization cluster 320. Satellite-based synchronization cluster 300 may be synchronized with satellite-based synchronization source 302, such as with a synchronization signal broadcasted by satellite-based synchronization source 302 (e.g., a GNSS synchronization signal). This includes both wireless devices that are synchronized directly with satellite-based synchronization source 302 and wireless devices that are synchronized via relay with satellite-based synchronization source 302. By contrast, peer-based synchronization cluster 320 may be synchronized with wireless device 322. Wireless device 322 may use an internal synchronization source, such as its internal device clock (e.g., based on UTC), to generate synchronization signals to which the other wireless devices in peer-based synchronization cluster 320 can synchronize. It is understood that while only one satellite-based synchronization source 302 is illustrated in FIG. 3, satellite-based synchronization source 302 may be represent a plurality of satellite-based synchronization sources, e.g. three or more, in order to perform the satellite-synchronization and/or location methods described herein.

The wireless devices of satellite-based synchronization cluster 300 and peer-based synchronization cluster 320 may assume either master, relay, or slave roles. Synchronization masters may broadcast synchronization signals that synchronization relays and synchronization slaves can use to synchronize with the synchronization master. The synchronization masters may in turn be synchronized with a satellite-based or internal synchronization source, where the synchronization relays and slaves can also synchronize with the same synchronization source using the synchronization signals broadcasted by the synchronization masters. In the example of FIG. 3, wireless devices 304 and 308 may be synchronization masters that are synchronized with satellite-based synchronization source 302. The synchronization masters may form a zeroth synchronization tier of synchronization arrangement.

Wireless devices 304 and 308 may therefore broadcast synchronization signals that are synchronized with satellite-based synchronization source 302. As shown in FIG. 3, wireless devices 306, 310, 312, and 314 may receive these synchronization signals from the synchronization masters.

Wireless device 306 may receive both a synchronization signal from satellite-based synchronization source 302 and a synchronization signal from wireless device 308. Wireless device 306 may not broadcast a synchronization signal, and may therefore be a synchronization slave (e.g., synchronized to both satellite-based synchronization source 302 and wireless device 308). Wireless device 314 may also receive a synchronization signal from wireless device 308 but may not receive a synchronization signal from satellite-based synchronization source 302. Wireless device 314 may not broadcast a synchronization signal, and may therefore be a synchronization slave to wireless device 308. As wireless device 314 receives a synchronization signal that is once-removed from the synchronization master, wireless device 314 may form part of the first synchronization tier of satellite-based synchronization cluster 300.

Similar to wireless device 314, wireless devices 310 and 312 may also receive synchronization signals from a synchronization master. Wireless devices 310 and 312 may therefore also be part of the first synchronization tier of satellite-based synchronization cluster 300. As shown in FIG. 3, wireless devices 310 and 312 may then broadcast their own synchronization signals, or in other words, may relay the synchronization signals from the synchronization master. Wireless devices 310 and 312 may therefore assume the role of synchronization relays.

Wireless devices 316 and 318 may then receive these synchronization signals from the synchronization relays. As these synchronization signals are two levels moved (e.g., forwarded twice) from the synchronization source, wireless devices 316 and 318 may be part of the second synchronization tier of satellite-based synchronization cluster 300. Wireless devices 316 and 318 may not transmit their own synchronization signals, and may therefore assume a synchronization slave role.

While satellite-based synchronization cluster 300 includes three synchronization tiers (zeroth, first, and second), additional synchronization tiers can also be used. However, as each additional synchronization tier includes an additional relay of the synchronization signal, the synchronization reliability will progressively decrease in each synchronization tier (e.g., with relay hop of the synchronization signal). For example, the probability that an nth synchronization tier synchronization relay becomes unsynchronized increases with n, leading to a time drift between the different synchronization tiers within the synchronization cluster. Furthermore, the designation of synchronization masters may change over time, such as through a contention or handover process where synchronization masters switch places with synchronization relays or slaves and the synchronization relays or slaves become synchronization masters. As synchronization masters can consume large levels of power, this can avoid scenarios where some devices share a disproportionate amount of the power usage burden.

In contrast to the satellite-based synchronization source of satellite-based synchronization cluster 300, peer-based synchronization cluster 320 may be synchronized with an internal clock of wireless device 322. In one example, the wireless devices of peer-based synchronization cluster 320 may be indoors, or in another location where satellite-based synchronization signals are unavailable or unreliable. Accordingly, wireless device 322 may begin broadcasting synchronization signals that are synchronized with its own internal synchronization source (e.g., its internal UTC clock). Wireless device 322 may therefore be a synchronization master. Wireless devices 324 and 326 may receive this synchronization signal and thus synchronize themselves with wireless device 322. In the example of FIG. 3, wireless devices 324 and 326 may not transmit their own synchronization signals, and may therefore be synchronization slaves in the first synchronization tier of peer-based synchronization cluster 320. In other scenarios, wireless devices 324 and 326 may be synchronization relays and therefore may relay the synchronization signal from wireless device 322.

In aspects, synchronization clusters may attempt to align themselves with a universal reference time. For example, synchronization cluster 300 may align itself with Global Positioning System (GPS) time, which is provided by the synchronization signals broadcasted by satellite-based synchronization source 302. Each wireless device may have its own local reference time, which it may periodically update based on synchronization signals to be aligned with the universal reference time. Similarly, synchronization cluster 320 may align itself with UTC time, which is provided by the synchronization signal broadcasted by wireless device 322. In some aspects, synchronization clusters may align their frame timings with certain timing positions in the universal reference time, such as where frame boundaries are located at certain points in time relative to the universal reference time. As further described below, this alignment with a universal reference time may help wireless devices when they are searching for synchronization signals. While wireless devices may not be able to perfectly align their local reference times with the universal reference time in proactive, it may help provide approximate frame timings to unsynchronized wireless devices. For example, even though the local reference time of a wireless device may not be precisely aligned with the communication schedule and universal reference time, it may still provide a baseline for wireless devices to approximately identify frame timings in the communication schedule.

Figure 4:
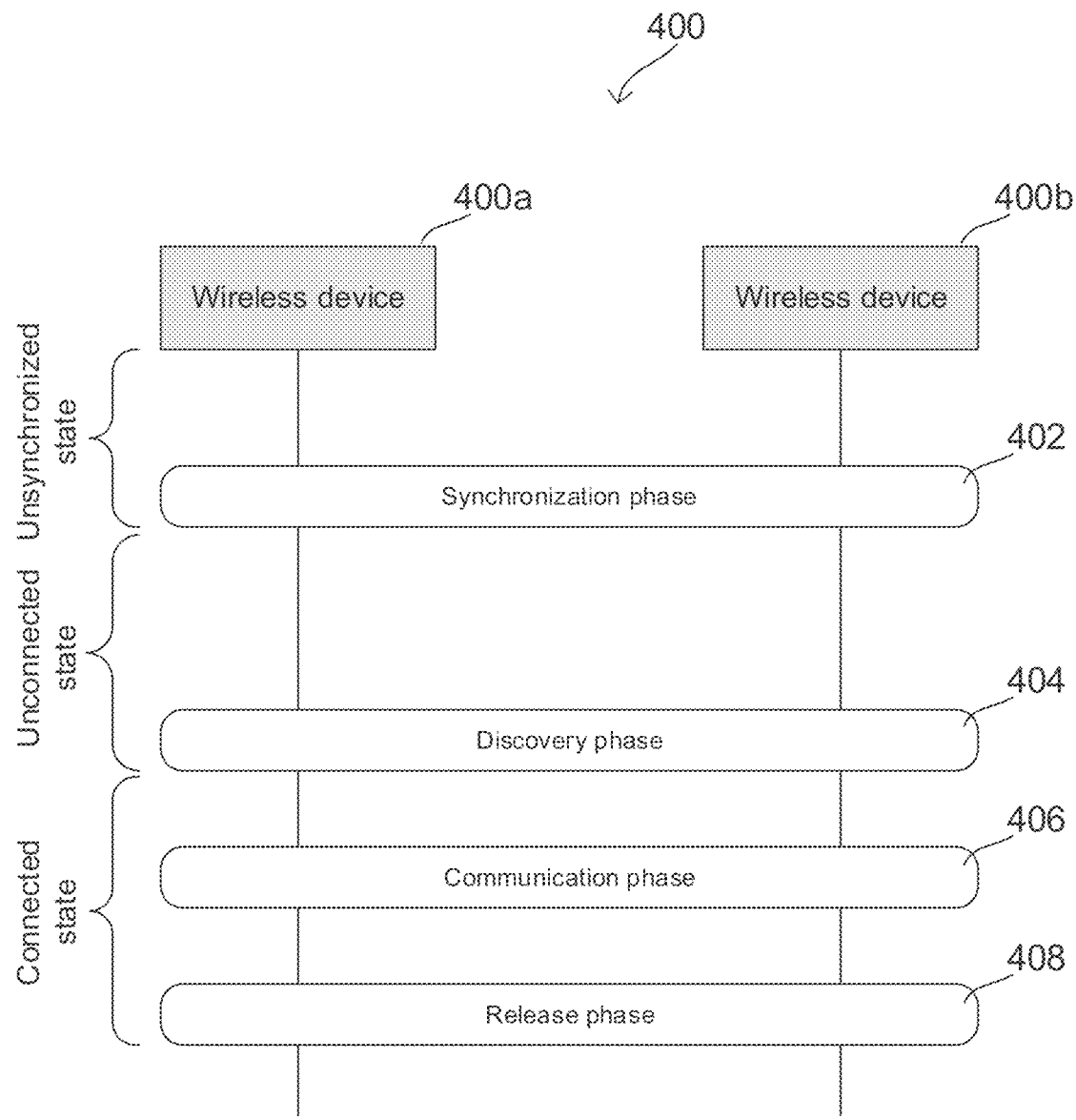
FIG. 4 shows an exemplary message sequence chart illustrating use of synchronization according to some aspects.

The respective wireless devices in satellite-based synchronization cluster 300 and peer-based synchronization cluster 320 may use the synchronization with each other to establish communication links. FIG. 4 shows an exemplary message sequence chart 400 illustrating use of synchronization according to some aspects. As shown in FIG. 4, wireless devices 400a and 400b may initially be in an unsynchronized state with each other, or in other words, may not have a reliable synchronization reference between them.

Wireless devices 400a and 400b may then perform a synchronization phase in stage 402. For example, wireless devices 400a and 400b may receive synchronization signals that are synchronized with the same synchronization source, and may therefore obtain common time references that are synchronized with each other. Wireless devices 400a and 400b may also align their tuning frequencies to a common frequency reference and thus obtain frequency synchronization.

Figure 5:
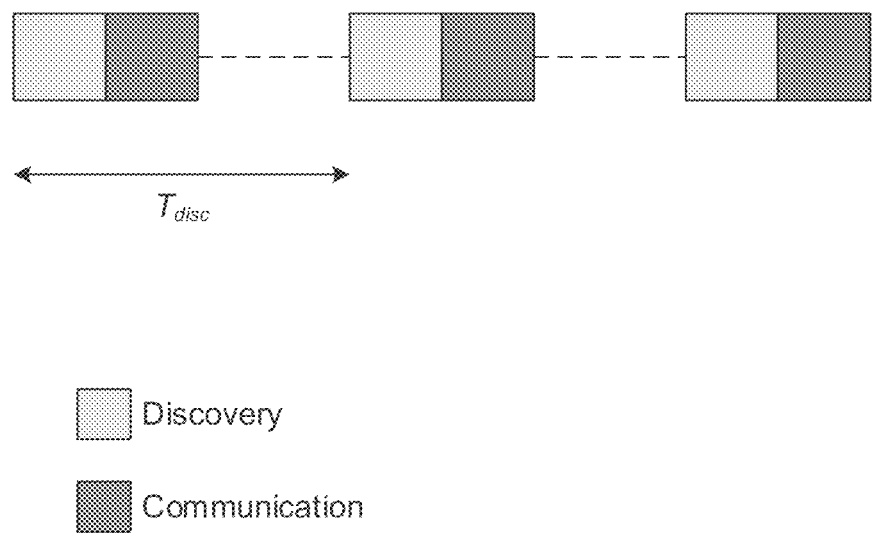
FIG. 5 shows an example where discovery resources are allocated with a periodicity according to some aspects.

Following stage 402, wireless devices 400a and 400b may be in a synchronized but unconnected state. Wireless devices 400a and 400b may then execute a discovery phase in stage 404. In particular, wireless devices 400a and 400b may use the time and frequency synchronization to align their respective discovery operations in time and frequency. For example, wireless devices 400a and 400b may operate on a slotted communication schedule that allocates certain time slots and frequencies for discovery during each frame (or sequence of frames). These time slots and frequencies allocated for discovery are referred to herein as discovery resources. FIG. 5 shows an example where discovery resources are allocated with a periodicity of $T_{disc}$. The frames may also include communication and other resources, between which the discovery resources are interleaved. Wireless devices 400a and 400b may therefore use the time and frequency synchronization (e.g., the common time and frequency references) to align their discovery operations, such as by identifying the timing of the discovery resources using the common time reference. This can include exchanging discovery messages (e.g., a discovery initiation message and a discovery confirmation message) on the discovery resources. Without time and frequency synchronization, wireless devices 400a and 400b may not be able to effectively perform discovery. For example, if misaligned in time, wireless devices 400a and 400b may transmit and receive the discovery messages at different times and experience irreversible decode errors (e.g., if the misalignment is larger than a guard interval). Similarly, if misaligned in frequency wireless devices 400a and 400b may use different modulation and demodulation frequencies that may likewise result in irreversible decode errors.

After discovering each other, wireless devices 400a and 400b may enter a connected state and perform a communication phase in stage 406, such as where wireless devices 400a and 400b exchange data. This may likewise rely on the time and frequency synchronization obtained in the synchronization phase of stage 402. For example, wireless devices 400a and 400b may use this time and frequency synchronization to align their transmission and reception on the same communication resources (as shown in FIG. 5). In some aspects, wireless devices 400a and 400b may use the synchronization from the synchronization phase for initial coarse synchronization and may apply time and frequency tracking on exchanged communication signal for fine synchronization. After communication is finished, wireless devices 400a and 400b execute a release phase in stage 408 to end the communication link, Without proper synchronization between them, wireless devices 400a and 400b may not be able to perform stages 404-408.

3GPP has introduced a Device to Device D2D feature allowing specific devices to discover other devices in proximity and communicate with one another, i.e. Proximity based Services (ProSe). This feature, in large part, is based on LTE radio access technology (RAT) and operates in the licensed spectrum. However, one of the main problems of the licensed spectrum is the high load attributed to normal cellular communications, and the introduction of D2D may potentially create interference with normal cellular communications. Even though D2D allows for direct communication between devices in scenarios where the devices are within or outside network coverage, certain D2D implementations may not be optimally realized. In particular, the D2D feature might not optimally enable services in scenarios where long range coverage is required, e.g. distances ranging over several hundred meters, e.g. over 2 km.

In order to meet the growing demand for long range D2D communications while avoiding the interference problems discussed above, other parts of the spectrum, e.g. other than the licensed spectrum, may be used. However, this may raise other problems.

For example, licenses and fees are not required to use the 2.4 GHz unlicensed spectrum, but to avoid interference and to ensure a fair use of the resources, numerous requirement and regulations are imposed by national and international organizations such as the Federal Communications Commission (FCC), Inter-American Telecommunication Commission (CITEL), International Telecommunication Union (ITU), and the European Telecommunications Standards Institute (ETSI). Since the 2.4 GHz band was released for WiFi technology use more than 15 years ago, this band has been overcrowded with billions of existing WiFi capable devices. In addition, many other consumer products operate in this band, e.g. microwave ovens, cordless phones, baby monitors, garage door openers, etc.

Therefore, a system operating in any frequency band, whether it be licensed or unlicensed, may need to face challenges such as complying with existing rules and regulations in order to limit interference with other devices and/or wireless technologies, ensuring that it does not unfairly use a larger portion of the shared spectrum, and accounting for interference from other devices in order to meet desired Quality of Service (QoS) and range requirements.

In some aspects, long-range D2D communications accounting for interference across one or more other wireless technologies is implemented with a framework covering general procedures to be applied to account for different wireless technologies. For example, Bluetooth and WiFi are typical examples of other wireless technologies operating in the 2.4 GHz band. While they may be used for similar applications, Bluetooth is intended mainly for portable devices and WiFi is intended mainly for providing high speed access to the Internet. However, both of these RATs are range limited (in the order of 100 m). So, while they may support direct-type communication between devices, they do not support longer range communication and/or bandwidth requirements.

In some aspects, devices and methods enabling long-range device to device communication are presented. Long-range may include communications in the order of hundreds of meters or greater, e.g. greater than 200, 300, 400, or 500 m. The devices presented herein access the frequency spectrum using intelligent frequency hopping schemes and are capable of synchronizing, discovering, making themselves discoverable, and exchanging data/voice with one or more devices supporting similar technologies.

In some aspects, the devices and methods search for synchronization, discovery, and control signal on a common channel and send data in an adaptive manner over available frequencies according to a frequency hopping pattern. This hopping pattern may be pre-defined or may be dynamically determined by the device. Additionally, the devices and methods may identify channels being used by other technologies and exclude them from the hopping frequency list of available channels.

While the methods and devices in the explanation herein may be illustrated using certain RATs, e.g. Bluetooth and/or Wifi, for coexistence with D2D communications, it is appreciated that the methods and devices these schemes and mechanisms to other RATs, e.g. Radio Frequency identification (RFID), Sigfox, LoRaWan, ZigBee, Z-wave, 5G NR technologies, etc., as well.

Figure 6:
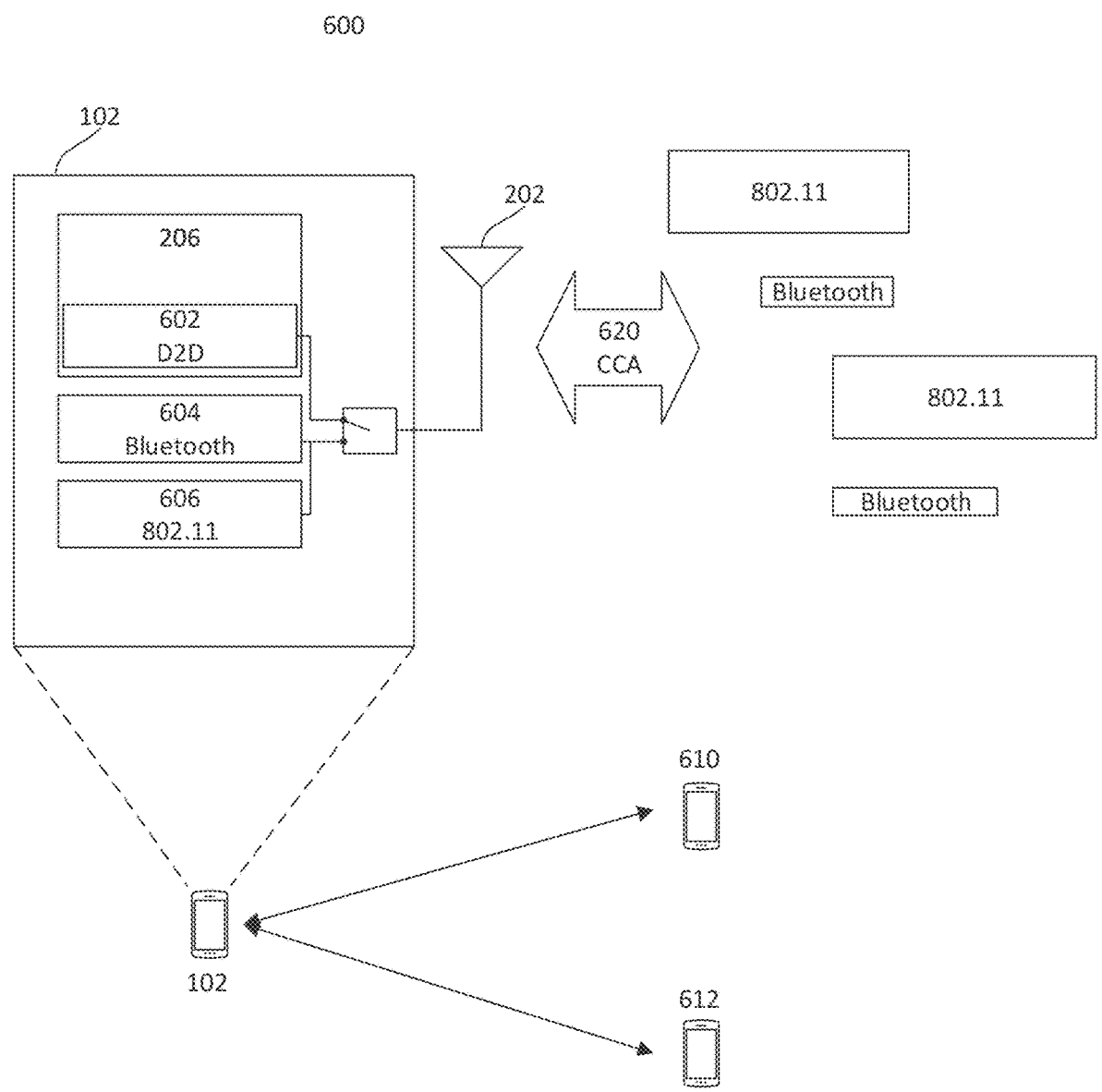
FIG. 6 shows a system block diagram according to some aspects.

FIG. 6 shows a diagram 600 illustrating a system for D2D communications and other co-exiting RATs. It is appreciated that diagram 600 is exemplary in nature and may therefore be simplified for purposes of this explanation.

The wireless devices 102, 610, 612 shown in diagram 600 may operate in a frequency band that shares the same antenna 202 as other RATs, e.g. wireless devices 102, 610, 612 may operate in the 2.4 GHz band and share antenna 202 with Bluetooth and Wifi.

Wireless device 102 may be configured with D2D hardware and/or software in the baseband modem (i.e. cellular modem) 206 configured to support long-range D2D communications, i.e. D2D component 602. For example, long-range D2D component 602 may be configured to support D2D communications in the 2.4 GHz band using components of the protocol stack implemented by baseband modem 206.

In addition to being fitted to support D2D communications, wireless device 102 may be fitted with hardware and/or software to support other RATS, e.g. Bluetooth 604 and Wifi (i.e. 802.11) 606. Wireless device 102 may be configured to support these other RATs with the same antenna 202 as D2D.

D2D component may be configured to support long-rang D2D communications, e.g. in the 2.4 GHz band. For example, normal range D2D may be in the range of up to 100-200 m, which Bluetooth is typically in the range of tens of meters and Wifi is typically in the range of up to 100-150 m. Long-range D2D communications, however, may be configured to support D2D transmission/reception in the range of up to 2 km.

In some aspects, wireless device 102 may be configured to operate in adaptive mode, by adapting its medium access to its radio environment by identifying other transmissions present in the band. Additionally, wireless device 102 may be configured to identify channels that are being used by other technologies, e.g. other RATs such as Bluetooth and/or Wifi, and exclude them from the list of available channels for long-term use. Accordingly, wireless device 102 may be configured to perform a clear channel assessment (CCA) 620 in order to determine whether resource(s) in the frequency band are available for communications using a specific RAT for a specific duration of time.

In some aspects, the D2D network environment may be organized in a hierarchical structure where a wireless device may take the role of a master or a slave. The role of the master is to propagate synchronization signals, which are received by the slave devices and used to achieve time and frequency synchronization with one another. The initial schedule for the devices to transmit and/or receive the synchronization signals may be transmitted to the devices from a cloud server, core network, etc. so that the wireless devices are able to discover each other.

Figure 7:
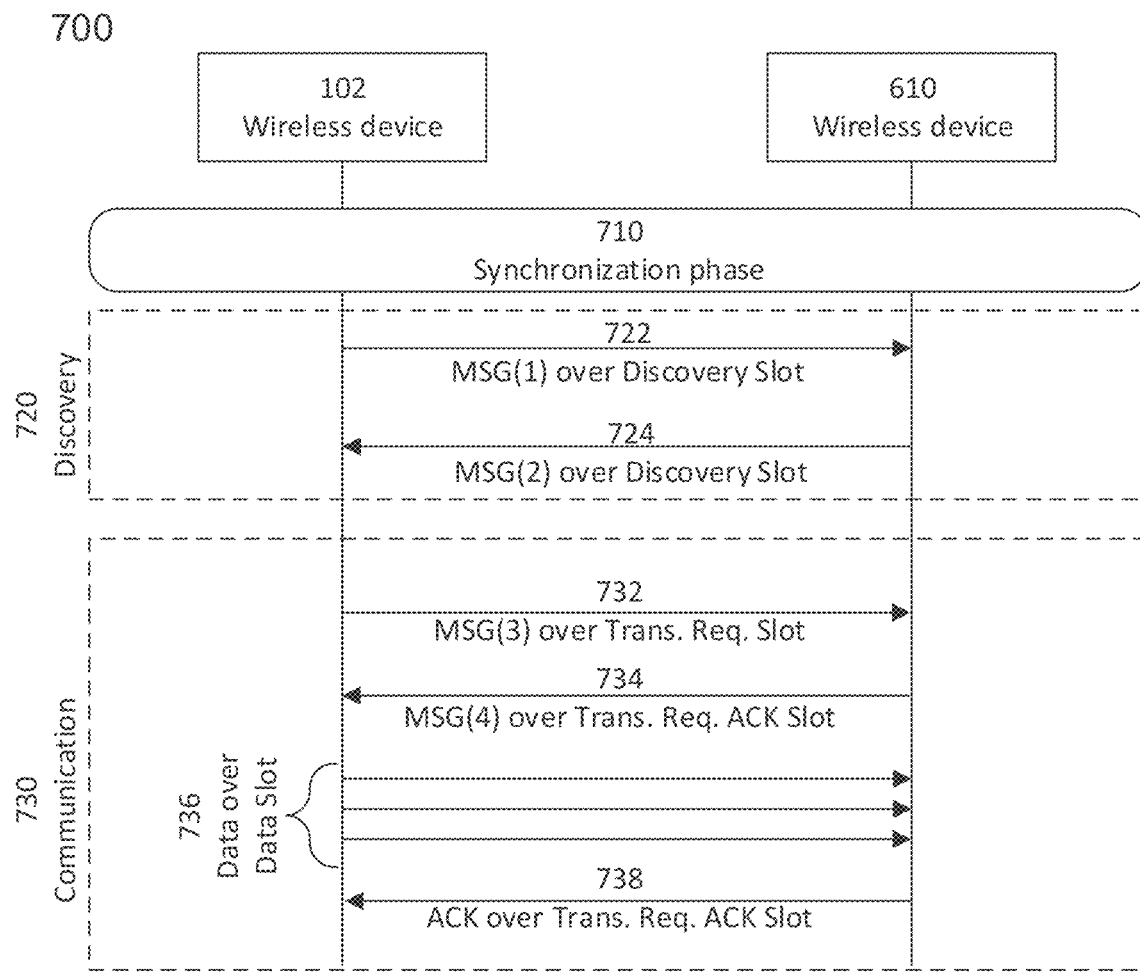
FIG. 7 shows a message sequence chart (MSC) according to some aspects.

FIG. 7 shows a message sequence chart (MSC) 700 illustrating a communication flow according to some aspects. It is appreciated that MSC 700 is exemplary in nature and may therefore be simplified for purposes of this explanation.

MSC 700 shows four types of communication exchanges between wireless devices: (1) Synchronization (Sync) phase 710—Exchanges which are broadcast, for example, from the master device to slave devices; (2) Discovery 720—including MSG(1) 722 and MSG(2) 724 which are transmitted over the discovery slot(s) between two peers (e.g. 102 and 610); (3) Transmission resource negotiation—shown by MSG(3) 732 and MSG(4) 734 (in the case of unicast between two peers and in the case of multicast between one device to a group of device); and (4) Data 736 (in the case of unicast between two peers and in the case of multicast between one device to a group of device). Also, an acknowledgement (ACK) may be transmitted from the receiving device to the transmitting device over the Transmission (Trans.) Request (Req.) Slot 738. The transmission resource negotiation and the data transmission together may be transmitted in the communication phase 730 following discovery 720.

Figure 8:
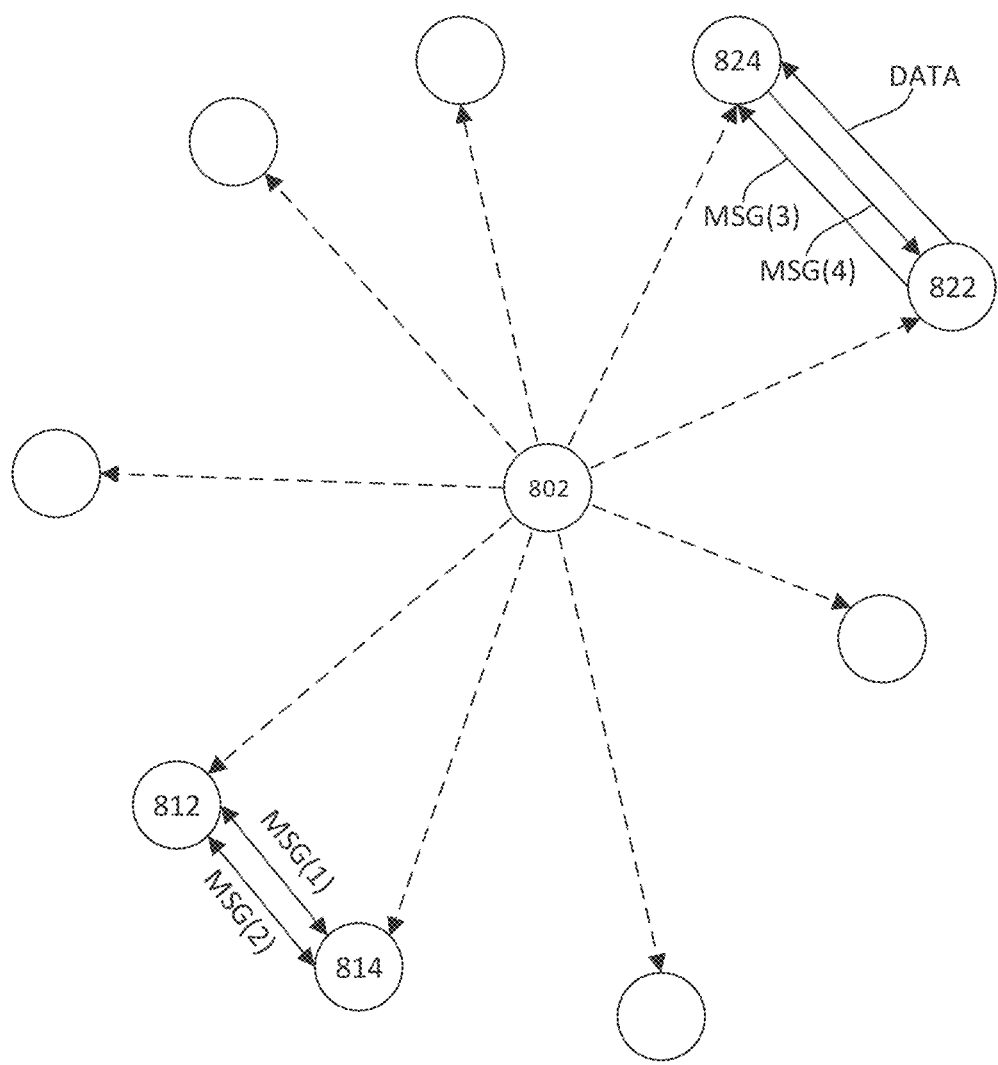
FIG. 8 shows diagram illustrating an exemplary communication scenario in D2D communications according to some aspects.

FIG. 8 is a diagram 800 illustrating an exemplary communication scenario in D2D communications where the master device 802 broadcasts the synchronization signals to devices within its proximity. Some of these devices may then engage in D2D communications, e.g. 812 and 814 shown exchanging messages MSG(1) and MSG(2) in the discovery phase and 822 and 824 shown exchanging messages MSG(3), MSG(4), and DATA in the communication phase. It is appreciated that diagram 800 is exemplary in nature and may therefore be simplified for purposes of this explanation In some aspects, devices and methods configured for medium access for D2D communications on a shared medium (e.g. the 2.4 GHz band shared with Bluetooth and Wifi) are disclosed. For example, in the 2.4. GHz band, per regulations, D2D operation needs to be able to co-exist with other wireless systems, e.g. Bluetooth, Wifi, etc. Therefore, before starting transmissions on an operating channel, a wireless device may be configured to perform a CCA check. This check is performed by gathering energy in the target channel for a pre-defined period of time and then comparing it against a power threshold. The power threshold may be defined by the regulations and may be specific to a particular RAT, e.g. Bluetooth, Wifi, Radio Frequency identification (RFID), Sigfox, LoRaWan, etc. The operating channel is considered as being occupied if the measured energy level in the channel exceeds this power threshold. The power thresholds may be either standard or vendor specific. For example, information from "ETSI EN 300 328, Wideband transmission systems; Data transmission equipment operating in the 2.4 GHz ISM band and using wide band modulation techniques" may be used for determining a standard specific power threshold.

Figure 9:
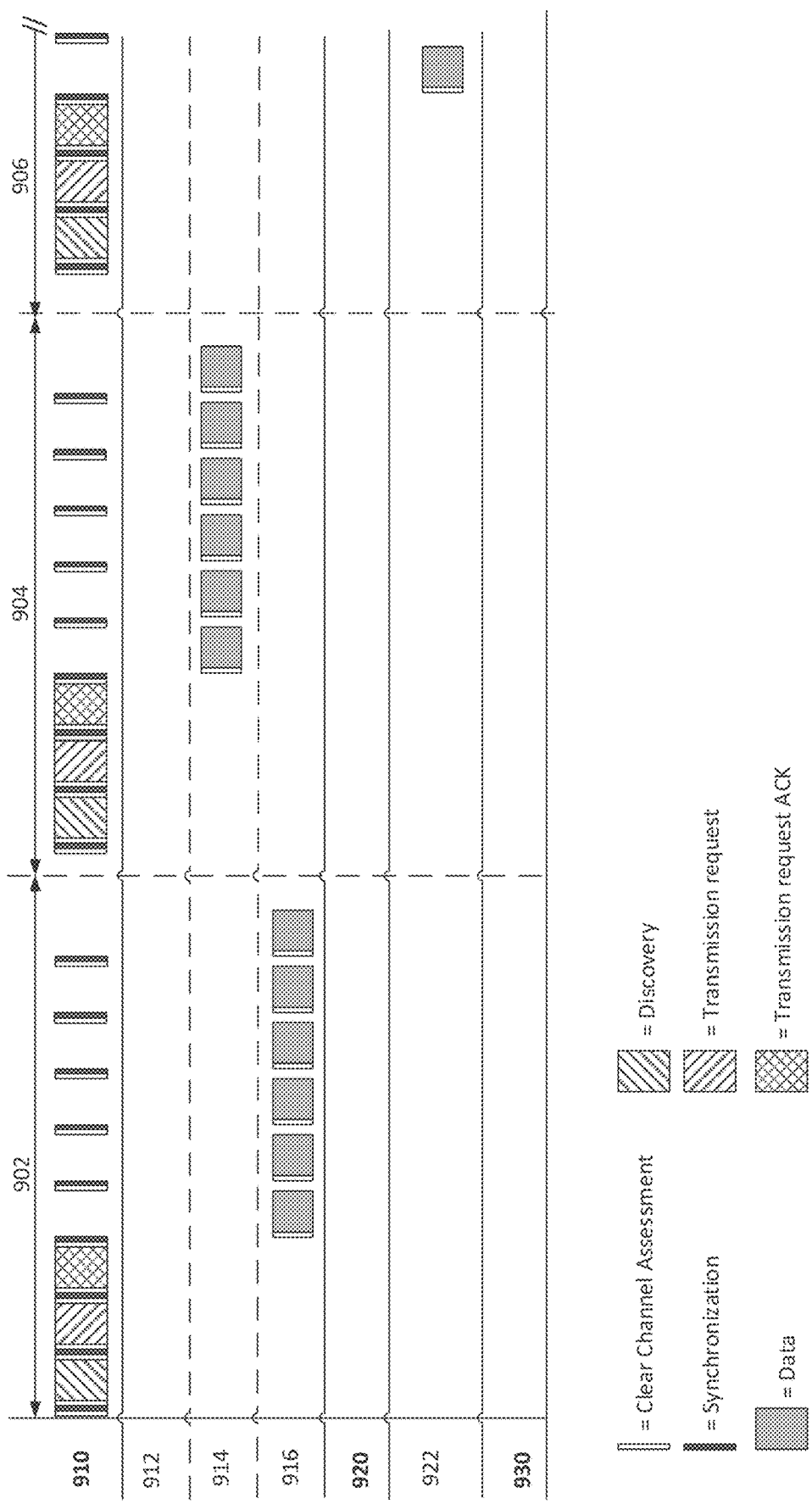
FIG. 9 shows a medium access diagram according to some aspects.
Figure 10:
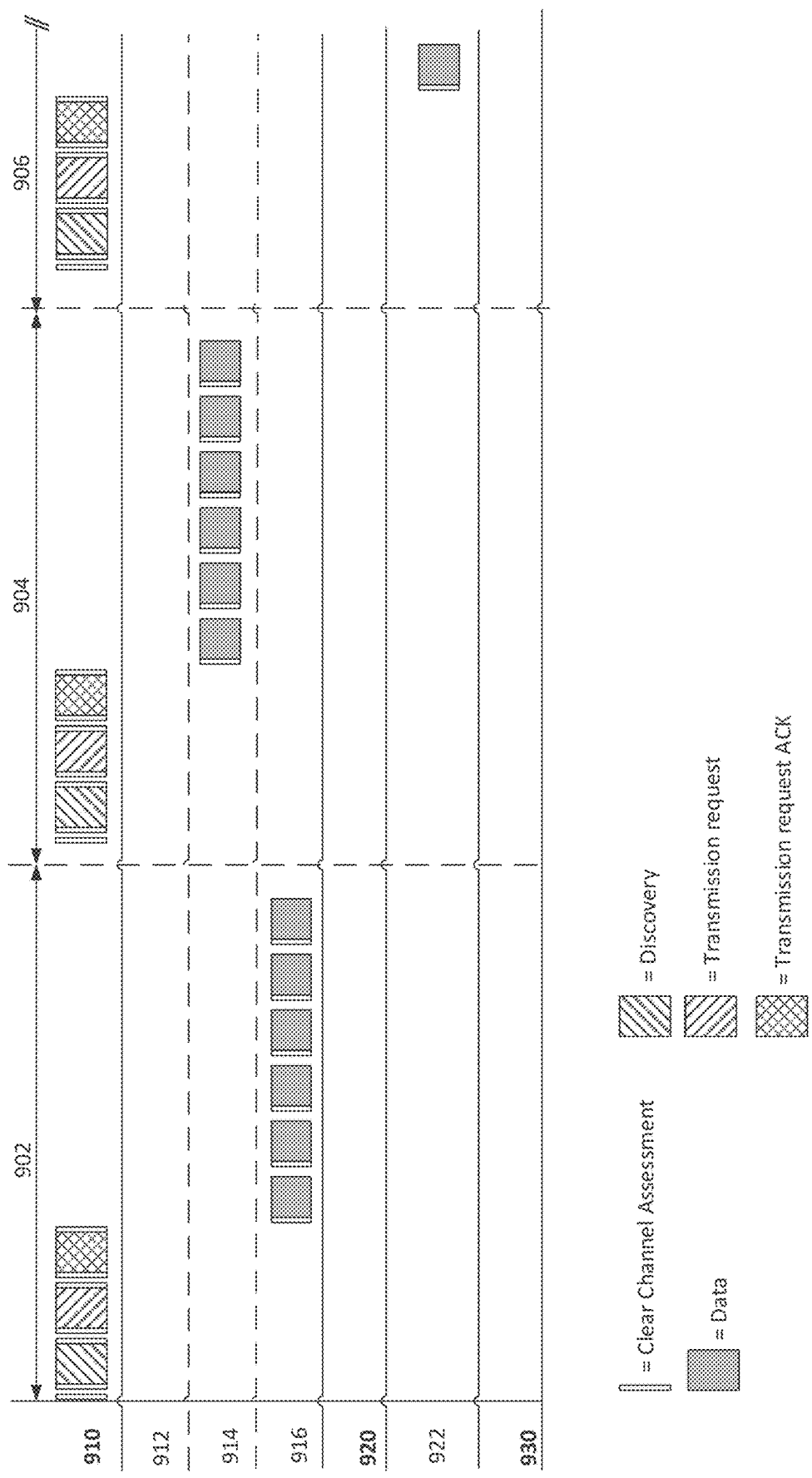
FIG. 10 shows a medium access diagram according to some aspects

FIGS. 9 and 10 show medium access diagrams 900 and 1000, respectively, in some aspects. It is appreciated that medium access diagrams 900 and 1000 are exemplary in nature and may therefore be simplified for purposes of this explanation.

Medium access diagram 900 is shown to illustrate synchronization, discovery, transmission request, transmission request acknowledgement, and data transmission for the master device and medium access diagram 1000 is shown to illustrate the same for the slave device(s) while taking into account the clear channel assessment (CCA) check. In this sense, frame 902, 904, and 906 are shown to show the synchronization between medium access diagrams 9000 and 1000 in the time domain. Common control channel 1 910, Common Control Channel 2 920, and Common Control Channel 3 930 may be selected as the resource(s) for the discovery, transmission request, and transmission request ACK messages to be transmitted on and Data Channel 1 912, Data Channel 2 914, Data Channel 3 916, and Data Channel n 922 may be selected as the resources for data transmission.

Medium access diagrams 9000 and 1000 shows how the CCA appears before each transmission for each of the communication exchanges. The control related exchanges (such as synchronization, discovery, transmission request, and transmission request acknowledgement) occur over one of the common control channels 910, 920, and/or 930 while the data exchanges occur over the data channels 912, 914, 916, and/or 922. Also, the master device is responsible for transmitting the synchronization signals as shown in medium access diagram 900.

The communication over the data channels may follow a frequency hopping pattern to meet regulation requirements for coexisting with other wireless technologies and/or randomizing the interference experienced in the network. These hopping patterns may be transmitter centric, e.g. they can be based on the transmitter ID. The control related exchanges may always occur over the same common control channel or they may hop over different common control channels. The concrete number of common control channels may be determined as a trade-off between frequency diversity and search time and the complexity of a device when joining the network and attempting to locate the synchronization signal.

Figure 11:
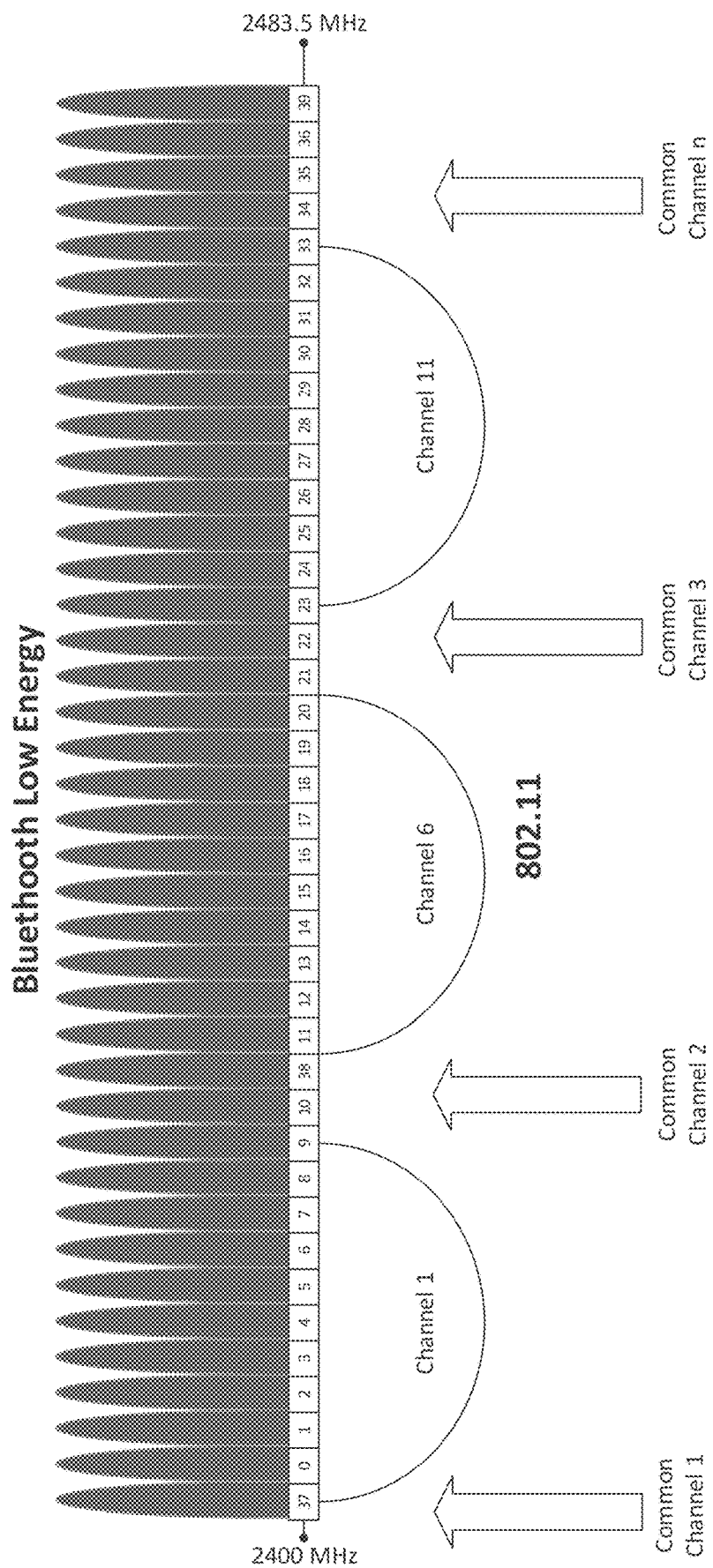
FIG. 11 shows a diagram of deployment of control channels in a shared frequency band according to some aspects.

The master device responsible for transmitting the synchronization signals allowing for other devices in the network to synchronize with one another may use a set of common control channels which may be located frequencies corresponding to reduced interference possibilities with other RATs. For example, as shown in FIG. 11, the common control channels 1, 2, 3, and n for D2D communications may be allocated to coincide with guard bands of the Wifi (i.e. 802.11) channels. In some aspects, the number and frequency ranges on which the common control channels are allocated are determined in a manner so as to co-exist with other RATs which are detected to be operating in the same frequency band. In this manner, the reliability of the successful transmission and reception of the synchronization and control (e.g. discovery, transmission request/ACK) messages may be enhanced.

The synchronization procedure requires a CCA and if the measured medium is busy, the synchronization (and therefore, all subsequent D2D communications) cannot be executed. In order to increase the probability that the synchronization sequence is transmitted, the wireless device (i.e. the master device) may be configured to enable the synchronization signal(s) over multiple common control channels so that, if one or more channels are busy, the synchronization signal may still be transmitted over another channel which is free. Accordingly, in some aspects, the methods and devices are configured to choose at least one of the following options. In a first option, the synchronization signals may be concurrently transmitted over multiple channels. In this case, the total maximum power may be needed to be shared between the multiple channels. In a second option, the synchronization signals may be sequentially transmitted over multiple channels. In this case, each transmission occurs on a channel at a different time and may therefore be allocated the maximum power.

Figure 12:
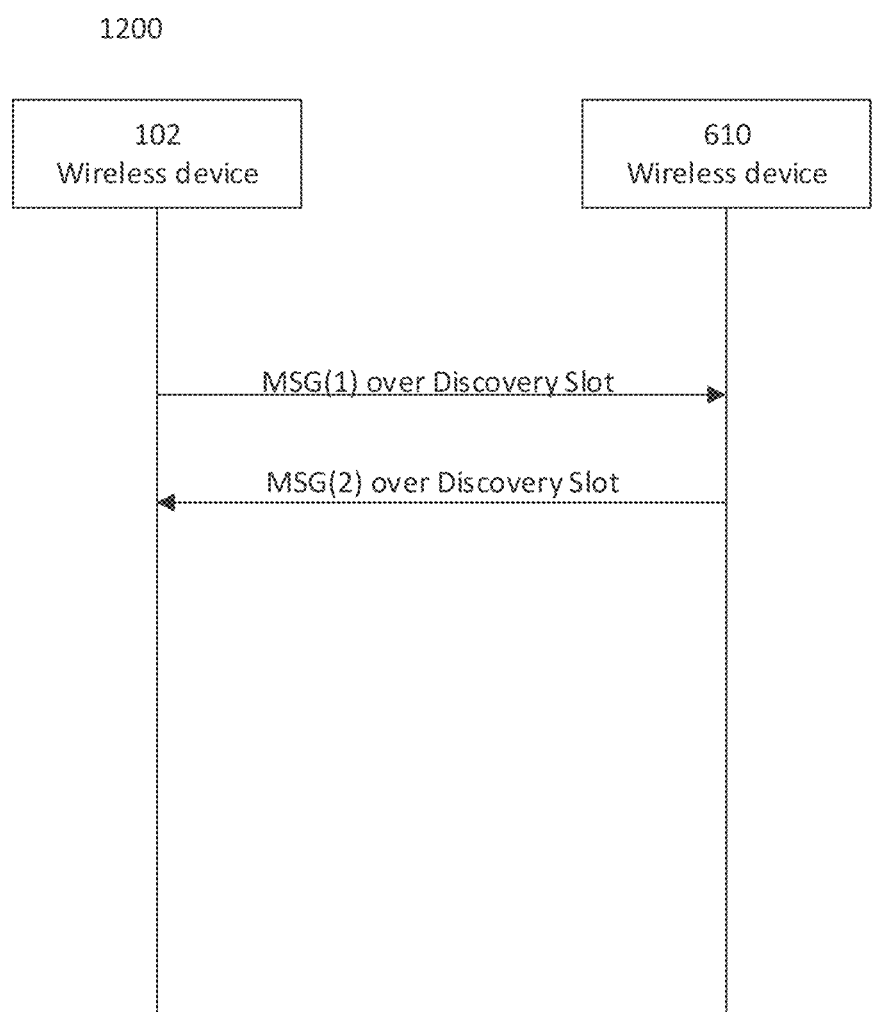
FIG. 12 shows a message sequence chart (MSC) according to some aspects.

For the discovery protocol in the control channels, the goal of the discovery procedure is to enable at least two devices to discover each other. This procedure may include two messages as shown in FIG. 12. It is appreciated that MSC 1200 is exemplary in nature and may therefore be simplified for purposes of this explanation The discovery request (denoted as MSG(1)) may be triggered whenever a wireless device wants to discover at least one other device in its surroundings. The discovery reply (denoted as MSG(2)) may be triggered whenever a valid discover request is received. The discovery process may be performed in several ways. For example, in dedicated discovery, the goal may be to discover a specific other device in the discovering device's proximity. In another example, in presence discovery, the goal may be to discover any other devices (i.e. not a specific device) anywhere in the discovering device's vicinity. The exchanged messages may be the same in either scenario and are always transmitted over the discovery slot.

The CCA check is intrinsic to the discovery protocol and therefore can prevent the transmission of either MSG(1) or MSG(2). In some aspects, to overcome the failures in the discovery protocol, a discovery initiator centric retransmission procedure with random back-off is implemented.

Figure 13:
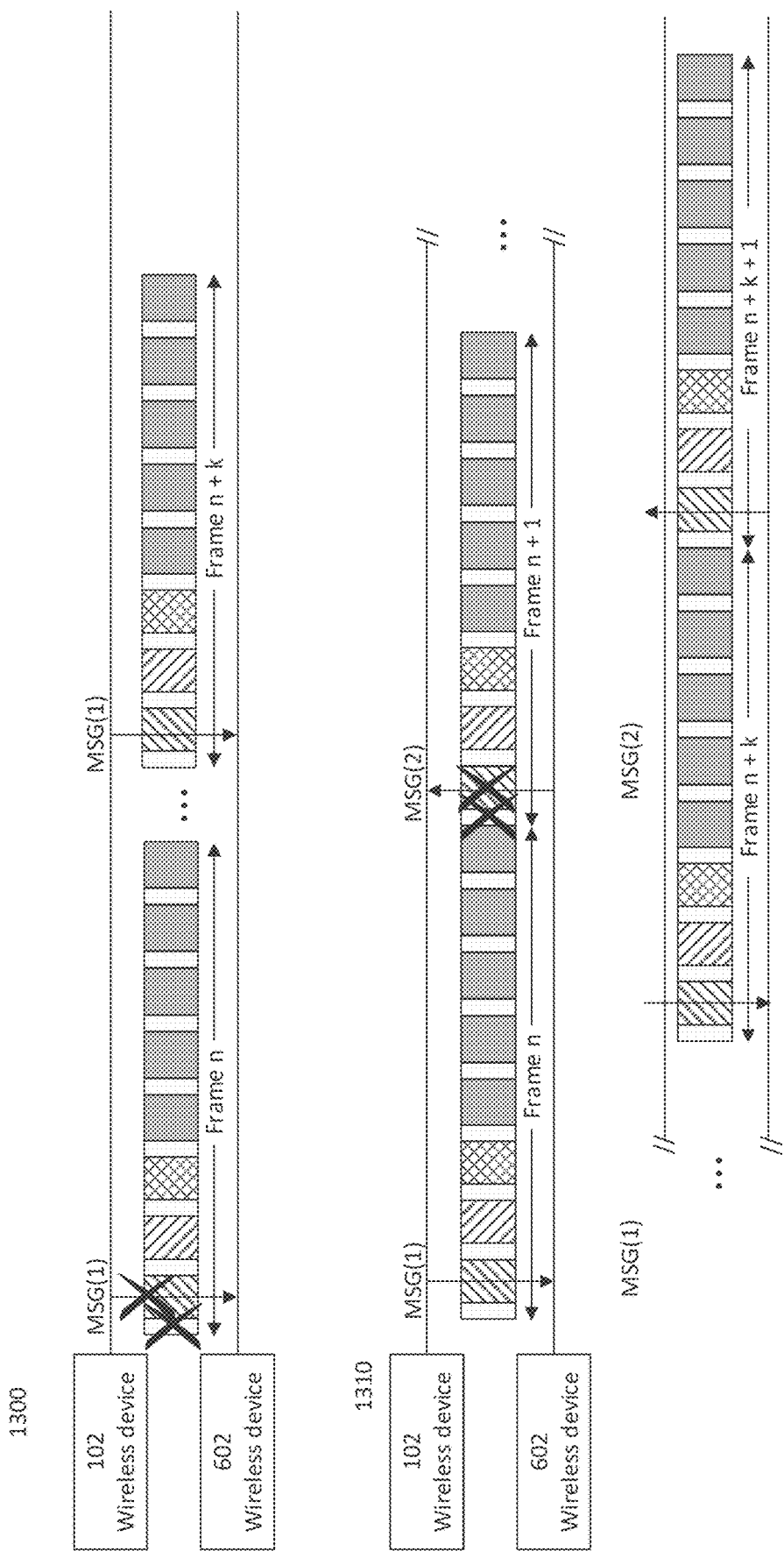
FIG. 13 shows diagrams illustrating CCA check failure and a corresponding procedure according to some aspects.

FIG. 13 shows diagrams 1300, 1310, and 1320 illustrating CCA check failure and the corresponding retransmission procedure between two wireless devices 102 and 602 in some aspects. It is appreciated that diagrams 1300, 1310, and 1320 are exemplary in nature and may therefore be simplified for purposes of this explanation. The markings of the frames are similar to those used in FIGS. 9 and 10.

In 1300, when MSG(1) is not transmitted due to a CCE check failure in Frame n, then wireless device 102 may back off for a random number of frames (in this example, k frames, where k is any integer greater than zero) and re-attempts the CCA check and MSG(1) transmission at the later frame.

In 1310, MSG(1) is successfully transmitted in Frame n, but MSG(2) is unsuccessful in the subsequent frame, i.e. Frame n+1, due to CCA check failure, then the device will back off for a certain number of frames and wait for the successful retransmission of MSG(1) prior to reattempting retransmission of MSG(2).

FIG. 14 shows MSCs 1400 and 1450 illustrating a protocol for the reservation of the transmission resources in unicast and multicast cases, respectively, according to some aspects. It is appreciated that MSCs 1400 and 1450 are exemplary in nature and may therefore be simplified for purposes of this explanation.

MSC 1400 illustrates an exemplary protocol for the reservation of the transmission resources in unicast mode according to some aspects. Wireless device 102 transmits MSG(3) over the transmission request slot to wireless device 610 in 1402, followed by reply of MSG(4) over the transmission request acknowledgement slot 1404. Once these messages are successfully exchanged, data may be transmitted 1406. In some aspects, an additional message may transmitted in 1408 from the data receiving device back to the data transmitting device.

MSC 1450 illustrates an exemplary protocol for the reservation of the transmission resources in multicast mode according to some aspects. Wireless device 102 transmits MSG(3) over the transmission request slot to wireless devices 610 and 612 in 1452, followed by reply of MSG(4) over the transmission request acknowledgement slot 1454*a* and 1454*b* from each of wireless devices 612 and 611, respectively. Once these messages are successfully exchanged, data may be transmitted 1456. In some aspects, an additional message may transmitted in 1458*a* and/or 1458*b* from the data receiving devices back to the data transmitting device.

Figure 15:
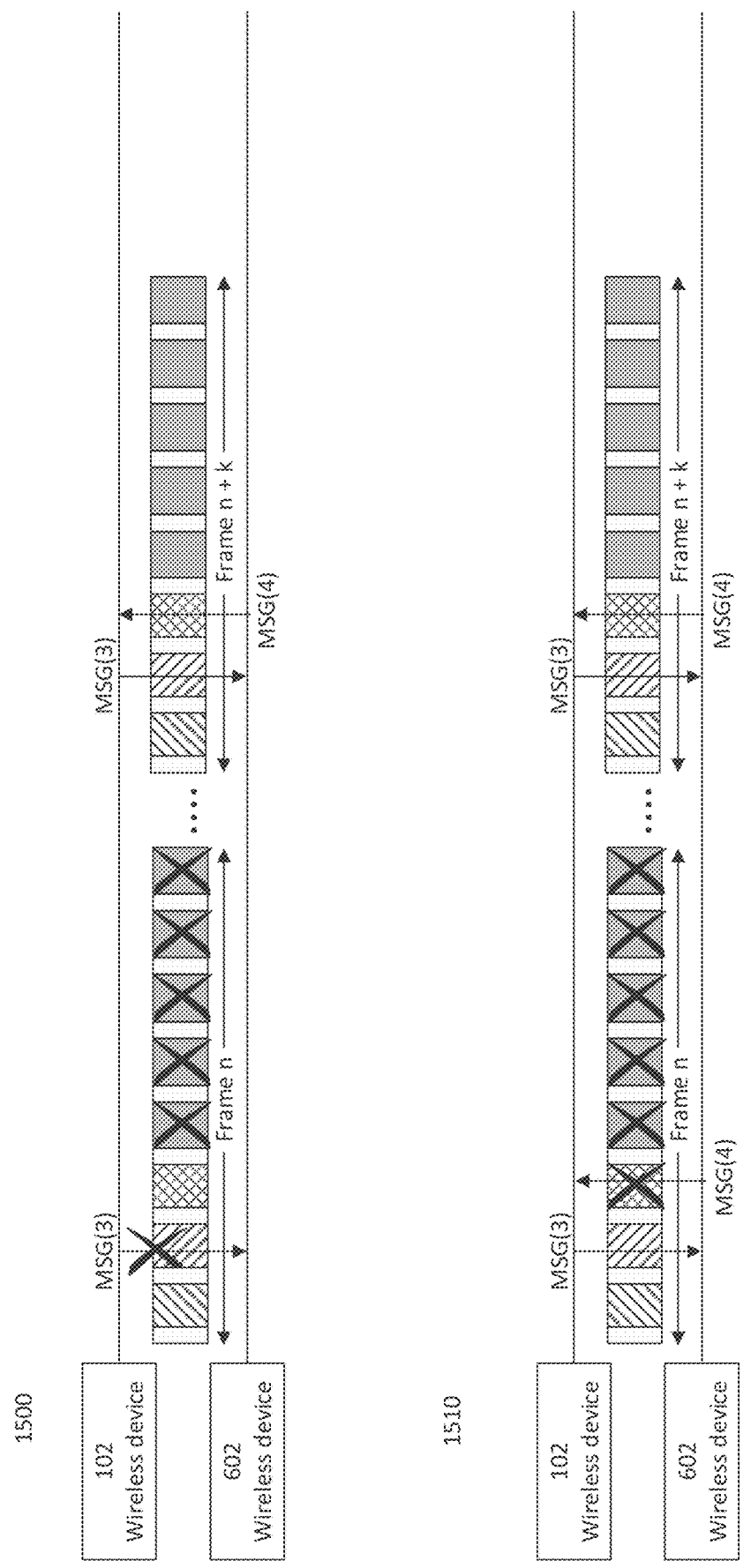
FIG. 15 shows diagrams illustrating the behavior of the transmission resource reservation when the CCA check fails according to some aspects.

FIG. 15 shows diagrams 1500 and 1510 illustrating the behavior of the transmission resource reservation when the CCA check fails according to some aspects. While diagrams 1500 and 1510 shows a unicast case, it is appreciated that the behavior in multicast is similar. Accordingly, it is appreciated that diagrams 1500 and 1510 are exemplary in nature and may therefore be simplified for purposes of this explanation. The markings of the frames are similar to those used in FIGS. 9 and 10.

If the CCA check fails for either MSG(3) or MSG(4), then the data slots in the frame are not used for transmission, as shown in Frame n in each of diagram 1500 and 1510.

If the CCA check fails for the Transmission Request slot, then wireless device 102 will not transmit MSG(3) and is unable to use the data slots with the frame as shown in 1500. Wireless device 102 will back off and attempt MSG(3) retransmission later, which in 1500, is shown as k frames later.

If the CCA check fails for the Transmission Request Acknowledgement slot, then wireless device 602 will not transmit MSG(4) and consequentially wireless device 102 is unable to use the data slots with the frame as shown in 1510. Wireless device 602 will wait for the next MSG(3) reception until it triggers the next MSG(4) transmission attempt.

Figure 16:
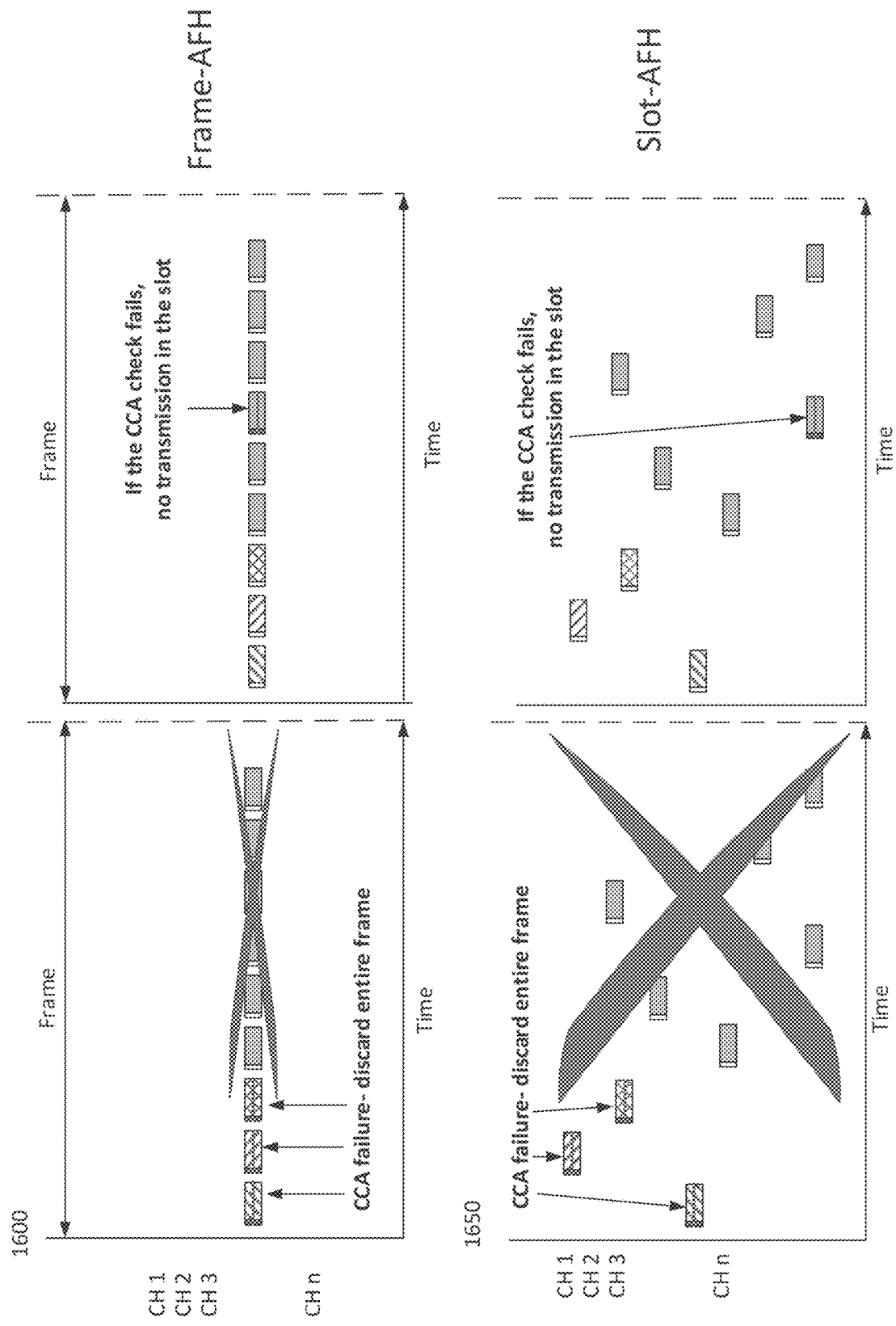
FIG. 16 shows exemplary diagrams illustrating frame frequency hopping and slot frequency hopping according to some aspects.

The data transmission may be realized through frequency hopping as shown in FIG. 16.

FIG. 16 shows exemplary diagrams 1600 and 1650 illustrating frame frequency hopping and slot frequency hopping, respectively. The markings of the frames are similar to those used in FIGS. 9 and 10. The control channels are shown as the first three slots in each frame, while the remaining six slots are data slots.

The control and data slots are distributed over frequencies (i.e. Channel numbers, e.g. CH 1, CH 2, etc.) and in time. In both the slot frequency hopping and the frame frequency hopping, the general idea is to hop, following a pseudorandom pattern known at the transmitter and at the receiver so that they are synchronized on the same frequency. Before any slot transmission, regardless if the hopping is done slot or frame wise, a CCA check over the channel is performed to decide if the transmission may be sent or must be aborted. If the transmission has to be aborted, different decisions are taken depending on the slot where the CCA check failure occurs. If the CCA check fails in any one of the slots related to the control data, then the transmitter is put in idle for the rest of the frame and will attempt to check the medium at the beginning of the next frame (shown in the first section for each of diagrams 1600 and 1650). If the CCA check fails in any one of the slots related to data, then there is no transmission for that slot, and the transmitter waits for the next slot to check the medium again to decide whether to transmit on that next slot or not. Depending on the frequency hopping, i.e. slot or frame, the transmitter performs the CCA check on the same channel for all the slots or may hop to another channel after each slot in the case of slot wise frequency hopping.

In some aspects, the methods and devices may implement switching between slot or frame frequency hopping depending on the level and the type of observed interference. For example, in a low interference scenario and non-permanent interference (e.g. which may be generated by other Bluetooth devices), frame hopping may be used, and in high interference and long-term interference scenarios (e.g. which may be generated by other Wifi devices), slot hopping may be implemented.

Since some frequency bands, e.g. the 2.4 GHz band, are heavily crowded with multiple wireless technologies, systems operating in these bands must co-exist with other systems in the same band. For example, the Bluetooth specification was designed to make Bluetooth devices very robust to interference from other devices/systems operating in Industrial, Scientific, and Medical (ISM) radio bands. Depending on whether Bluetooth and other devices (e.g. Wifi) are co-located (e.g. within about 3 meters), non-co-located, or in the same device, different methods and/or algorithms may be implemented by the devices of this disclosure. In some aspects, however, the basic idea may include maintaining a list of good channels, a list of bad channels, and/or building a selection/avoidance algorithms based off the good/bad lists. Accordingly, the methods and devices disclosed herein may be configured to obtain and/or exchange information about the channels, maintain a list based off this information and determine whether it is possible to detect different kinds of interferences in order to maintain/update the lists. This requires implementing solutions to problems not present in Bluetooth, for example, where the range (distance) is limited and there is a defined master that is responsible for the transmission and maintenance of a list. In some aspects of this disclose, long-range distance must be coped with and the use case that communication may be initiated between two random wireless devices that are connected to a master wireless device.

Due to the distributed topology of the system implemented by the devices and methods disclosed herein, a list of bad-good channels may be maintained by a wireless devices seeking to initiate D2D transmissions. Depending on the transmission range, different scenarios must be taken into account and different solutions depending on the scenario may be implemented. For example, if the distance between the transmitter (Tx) and the receiver (Rx) is relatively short, then performing CCA at the Tx side may be enough to estimate if there are interferences than can be sensed by the Tx and the Rx. The channel lists can therefore be updated based on the CCA check. If the distance is relatively long, however, then there may be different interferences sensed at the Tx and Rx side, then there must be reliable lists based on a CCA check at both the Tx and Rx side.

CCA check failure may be caused by interference with devices characterized by different bandwidth occupancy and different permanence over the channel. For example, in the ISM band, mainly Bluetooth and Wifi are active, where the Bluetooth channel bandwidth is 1 MHz and the Wifi channel bandwidth is 22 MHz. Additionally, while a Wifi transmission occupies a channel without hopping to another channel during the transmission time, Bluetooth occupies the same channel for a maximum of five consecutive slots before hopping to another frequency. In Bluetooth, each slot has a duration of 625 μs, so a Bluetooth transmission may occupy (i.e. have permanency over) a channel for 3,125 ms. In Wifi, a transmission may, in theory, be permanent. In some aspects, the devices and methods herein are configured to identify the channel occupancy durations and bandwidths in order to recognize whether a channel is occupied by a specific RAT, e.g. Bluetooth or Wifi. For example, if the channel is occupied by Wifi, the channel may be inserted in the list of bad channels and excluded from the hopping sequence with the need of additional hopping and CCA checks in the frequency region.

FIG. 17 shows exemplary diagrams 1700 and 1750 illustrating the detection of other systems according to some aspects. While the examples discussed herein relate to Bluetooth and Wifi, it is appreciated that other RATs with distinguishing transmission features (e.g. duration, bandwidth) are commensurate within the scope of this disclosure.

In diagram 1700, if the CCA check fails in 1710, instead of waiting in idle until the next slot, the device checks the channel again after the maximum duration time of Bluetooth, i.e. 5×0.625 ρs=3.123 ms. If the channel is clear, no inference can be made other than the spotted interference for a limited amount of time 1720. However, if the CCA check on the channel still fails after the 3.125 ms, then the inference may be made that the interference was not made by Bluetooth, but by another RAT, e.g. Wifi, 1722.

Diagram 1750 illustrates the extended detection of other wireless systems in a channel. In order to better classify the source generating an interference, the device keeps sensing (i.e. monitoring) the channel after the initial CCA check failure 1752 with additional CCA check(s) after one or more fixed amounts of time 1754, 1756a-1756b. Additionally, the device may sense adjacent channels as well 1756a, 1756b.

FIG. 17A shows a flowchart 1780 illustrating a method for a communication device to perform wireless communication according to some aspects. It is appreciated the flowchart 1780 is exemplary in nature and may therefore be simplified for purposes of this explanation.

In 1782, a frequency band is monitored for one or more other RATs. For example, the frequency band may include a shared frequency band, e.g. the 2.4 GHz unlicensed spectrum. The one or more other RATs may be, for example, Bluetooth, Wifi, ZigBee, Z-wave, or other 3GPP RATS, e.g. LTE, 5G, etc.

In 1784, one or more periods of a reduced interference with the one or more other RATs in one or more frequencies of the monitored frequency band is determined.

In 1786, the communication device may communicate a first signal during the one or more periods in the more or more frequencies, and communicating a second signal in the frequency band based on the communication of the first signal. For example, the first signal may be a control signal for D2D communications (e.g. Discovery, Transmission Request, Transmission Request Acknowledgement), and the second signal may be a data signal (e.g. D2D data such as user data or the like).

While the above explanation is focused on Bluetooth and Wifi, it is appreciated that the methods and devices disclosed herein may be applied to any other systems by knowing the characteristics of the system and monitoring for and obtaining interference. The characteristics may include, for example, frequency hopping, bandwidth occupancy, maximum duration on a specific channel, etc.

It is quite common for wireless devices to be equipped with one or more radio transceivers capable of supporting multiple radio access technologies (RATs). For example, a wireless device may be configured to support a combination of LTE, Wifi, Bluetooth, GNSS, 5G New Radio (5G NR), etc. RATs and be further configured to support further technologies, such as D2D communications. As a result, in-device coexistence interference between different technologies can present serious problems that may not be able to be removed through the application of filtering techniques.

Many of these technologies, such as in the case of Bluetooth in Wifi, for example, may share the same radio frequency (RF) frontend and antenna, requiring multiplexing mechanisms to ensure the quasi-simultaneous operation. As most technologies are not synchronized with one another, following a fixed time pattern in order to share the resources (i.e. RF frontend) without an additional mechanism to align these specific time patterns among the RATs used to communicate with other devices will lead to resource wasting and system performance degradation.

One problem with the time sharing based solutions, for example, is that switching between RATs creates overhead, e.g. switch-off period of RAT A, guard time to align with RAT B, switch-on for RAT B, potentially CCA/LBT (listen before talk), Automatic Gain Control (AGC) settings, etc., when switching between two different RATs A and B. This may be especially problematic if the technologies performing the time sharing have vastly different transmission durations. For example, some D2D communications may operate with a lower-rate transmission in the order of 25 ms duration while Bluetooth operates with slot lengths of 0.625 ms. Furthermore, if a lower-priority and longer transmission RAT (e.g. D2D) is interrupted frequently by a higher-priority, but short transmission period, RAT (e.g. Bluetooth, Wifi, etc.), the performance of the lower-priority transmission is degraded by more than just the loss of airtime. Besides the aforementioned switching overhead, the interrupted lower-priority receiver suffers further from degraded channel estimation performance. For example, if phase coherency is lost between transmission chunks, channel estimation has to be performed on smaller chunks, thereby losing processing gains when averaging over longer/complete transmissions. In addition, if the interruption occurs on the transmitters side, the receiver might not know which parts are affected and which parts are to be excluded, e.g. from channel estimation.

Another disadvantage of time sharing mechanisms are the potentially uncoordinated interruptions on both ends of a radio link, i.e. at the transmitting device and at the receiving device. When both the transmitting and receiving device have to perform in-device time sharing with other local technologies, the available air time between transmitting device and receiving device is further reduced if the local time sharing is done at different global time instances blocking the link from either the transmitting device or the receiving device side.

In some aspects, the in-device interference and coexistence problems are accounted for by implementing a mechanism that guarantees the proper operation of different RATs and avoids unacceptable impact on wireless device key performance indicators (KPIs), link establishment, and overall user experience. Furthermore, in some aspects, a time alignment protocol may be implemented between communicating wireless devices, thereby ensuring that two or more wireless devices share a common coexistence time pattern.

Previous solutions to mitigate or reduce cross interference between in-device communications included using separate RF frontends and antennas, and then applying cross interference cancellation in the digital and analogue domains as well as ensuring that the respective antennas were decoupled. However, testing showed that current state of the art filter technology cannot provide sufficient interference reduction to enable in-band cross system full duplex operation. Furthermore, such an implementation requires high quality RF component and sophisticated filtering techniques, leading to higher system complexity, costs, and power consumption. Frequency division multiplexing (separating different technologies in the frequency domain) is another commonly used solution and can be very effective in cross technology interference avoidance, but requires the availability of separated available frequency bands as well as separate RF chains with suitable filters, thereby increasing hardware costs. Time division multiplexing is another previous solution, but when it does not consider the dynamic behavior of the different technologies, it can result in severe performance degradation. Furthermore, time scheduling can become very complex, especially when considering that each technology can have multiple operating profiles. For example, a device can be at the same time connected via Will to an access point and via the cellular network (dual connectivity), while having an active Bluetooth link. In the latter case, the device can be used with a host of profiles such as Hands-Free Profile (HFP), Advanced Audio Distribution Profile (A2DP) for streaming stereo music, Basic Printing Profile (BPP), Dial-Up Networking (DUN), Object Push Profile (OPP), among others.

Finally, another previous solution included the enforcement of the coexistence between RATs within a device by a form of a time multiplexing pattern, but this solution does not take into account the interaction between multiple devices. None of these previous solutions were designed to support the dynamic time alignment of resource sharing between coexisting in-device technologies and any other potential paired devices in which a communication flow is occurring resulting in severe performance degradation, and in the extreme case, prevent the communication between different devices due to incompatibility between the time sharing patterns in place at each device.

In some aspects, methods and devices are configured to implement a mechanism that employs both static as well as dynamic time alignment of in-device technologies, allowing them to coexist in the same band, over the same RF frontend, and antennas. Furthermore, the mechanisms and methods described herein allow the dynamic alignment of the coexistence time patterns across different devices so to ensure that communication between these devices is possible with as few wasted resources as possible. The alignment may be performed by allocating reserved resources in the communication protocol on two time scales. One time scale considers the shorter, static gaps that the low-priority technology provides to the high-priority technology where the high-priority technology can schedule short transmission at its own discretion. These static gaps are fixed and identically obeyed by all lower-priority devices. A second time scale accounts for the longer, dynamically allocated time-sharing patterns that are enabled on-demand and where a lower-priority devices signals its pattern to the peer device it communicates with.

Referring back to FIG. 6, a wireless device 102 may be configured to communicate via a plurality of RATs, e.g. D2D 602, Bluetooth 604, and Wifi 606. It is appreciated that wireless device 102 may be configured to communicate via other technologies as well, e.g. legacy RATs (e.g. UMTS, GSM), GNSS, etc. Some of these different technologies may operate in a same frequency band. Therefore, when isolating and operating in the shared band, these technologies may need to share the spectrum with other devices by adapting their medium access activation patterns to their surrounding radio environment, e.g. by transmitting only if no other transmissions are present in the band, reducing interference to and/or from other devices.

When a wireless device 102 is configured to communicate via different technologies, e.g. D2D 602, Bluetooth 604, and Wifi (i.e. 802.11) 606, there are multiple approaches to enable coexistence in order to provide access to a shared frequency band.

Adding another technology, e.g. D2D, to wireless device 102 already configured to operate multiple RATs in a similar frequency band, e.g. Wifi and Bluetooth in the 2.4 GHz band, creates significant challenges in optimizing coexistence algorithms for the new technology with the already in-built technologies. Furthermore, it is common that newly added technologies are given lower priority, in regards to resource use than the existing technologies, and therefore, mechanisms for effectively implementing these newer technologies in wireless devices is desired.

In some aspects, the devices and methods enable the local alignments between all supported RATs of a wireless device by reserving a periodic coexistence resource in the local frequency and time resource grid in the communication protocol of the technology with the lower priority (e.g. D2D). This coexistence resource is then used by the higher priority technology (e.g. Wifi or Bluetooth) in scheduling its transmissions. In this manner, the transmissions of all the technologies are aligned and each technology can optimize their air time and coexistence algorithms in order to meet desired performance requirements.

FIG. 18 shows diagrams 1800 and 1850 illustrating the reservation of resources for global time alignment between different technologies according to some aspects. It is appreciated that diagrams 1800 and 1850 are exemplary in nature and therefore may be simplified for purposes of this explanation.

As shown in diagram 1800, the high priority technology may reserve a fixed duration and position of the resources (i.e. light shaded areas) for global alignment between the multiple in-built technologies, while leaving the remaining resources (i.e. dark shaded areas) for the communication protocols of the technology with lower priority.

As shown in diagram 1850, the high priority technology may also reserve resources with a flexible duration and position, for example, based off the higher priority's resource usage profile, while leaving the remaining resources for the communication protocols of the technology with lower priority. The high priority technology may take up the entire duration of its allocated resources, or it may leave some of the resources unused (as indicated by the dashed line area in 1850).

The number and duration of the coexistence resource(s) can be adjusted based on the technology profile that conflicts with the technology of low priority, scenario, channel quality, or based on applications. When a device needs to communicate with a peer device, it has to ensure that the local resources reserved for in-device coexistence are time and frequency aligned with its peers. This time alignment can be made implicitly or explicitly.

Implicit resource alignment is sufficient for the case where the local coexistence resources, which through system design, have a common fixed duration and position across all devices, as depicted in 1800. Namely, the synchronization procedure—which is a pre-requisite for these devices to be able to communicate with each other—is sufficient to ensure the coexistence resource alignment.

Figure 19:
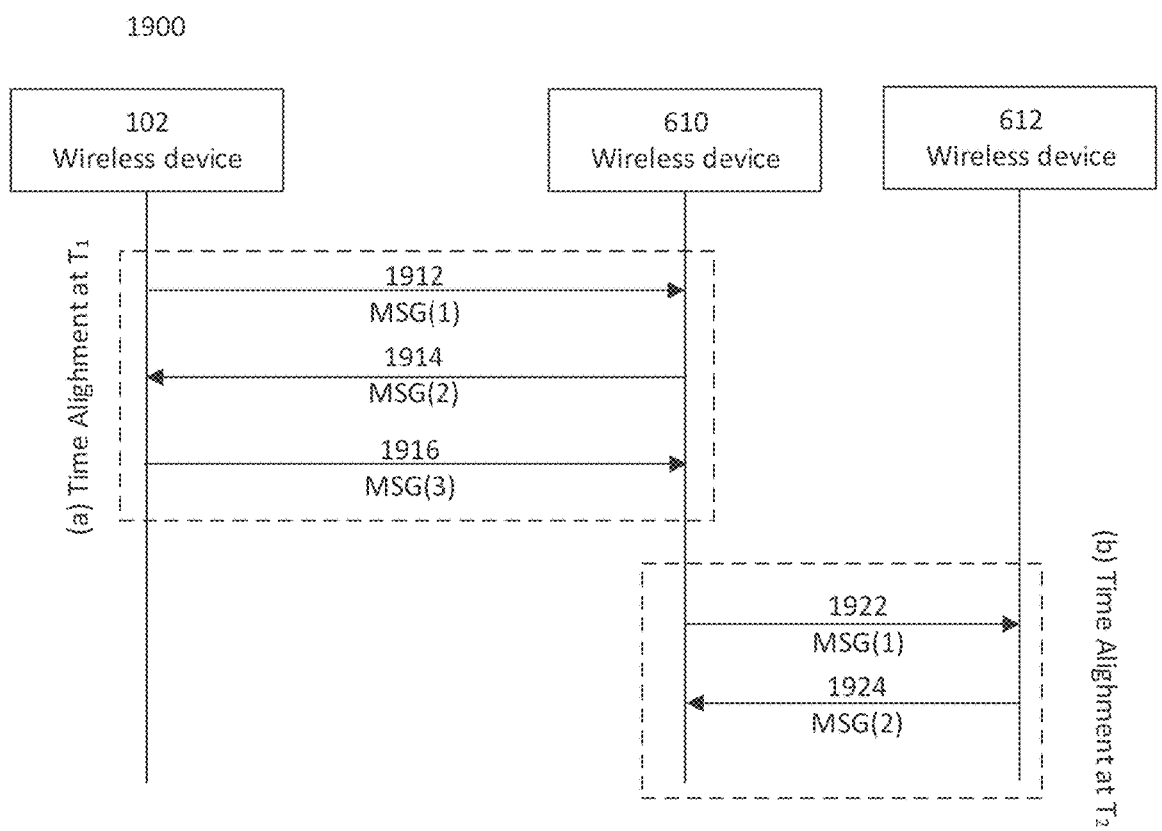
FIG. 19 shows an MSC illustrating exemplary time alignment signaling between different peers with a three-step handshake alignment (a) and a two-step handshake alignment (b) according to some aspects.

Explicit resource alignment is required for the case where the local coexistence resources have a flexible duration and position, as depicted in diagram 1850. This flexibility is in practice limited to a number of possible configurations, which would denote the position and duration of these resources reserved for coexistence. In this setting, it is necessary for the devices to perform an explicit resource alignment either via a three-step or a two-step handshake signaling procedure as illustrated in FIG. 19. This signaling procedure can be made ad-hoc or can it can be built into the signaling flows associated with the establishment of a communication link between devices.

FIG. 19 shows an MSC 1900 illustrating exemplary time alignment signaling between different peers with a three-step handshake alignment (a) and a two-step handshake alignment (b) according to some aspects.

In the case of the three-step handshake shown in (a), the transmitter decides which coexistence configuration should be used, from the valid ones. The role of the exchanged messages in (a) is: in 1912 MSG(1)—wireless device 102 discloses to wireless device 610 what its current coexistence configuration is and which other coexistence configurations it can support; in 1914 MSG(2)—wireless device 610 discloses to wireless device 102 what its current coexistence configuration is and which other coexistence configurations it can support; and in 1916 MSG(3)—wireless device 102 informs wireless device 610 of the configuration chosen from the information exchanged in MSG(1) and MSG(2).

In the case of the two-step handshake shown in (b), the receiver decides which coexistence configuration should be used from the configurations proposed by the transmitter. This alignment method may be required to ensure compatibility when a device is communicating with multiple peers. The role of the exchanged messages in (b) is: in 1922 MSG(1)—wireless device 610 discloses to wireless device 612 what is its current coexistence configuration and which other coexistence configuration it can support; and in 1924 MSG(2)—wireless device 612 informs wireless device 610 of the valid coexistence configuration.

When the peer wireless devices are not able to find a compatible coexistence configuration, the wireless devices may still use the exchanged information to proactively prevent the resulting performance degradation, i.e. the transmission/reception mismatch. For example, some of these proactive approaches may include, but are not limited to, resource blanking and rate matching.

In the case the coexistence conditions change at any one of the wireless devices, the alignment procedures may be performed again so that the coexistence configurations are updated. The following exemplary explanation provides a coexistence solution for Bluetooth and D2D in a shared frequency band (e.g. 2.4 GHz), but it is appreciated that other wireless technologies (e.g. Wifi, 5G NR, etc.) may also be included in coexistence solutions for technologies operating on a shared resource.

A wireless device that is Bluetooth-enabled performs a number of different periodic Bluetooth transmissions even if there is no active on-demand Bluetooth activity, such as music streaming, hands-free communication via headset, data transfer to wearables etc., being performed. For example, each Bluetooth-enabled wireless device performs a scan for incoming pagings from another Bluetooth device. This page scan is usually performed every 1.28 seconds for a small duration, e.g. 10 to 20 milliseconds. Another task that Bluetooth Low Energy (LE) devices have to perform is transmitting advertisements that consist of short transmissions (2 to 8 ms) which are sent in intervals ranging from 20 ms to 10.24 seconds. Furthermore, a wireless device may periodically exchange keep-alive packets with one or multiple wearable accessories. Taking together, these background Bluetooth tasks account for a duty cycle of about 10%.

In order not to have these frequent but short transmissions interrupt a D2D transmission multiple times, a D2D slot and frame structure is implemented that provides static "lump sum" transmission gaps for these Bluetooth background transmissions. The time share of these static gaps is chosen to be slightly larger than the expected aggregated duty cycle of all background transmissions. Since the gaps are static, the D2D configured devices which are globally synchronized to the same time grid can locally provide these gaps at the same time meaning that the remaining D2D slot/frame durations are globally free from Bluetooth background transmissions. This arrangement reduces the implementation complexity because no case-by-case in-device coordination between Bluetooth and D2D nor any inter-device signaling is required. It also retains scheduling flexibility for Bluetooth communications since the manner in which the different Bluetooth transmissions are time-multiplexed into the static Bluetooth gaps is completely up to the Bluetooth enabled devices.

Note that merging all Bluetooth transmissions from D2D enabled devices into the same globally synchronized gaps would concentrate and thus increase the Bluetooth interference level in congested deployments. However, Bluetooth naturally separates different devices by device-specific frequency hopping patterns. Furthermore, the ability to locally select the exact timing with the gaps allows the Bluetooth transmitters a certain extent of randomization in the time domain.

Depending on the timing requirements of the Bluetooth background transmissions, different static coexistence patterns can be chosen.

Figure 20:
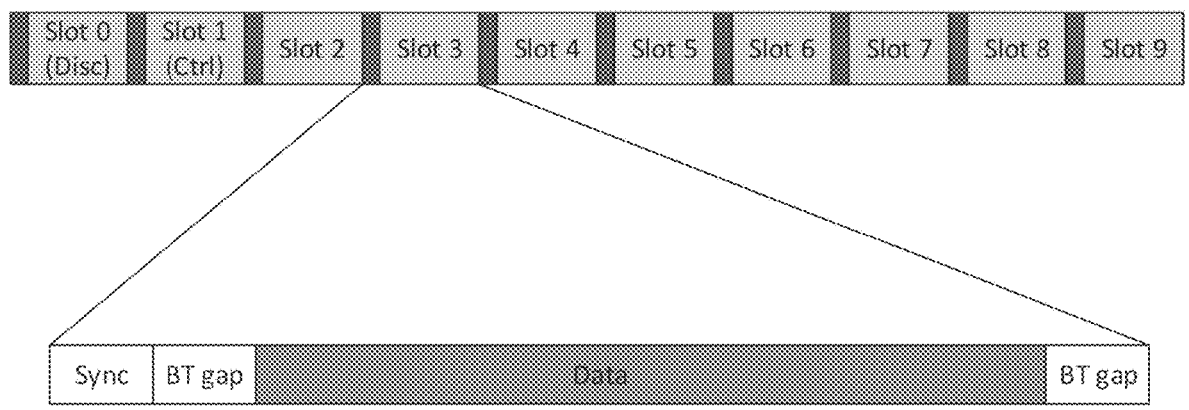
FIG. 20 shows an exemplary coexistence structure on the slot level according to some aspects.

FIG. 20 shows an exemplary coexistence structure 2000 on the slot level according to some aspects. A D2D frame consisting of 10 slots is shown at the bottom. The first slot in each frame may be devoted to Discovery (Disc) and the second slot in each frame may be devoted to Control (Ctrl) signaling, for example. The remaining 8 slots may include a synchronization (Sync) burst and a D2D data transmission burst and two static other RAT, e.g. Bluetooth (BT), gaps that are placed in between these two transmission types in order to align the Bluetooth background transmissions in a way that D2D data transmissions do not need to be interrupted by them (shown in expanded view of Slot 3 at the bottom).

FIG. 21 shows exemplary frame structures 2100 and 2150 for coexistence at the frame level according to some aspects. Frame structures 2100 and 2150 provide an alternative allocation of static Bluetooth gaps that target a similar duty cycle as the slot-based approach shown in FIG. 20 by statically allocating either a complete slot or two half slots per D2D frame to Bluetooth and leaving the remaining slots for D2D data communications. Frame structures 2100 and 2150 may be better suited for coexistence if the Bluetooth background transmissions are less frequent and/or need longer continuous transmission times. The frame level Bluetooth gaps can further alternatively or additionally also be used by other technologies such as WiFi transmissions, which also feature typical transmission durations that are much shorter than D2D slots.

In situations where both short but frequent Bluetooth transmissions (such as a single Bluetooth slot every 20 to 50 ms) and longer duration transmissions such as 10 ms scans have to be accommodated, another structure may be implemented: D2D could provide frame-level static Bluetooth gaps similar to those shown in FIG. 21 to accommodate all Bluetooth background tasks except for the very short and frequent single-slot transmissions. The latter could be punctured into the D2D data transmissions in a way that, for example, the Bluetooth interruption falls in between demodulation reference (DM-RS) reference symbols transmitted by single-tone (control) channels. That way, the D2D channel estimation is not affected and only the directly punctured bits are lost while Bluetooth can choose from a plurality of different timing locations per slot.

In addition to Bluetooth background traffic, there may be multiple on-demand Bluetooth transmissions for active communications, e.g. audio streaming, hands-free, etc. Depending on the type of active Bluetooth communication, the coexistence alignment mechanism with D2D may be modified such that a frame structure is implemented for effectively communicating via the multiple technologies.

Figure 22:
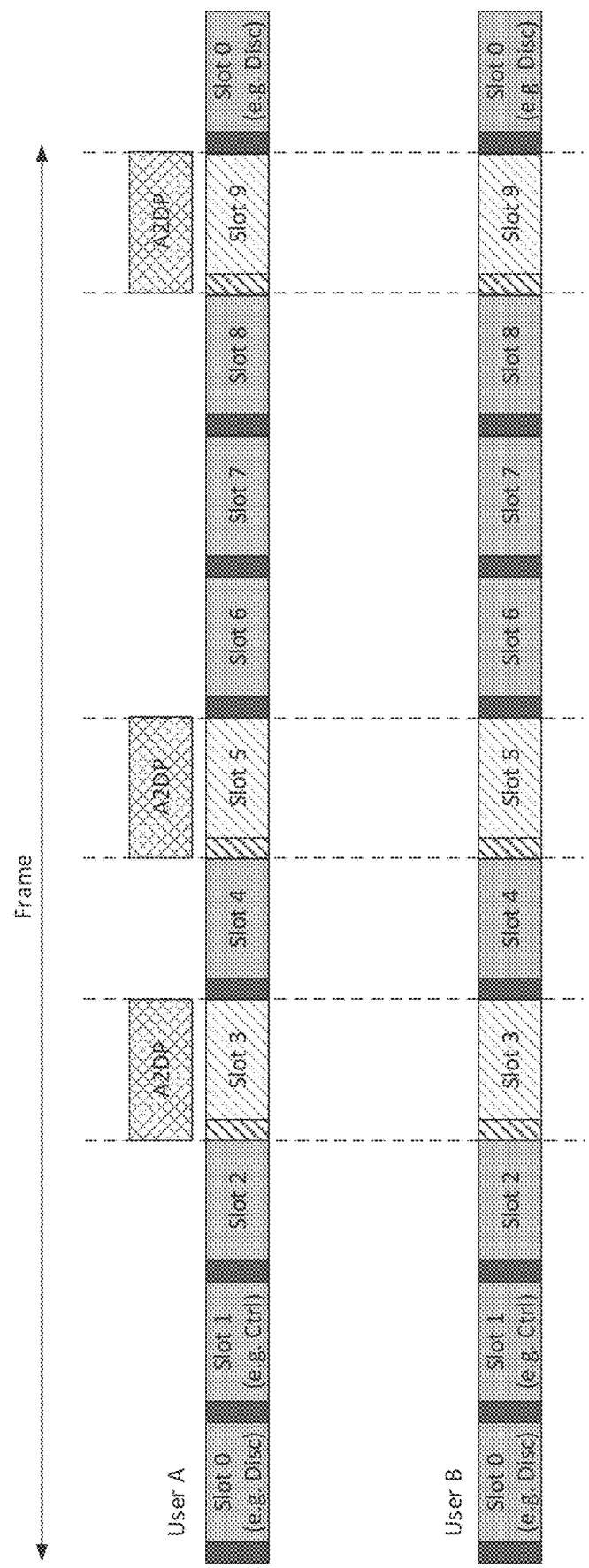
FIG. 22 shows an exemplary coexistence frame structure according to some aspects.

FIG. 22 shows an exemplary coexistence frame structure 2200 according to some aspects. While frame structure 2200 shows D2D coexistence with A2DP for audio streaming, it is appreciated that the frame structure can be modified depending on the type of other RAT communication profile, e.g. Bluetooth profile, which is active.

In frame structure 2200, a D2D frame across Users A and B is shown being overlaid by A2DP transmissions that span an entire slot duration, e.g. 30 ms. As shown in 2200, there are 3 A2DP transmissions, each spanning a slot (Slots 3, 5, and 9) across the entire frame. The mapping of A2DP to D2D slots is performed in a globally fixed way so that if Users A and B both have active A2DP connections, they would locally stream to their accessories during the same time slots, thereby maximizing the air time made available for D2D communications between Users A and B.

The mapping of the A2DP gaps to the D2D frame structure is done in a way so that the control slots (i.e. discovery (Disc) and control (Ctrl)) are not affected. Instead, the A2DP gaps are allocated to so that only some D2D data communication slots are blocked. This allows the users that initiate an iD2D data connection via these control slots to signal their individual dynamic frame-level coexistence configuration. In case any of the two users has, e.g., an active A2DP transmission configured, the users would use the remaining slots (slots 2, 4, 6, 7, 8 in the example). In case they determine that neither of them has such a conflict, they are free to use all slots for D2D data communications.

Figure 23:
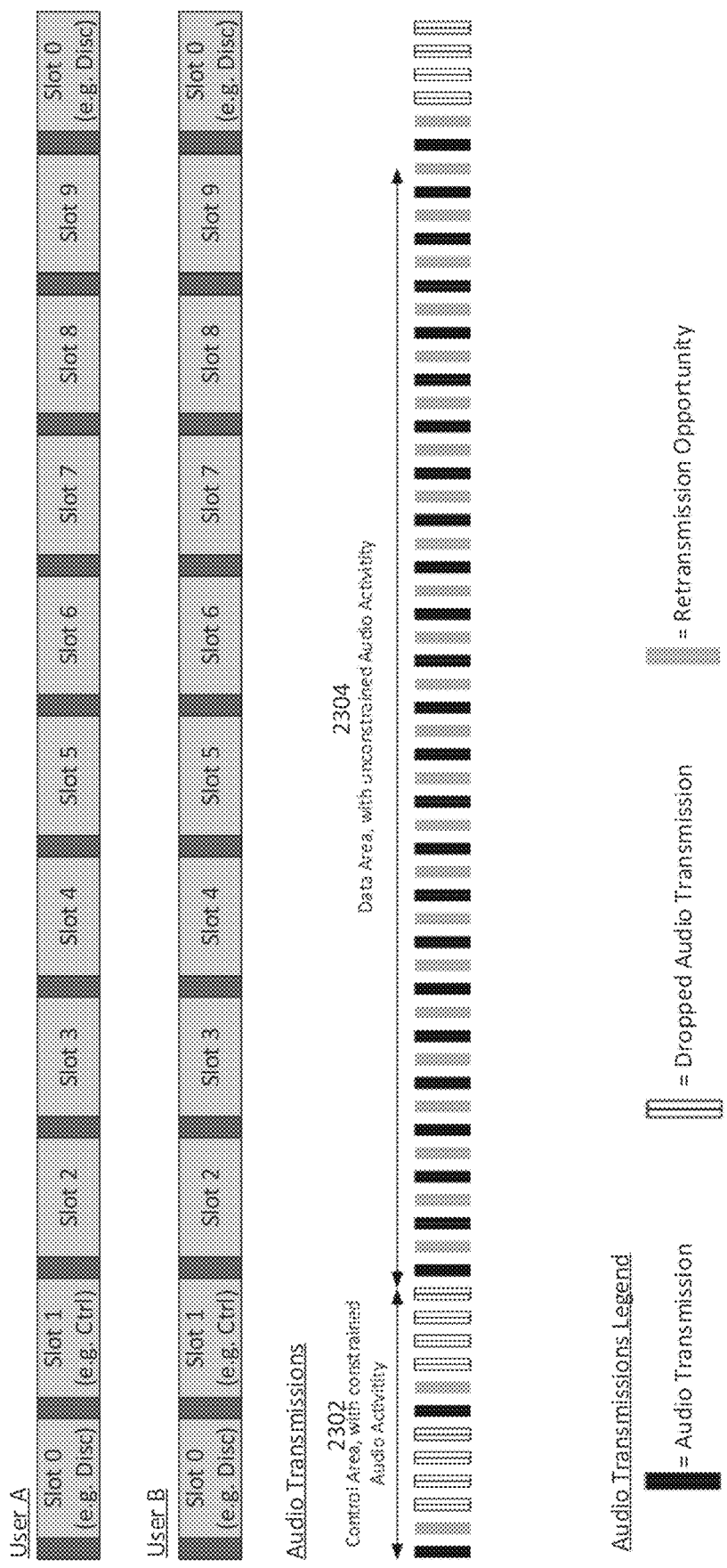
FIG. 23 shows an exemplary coexistence frame structure according to some aspects.

FIG. 23 shows an exemplary coexistence frame structure 2300 according to some aspects. While frame structure 2300 shows D2D coexistence with on-demand BT traffic, it is appreciated that the frame structure can be modified depending on the type of other RAT, e.g. the type of Bluetooth profile which is active.

In the case of on-demand Bluetooth traffic where the transmissions are characterized by short transmission bursts that occur periodically, such as the audio transmissions shown at the top of the figure, then some care needs to be taken to ensure that the more critical parts of the D2D (i.e. the control channels in Slot 0 and Slot 1) are not too degraded. In FIG. 23, a case is depicted where the Audio activity is constrained to have a reduced number of transmissions opportunities during the control slots 2302; while during the data slots the Audio transmissions can occur as expected 2304. Furthermore, the audio transmissions that do occur during the control slots are transmitted during the Sync and/or Bluetooth gaps (the darkened gaps prior to Slot 0 and Slot 1 for Users A and B), while the other transmissions are dropped.

FIG. 23A shows a flowchart 2350 illustrating a method for a communication device to perform wireless communications according to some aspects. It is appreciated the flowchart 2350 is exemplary in nature and may therefore be simplified for purposes of this explanation.

In 2352, the method includes determining a first resource requirement needed to communicate via a first Radio Access Technologies (RAT) and a second resource requirement needed to communicate via a second RAT, wherein the first RAT has a higher priority to a resource set than the second RAT. For example, each respective resource requirement may include time allocated to a shared antenna of the communication device, wherein the first RAT and second RAT both use the shared antenna. The first RAT may be at least one of Wifi or Bluetooth and the second RAT may be D2D wireless communications, wherein both the first RAT and the second RAT operate in a shared frequency band.

In 2354, the method includes allocating a first subset of the resource set to the first RAT based on the first resource requirement and a second subset of the resource set to the second RAT based on the second resource requirement, wherein the first subset and the second subset are aligned to minimize interruptions in communications of the second RAT due to the first RAT.

Since the 2.4 GHz ISM band was released for Wifi technology use more than 20 years ago, the band has become overcrowded with billions of existing Wifi devices. Additionally, other wireless technologies such as Bluetooth have been widely used in 2.4 GHz together with many other consumer products such as microwave ovens, cordless phones, baby monitors, garage door openers, etc. In such heterogeneous networks where a wide variety of systems are sharing a similar frequency spectrum, interference is a major limitation and if it is not properly managed it can limit the capacity that a system can achieve.

To ensure a fair use of the spectrum resources, numerous requirements and regulations are imposed by national and international organizations for the 2.4 GHz ISM band. For this reason, the generation and transmission of radio waves is strictly regulated by national laws which are coordinated by international organizations such as Federal Communications Commission (FCC), Inter-American Telecommunication Commission (CITEL), International Telecommunication Union (ITU), and the European Telecommunications Standards Institute (ETSI). According to some aspects, a D2D technology may be configured to operate with certain transmit powers, e.g. about 20 dBm, and require each device to perform Listen-Before-Talk (LBT) before transmitting a signal in order to determine if the channel is occupied or clear. Wifi devices operate on an asynchronous protocol and access the wireless medium using the Carrier Sense Multiple Access/Collision Avoidance (CSMA/CA) mechanism while Bluetooth devices use the wireless medium in a slotted manner.

With D2D technology enabled in the wireless devices using Wifi and Bluetooth ("triple-mode" device), coexistence has become a complex challenge. A device can be connected via Wifi to an access point and via the cellular network. With built-in Bluetooth, the same device can also be used with a host of profiles such as Hands-Free Profile (HFP), Advanced Audio Distribution Profile (A2DP) for streaming stereo music, Basic Printing Profile (BPP), Dial-Up Networking (DUN), Object Push Profile (OPP). And, with D2D technology, the same device can be used for long range communication and Push-to-Talk (PTT) applications. Additionally, due to the size and cost constraints, some wireless technologies, such as D2D technology, may need to share the same antenna with both Wifi and Bluetooth technologies. As a result, the three communication protocol transceivers have limited wireless access time to avoid packet collisions.

In some aspects, a Physical (PHY)-level approach is introduced providing a more spectral-efficient scheme in coexistence scenarios than existing Media Access Control (MAC)-level approaches. A flexible communication protocol that copes with regulatory requirements and handles coexistence scenarios in 2.4 GHz or any other shared frequency band is introduced. The mechanisms discussed herein limit interference between a first technology, e.g. a D2D technology, and other systems built-in on the same device and operating in a similar frequency spectrum, e.g. Wifi and Bluetooth in the 2.4 GHz band.

The 2.4 GHz frequency band may be used by a variety of wireless technologies, e.g. Bluetooth, Wifi, ZigBee, and Z-wave, which are range-limited. This range for such technologies, for example, may be in the order of 100 m. While supporting direct type of communications between devices, these technologies don't support the range and/or bandwidth requirements that D2D technologies may support. For example, Wifi technology enables fragments of larger data units but this is handled at the MAC level and it requires a Cyclic Redundancy Check (CRC) at each segment.

In some aspects, methods and devices are configured to communicate via a flexible frame structure that, in conjunction with a pre-negotiated blanking pattern, preemptively prevents collisions between "competing" technologies using a shared frequency band. As described herein, a frame is composed of slots, and these slots may be further divided into mini-slots. In some aspects, the duration of these mini-slots may be a multiple of the minimum duration of the coexisting technologies so that the time grid of technologies sharing the spectrum and antenna can be aligned with minimum performance losses for the least prioritized technology which is blanked following the pre-negotiated pattern.

As shown in FIG. 6, a first wireless technology, e.g. D2D, may operate in the same frequency band as other wireless technologies, e.g. Bluetooth and Wifi, and may further share a same transmit antenna and other transmit components, e.g. LNA, with these other wireless technologies. Accordingly, in some aspects, a system which operates in an adaptive mode, i.e. it adapts its medium access to the radio environment by identifying other transmissions present in the medium. This may be achieved with a mechanism that performs Clear Channel Assessment (CCA) checks, which may also be denoted as Listen Before Talk (LBT).

Figure 24:
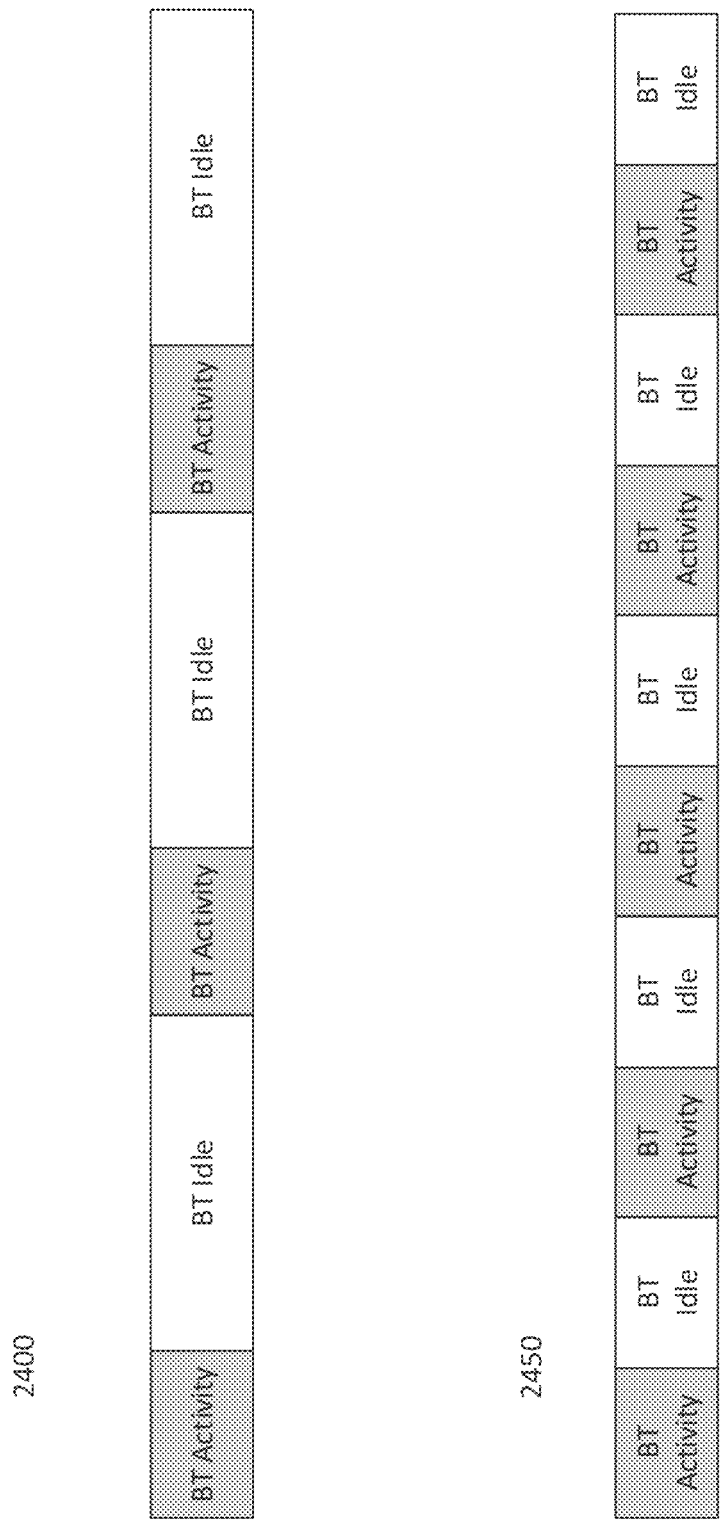
FIG. 24 shows an exemplary frame structures for coexistence of air-time activity between two RATs according to some aspects

FIG. 24 shows an exemplary frame structures 2400 and 2450 for coexistence of air-time activity between two RATs, e.g. D2D with Bluetooth A2DP profiles, according to some aspects. As shown by frame structures 2400 and 2450, A2DP Bluetooth activity is characterized by relatively long periods of activity. In frame structure 2400, for example, the length of each period of A2DP Bluetooth activity may be less than the ensuing (or preceding) period of A2DP Bluetooth idle mode. For example, this may include activity periods which are half the time of the idle periods, e.g. about 33 ms Bluetooth activity for about 66 ms Bluetooth idle for every 100 ms. In frame structure 2450, the periods of A2DP Bluetooth activity and idle time may be equivalent, e.g. periods of each of 20 ms, 30 ms, 40 ms, 50 ms, etc, in length.

Figure 25:
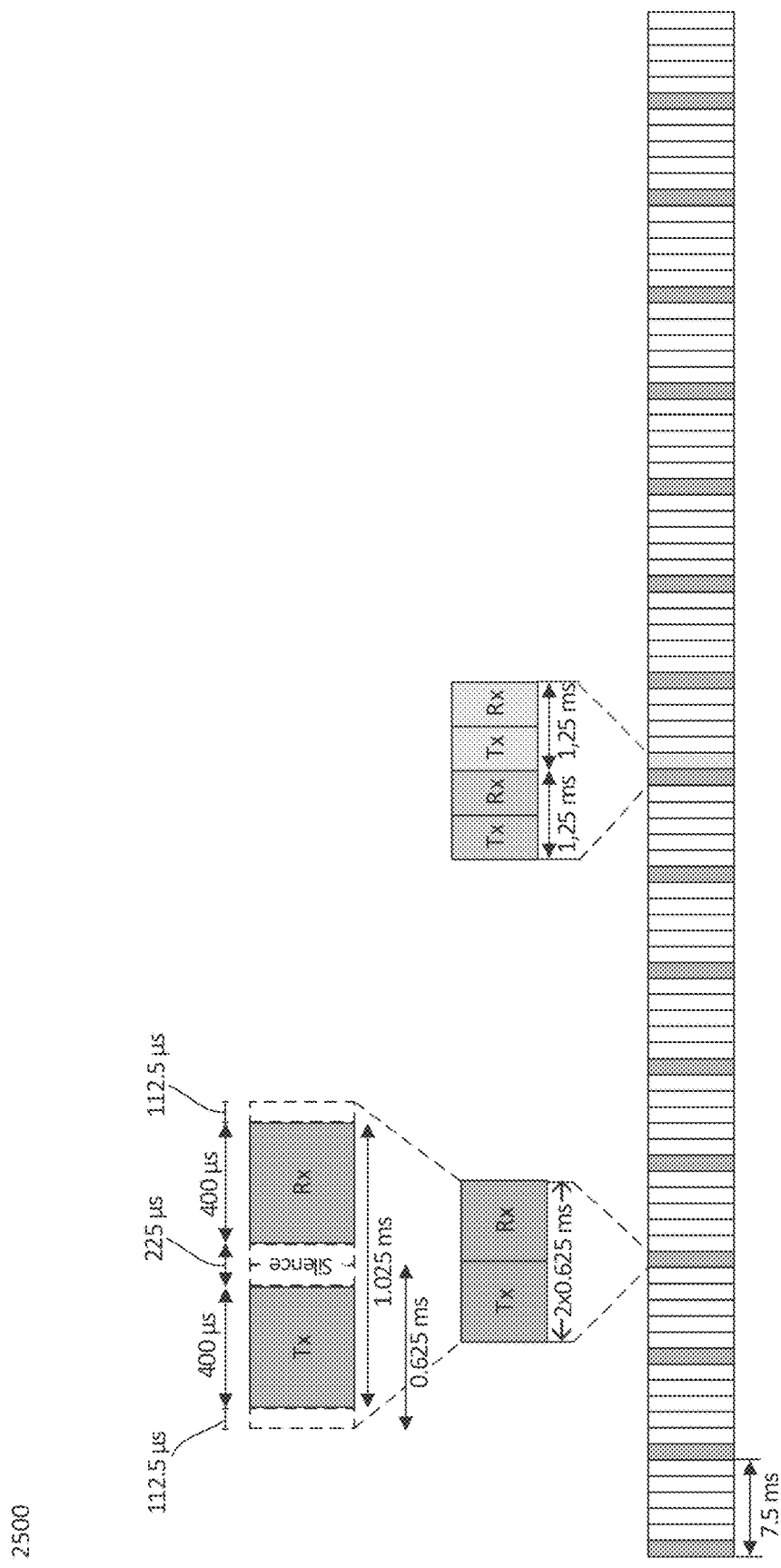
FIG. 25 shows an exemplary frame structure for coexistence of air-time activity with another RAT profile according to some aspects

FIG. 25 shows an exemplary frame structure 2500 for coexistence of air-time activity of a first RAT with a second RAT, e.g. D2D with a Bluetooth HFP profile, according to some aspects. As shown in FIG. 25, frame structure 2500 may include shorter periods of Bluetooth activity when compared to the Bluetooth activity structure associated with A2DP shown in FIG. 24.

As shown in frame structure 2500, the Bluetooth HFP activity is characterized by short periods of activity that occur periodically. Namely, each Bluetooth slot has a duration of 0.625 ms, where 0.1125 ms are idle, 0.4 ms are either transmission or reception and the remaining 0.1125 ms are idle. A Bluetooth transmission is characterized by 1-5 Tx slots and 1 Rx slot per packet. Retransmissions may lead to the use of further slots.

Figure 26:
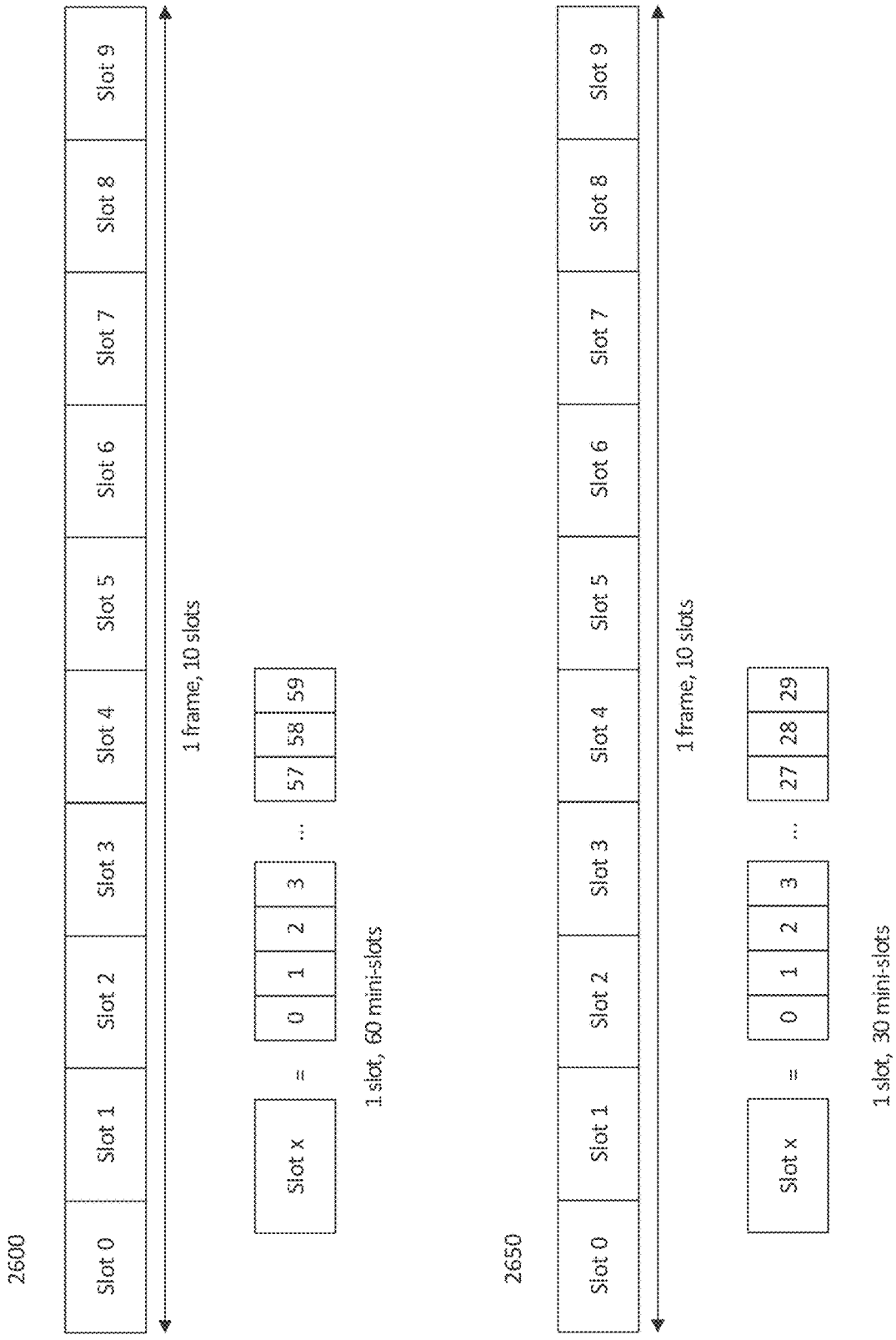
FIG. 26 shows two exemplary frame structures according to some aspects.

In some aspects, methods and devices are configured to communicate via frame structures designed to facilitate and improve coexistence between multiple wireless technologies sharing a same frequency spectrum. This may include a frame structure composed of slots, wherein the slots are composed of minislots. The duration of these minislots may be determined based on a minimum duration of an activity profile associated with one of the supported wireless technologies. For example, the duration of the minislots may be a multiple of the Bluetooth HFP profile slot durations (0.625 ms), i.e. the minislots' duration is k*0.625 ms, where k is a scaling factor greater than or equal to 1. FIG. 26 shows two exemplary frame structures 2600 and 2650. In frame structure 2600, k=1 and the frame slots are composed of 60 minislots, and in frame structure 2650, k=2 and the frame slots are composed of 30 minislots.

These minislots allow for the adaptation of air-time of a D2D technology so that the D2D technology can coexist with different Bluetooth profiles. This adaptation may be achieved by muting the D2D technology at either the minislot level or at the slot level depending on the Bluetooth profile.

When the muting at the slot or the minislot level is fixed for a relatively long period (typically above 1 frame), coordination between two wireless devices may be feasible so as to ensure that both devices are aware when resources are muted or active. When there is a broadcast/multicast communication, the transmitting device may inform which of the slots/minislots will be muted so that these slots/minislots may be used to communicate via other technologies if needed.

FIG. 27 shows exemplary MSCs 2700 and 2750 illustrating signaling exchanges for communicating muting configurations in unicast communications and broadcast/multicast configurations, respectively, according to some aspects.

In the unicast configuration, the transmitting device (Tx) 2702 may first send one muting configuration or more muting configurations 2712 to the receiving device (Rx) 2704, which may respond in 2714 with either with an acknowledgement type message or a selection of one of the muting configurations it received in the prior message (i.e. 2712) so that the muting configuration between the two devices is synchronized.

In the broadcast/multicast configuration, the transmitting device (Tx) 2752 sends the muting configuration 2762 to a plurality (i.e. two or more) receiving devices 2754-2756.

These signaling exchanges can be dedicated just for muting configurations or they can be part of more general signaling flows, e.g. such as when establishing a connection. In other words, the muting configuration signals shown in MSCs 2700 and 2750 ca be piggy-backed on a more general signaling payload.

When the resource muting configuration is known in advance on both sides, i.e. the transmit and receive sides, then the transmitting device can rate-match around the muted resources and the receiver is aware which resources (slots, mini-slots) to use in its decoding. When the resource muting is not known in advance (e.g. due to unforeseen BT retransmissions), then the transmitting device might be not be able to rate-match around the muted resources. In this scenario, the receiving device can partially recover data from the missing resources through a combination of forward error correction (FEC) and hybrid automatic repeat request (HARQ).

To illustrate the coexistence methods between multiple technologies according to some aspects of this disclosure, the following explanation will use Bluetooth and D2D technologies. However, it is appreciated that other technologies, e.g. Wifi, ZigBee, and Z-wave, 5G NR, etc., are also included within the scope of this disclosure. A key feature for implementation across multiple technologies, generally speaking, is a determination of the transmission profiles of the other technologies and accommodating accordingly so that these other transmissions do not impact, or at least reduce the impact on, the control slots (e.g. discovery and control slots) of the first technology, e.g. D2D.

FIG. 28 shows exemplary frame structures 2800 and 2850 illustrating the distribution of control and data slots across a frame in D2D communications according to some aspects.

In order to allow the coexistence between the A2DP and Bluetooth Low Energy (BLE) profiles and D2D technology on a shared frequency spectrum, the data and control slots are organized in such way that the muting of one or more of the slots does not impact the control slots, as depicted in frame structure 2800. This is of critical importance, as the successful transmission/reception of the control slots is an essential prerequisite condition to the use of the data slots. As shown in frame structure 2800, one way to implement such a mechanism is to arrange the muting only in the odd numbered slots so that the muting does not impact the transmission of the control slots (e.g. discovery channel, transmit control channel, and/or receive control channel) since all control slots are located in even slots within the frame, e.g. Slot 0, Slot 2, Slot 4. The data slots in Slots 1 and Slots 3, i.e. the slots with a *, may be scheduled for use from the control slots from the previous frame. In FIG. 28, the frames labeled "Disc." indicate a discovery channel frame and the "Ctrl" indicates either a transmit control channel frame or a receive control channel frame.

When this coexistence mechanism is not required, then the data slots in slot 1 and 3 may be used based on the control signaling from the previous frame, as shown in frame structure 2850.

Figure 29:
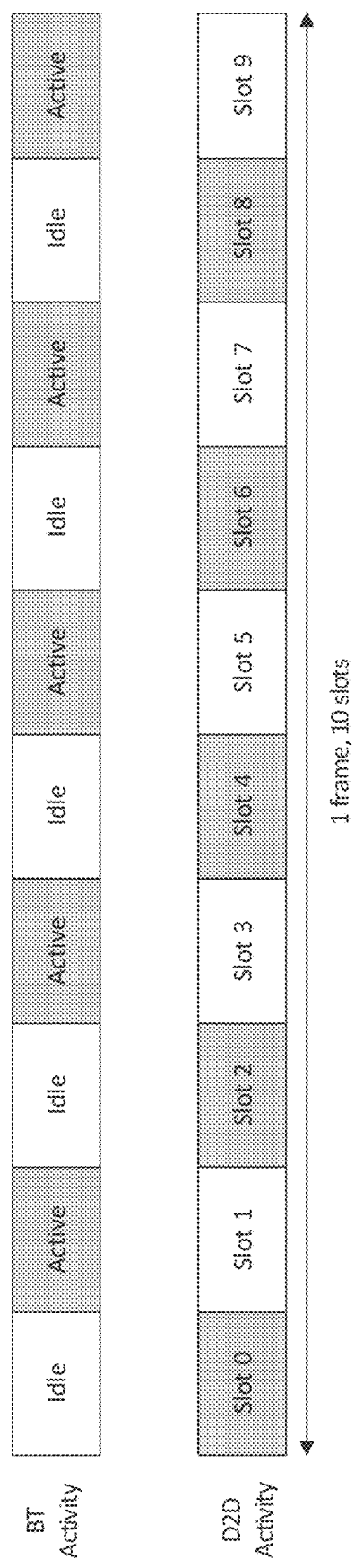
FIG. 29 shows an exemplary frame structure illustrating a muting configuration according to some aspects.

Whenever the Bluetooth profile is active (e.g. A2DP, BLE, etc.), the methods and devices may be described to mute a specific configuration of slots, i.e. muting is done at the slot level. FIG. 29 shows an exemplary frame structure 2900 for such an implementation according to some aspects. As shown in 2900, the D2D activity is muted in the odd numbered slots (light shading) and active in the even numbered slots (dark shading) in the bottom frames. Conversely, the Bluetooth (BT) activity may be idle during the time corresponding to the even numbered slots of D2D activity, and active during the time corresponding to the odd numbered slots of D2D activity.

As described in FIG. 29, coexistence according to some aspects may be performed at the slot level depending on the profile of the other wireless technology profile, e.g. Bluetooth A2DP. However, in some aspects, coexistence may also, or alternatively, be performed at the minislot level.

Figure 30:
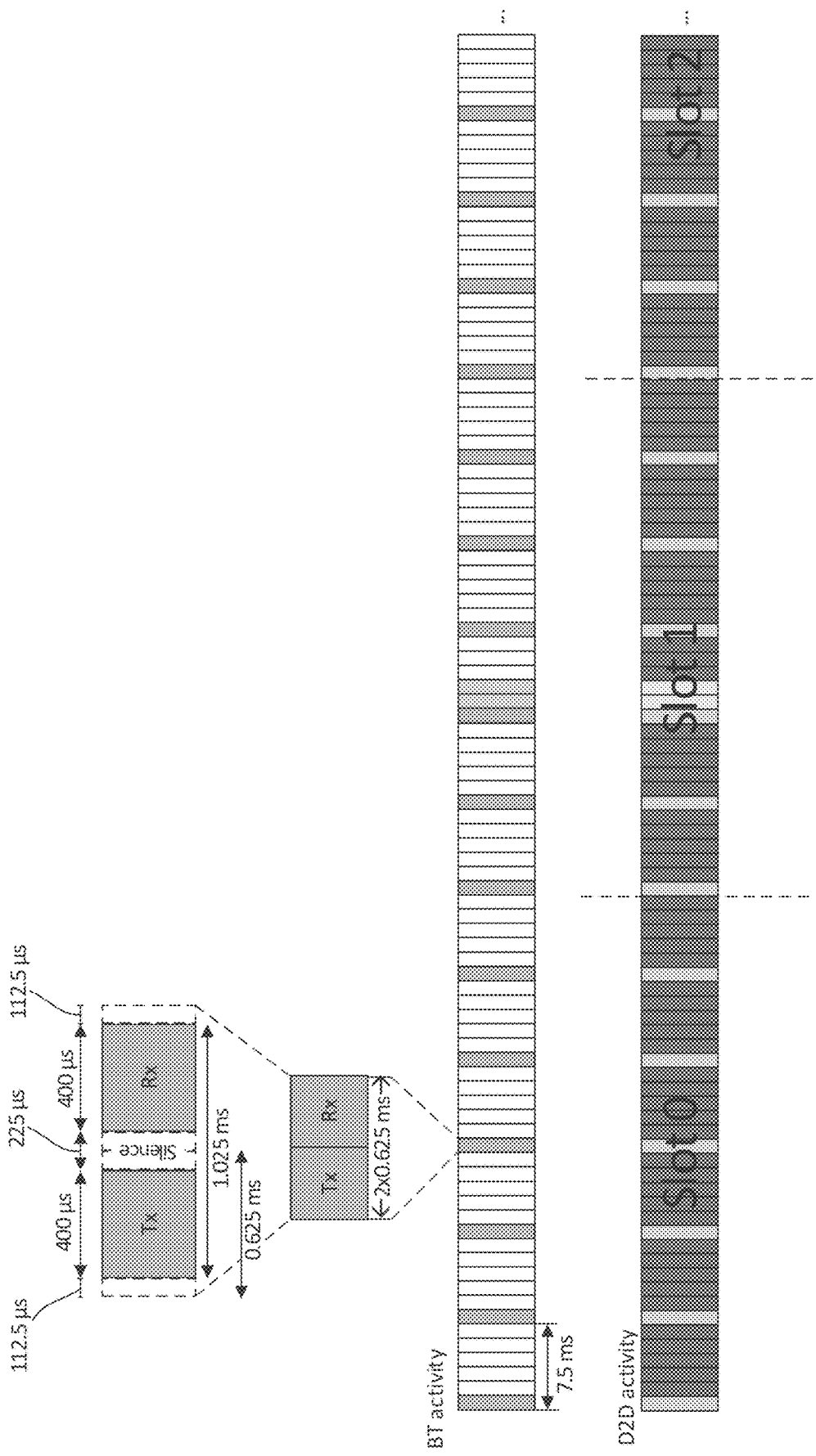
FIG. 30 shows exemplary frame structures for the activity for two RATs with muting done at the minislot level according to some aspects.

FIG. 30 shows exemplary frame structures for the activity for two RATs, e.g. Bluetooth (BT) activity and D2D activity, with muting done at the minislot level according to some aspects. The darker shaded slots in each of the frames showing BT and D2D activity are intended to show data transmission in the according technology. The transmitter and receiver can cope with the performance degradation due to the muting of the minislots according with the approached previously described.

In addition to using, for example, the Bluetooth slot length of 0.625 ms for the mini-slot length of the D2D technology, an alternative is to define D2D minislots to fit into the gaps between the HFP Bluetooth transmissions. Assuming a Bluetooth slot pair duration of 1.25 ms and further guard times for switching between Bluetooth and D2D communications, the minislots in the D2D frame structure could be defined with a length of 6 ms, which would then also be compatible with a 30 ms duration of a normal slot.

Figure 31:
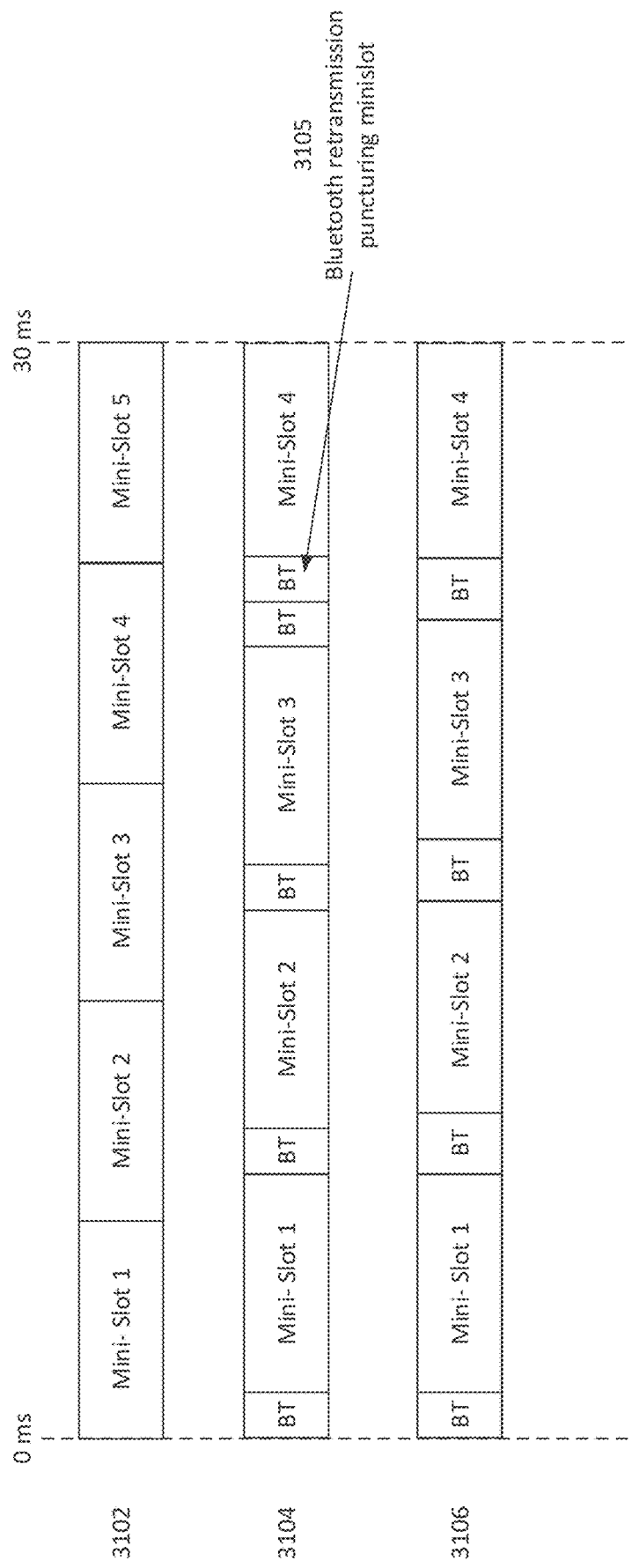
FIG. 31 shows exemplary frame structures showing coexistence according to some aspects.

In FIG. 31, exemplary frame structures showing the coexistence between Bluetooth and 6 ms multi-tone mini slots is shown according to some aspects. In case no Bluetooth coexistence is required, 5 mini slots a 6 ms could be placed inside a 30 ms normal slot as shown in 3102. If the Bluetooth coexistence is known to at both the Tx and Rx, the number of mini slots can be reduced to 4 while placing a Bluetooth Tx and Rx pair, as well as some guard times, in between each of the minislots as shown in 3104. Since Tx and Rx know about the interruptions, the coded bits for transmission can be rate-matched around the Bluetooth gaps so that a higher code rate can be used because no coded bits get lost due to the Bluetooth transmission. Also shown in 3104 is an optional, additional Bluetooth retransmission slot 3105, i.e. the last BT transmission slot shown in 3104.

In some aspects, the minislots may be feasible for multi-tone transmissions. For single-tone transmissions, as shown in 3106, no subdivision into mini-slots may be feasible so that, for example, the legacy control transmissions which are always done in single-tone, would have to be punctured. Accordingly, this would mean that for the time of the Bluetooth interruption, a transmitter would not send the coded bits belonging there and/or a receiver would not be able to receive that part of the coded bit stream. The loss of these bits would have to be recovered by a lower overall channel code rate that allows to recover these punctured bits. In case Bluetooth needs to perform a retransmission, i.e., in case it uses more than 1 Tx/Rx pair in a row, this additional air time would then also lead to puncturing of a multi-tone mini slot.

Figure 32:
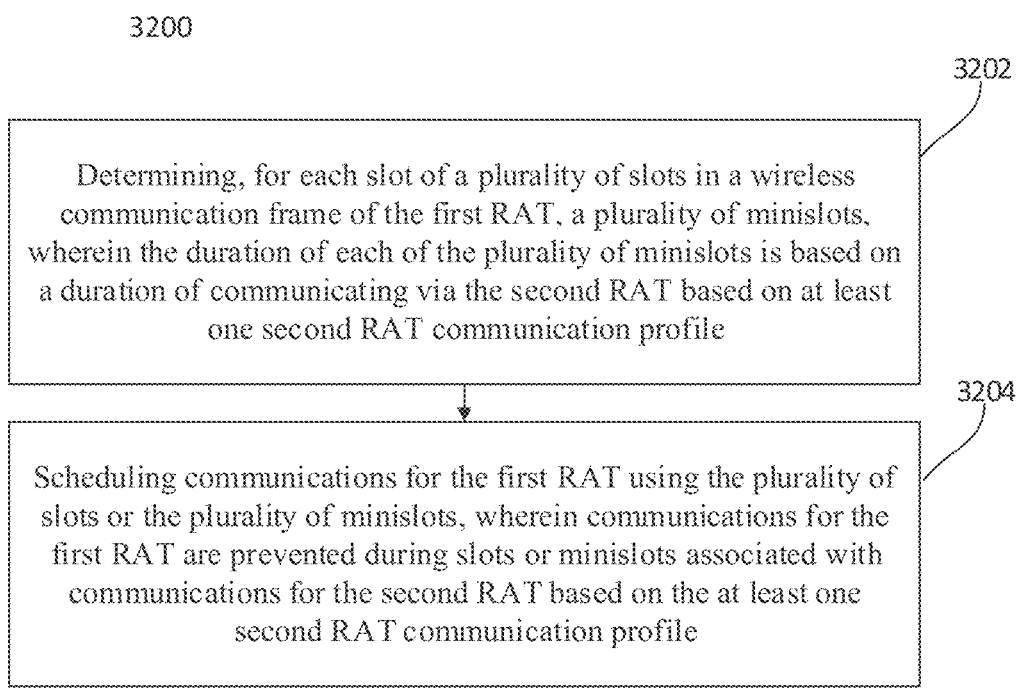
FIG. 32 shows a flowchart illustrating method to perform wireless communications according to some aspects.

FIG. 32 shows a flowchart 3200 illustrating method to perform wireless communications according to some aspects. It is appreciated the flowchart 3200 is exemplary in nature and may therefore be simplified for purposes of this explanation.

In 3202, the method includes determining, for each slot of a plurality of slots in a wireless communication frame of the first RAT, a plurality of minislots, wherein the duration of each of the plurality of minislots is based on a duration of communicating via the second RAT based on at least one second RAT communication profile.

In 3204, the method includes scheduling communications for the first RAT using the plurality of slots or the plurality of minislots, wherein communications for the first RAT are prevented during slots or minislots associated with communications for the second RAT based on the at least one second RAT communication profile. The prevention of the first RAT communications may for example, include muting the first RAT during slots and/or minislots which are allocated to the second RAT based on the second RAT communication profile. In the case where the second RAT is Bluetooth, for example, the second RAT communication profile may be at least one of Hands-Free Profile (HFP), Advanced Audio Distribution Profile (A2DP) for streaming stereo music, Basic Printing Profile (BPP), Dial-Up Networking (DUN), or Object Push Profile (OPP).

In D2D systems using unlicensed frequency bands, e.g. 2.4 GHz, 5.8 GHz, 900 MHz, 868 MHz, etc., one of the priorities may be to achieve reliable transmission and/or reception for different types of communications while limiting interference. In current systems, repeated transmissions are used to improve data transmission reliability, where the repeated transmissions are sent over the same frequency band. This comes at a cost of data rate and latency as well as introducing additional interference to the network. Systems operating in unlicensed bands may have more limited allocation to resources as other bands. This may result in having to free the unlicensed after a certain period of time with no guarantee that a new band for communications may be available for immediate use.

In some aspects, in order to minimize implementation costs for wireless communications, e.g. for D2D, but still guarantee transmission reliability and low latency, a concurrent spectrum usage at the minimum complexity cost is implemented. A hierarchical distribution of information across different frequency bands, e.g. 2.4 MHz, 900 MHz, 5.8 GHz, etc., by utilizing carrier aggregation. The usage of multiple bands simultaneously or sequentially will depend on the frequency band channel properties and desired Quality of Service (QoS). Therefore, instead of duplicating packets over time on a single frequency band, the methods and devices disclosed herein efficiently use the available spectrum through information distribution over multiple frequency bands and, accordingly, perform traffic shaping in systems lacing central node control.

In some aspects, the methods and device disclosed herein provide for improvements to the high cost and limited QoS of current implementations employing repeated transmissions, thereby enabling concurrent data exchange over multiple bands and multiple carriers, adapting transmissions to fading profile and channel characteristics, efficiently utilizing available spectrum and perform traffic steering, and increasing QoS and system efficiency.

In some aspects, the disclosure herein provides methods and devices configured with an embedded multi-band scheduler that dynamically prioritizes and allocates information (e.g. voice, data, emergency, control signaling, etc.) to different frequency bands in order to implement carrier aggregation in wireless communications, e.g. in D2D communications. The scheduler identifies how many frequency bands need to be maintained simultaneously, prioritizes information and depending on this priority, may transmit information over different frequency bands using multiple carriers. The information is assigned to different bands depending on different criteria.

In D2D communications, it is essential that a message is correctly received at the receiver, especially in emergency and life-threatening scenarios. Usually, a transmission over different bands or at different carrier frequencies will allow different channel capacities (or transmission ranges) per band due to band-specific power limits, frequency-dependent radio channel attenuation and multipath fading, and frequency-specific interference situations.

Figure 33:
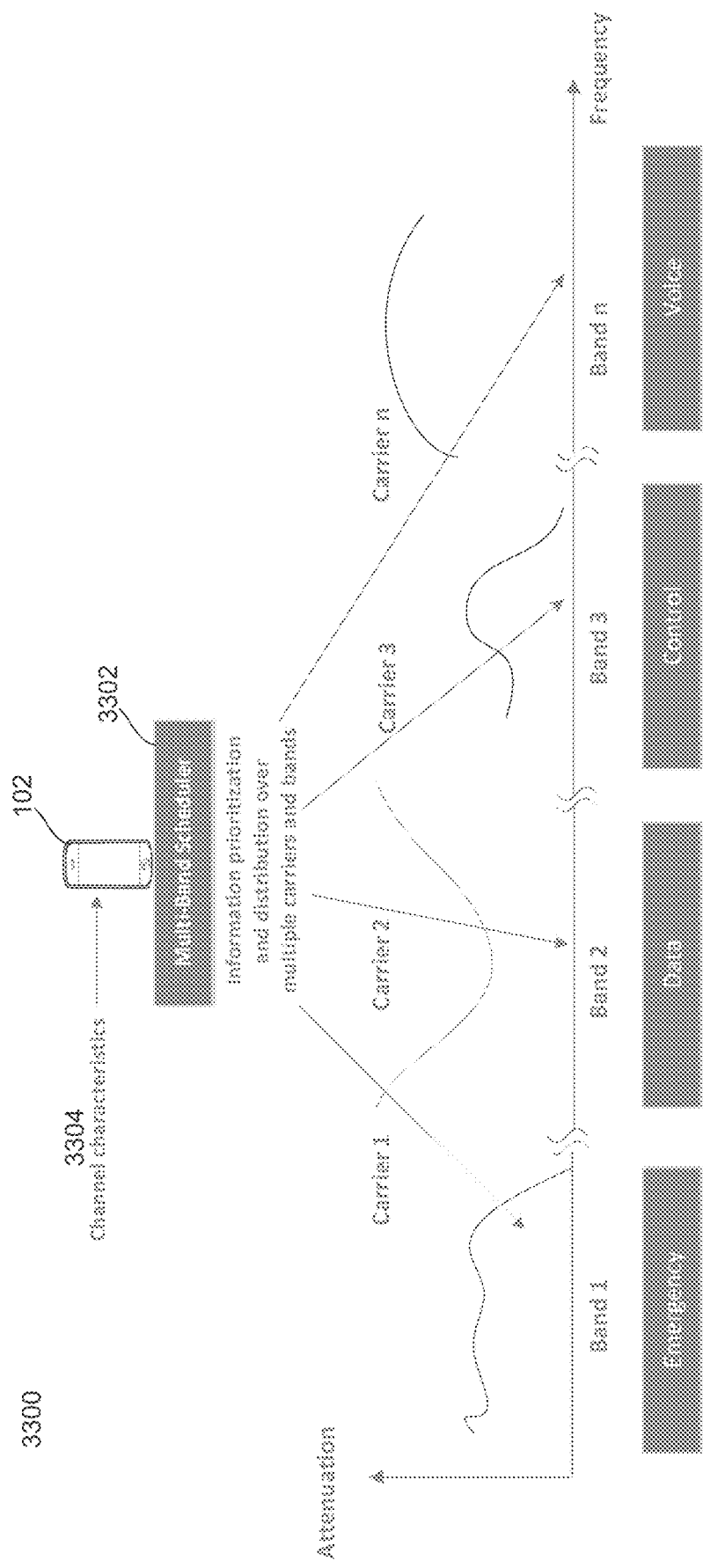
FIG. 33 shows a diagram illustrating an implementation across multiple bands through a carrier aggregation according to some aspects.

FIG. 33 shows an exemplary diagram 3300 illustrating an implementation across multiple bands through a carrier aggregation according to some aspects. It is appreciated that diagram 3300 is exemplary in nature and may therefore be simplified for purposes of this explanation The Multi-Band Scheduler 3302, included in wireless device 102, for example, as hardware and/or software in baseband modem 206, is configured to perform a series of tasks in order to implement the methods described herein.

The Multi-Band Scheduler 3302 may be configured with an acquirer configured to collect information for available communication channels and determines channel (i.e. frequency band) characteristics 3304 obtained through this collections of information, i.e. by performing link measurements. The acquirer, for example, may be configured to acquire radio link measurement information for each of a plurality of frequency bands supported by wireless device 102.

The Multi-Band Scheduler 3302 may be configured with a prioritizer configured to prioritize the frequency bands based on their respective radio link measurement information. This may include prioritizing the bands according to an information to be transmitted based on a set of criteria. This criteria may include, for example, one or more of the following: frequency band characteristics such as available frequency, max RF output power and power budget, bandwidth and band-specific PA duty cycles; desired QoS such as data rate, latency, jitter buffer; channel characteristics collected from the link measurements; regulatory requirements; and knowledge about the reachability of desired receivers due to the above characteristics and due to the receiver's capabilities.

The Multi-Band Scheduler 3302 may further be configured with a preferred band determiner configured to determine a preferred band from the plurality of frequency bands for which the Multi-Band Scheduler 3302 obtained radio link measurement information by determining a lowest priority frequency band from the prioritized plurality of frequency bands for fulfilling a minimum requirement for sending an intended communication, i.e. transmission. A preferred band is a band that fulfills desired criteria of an intended transmission and it can vary from system to system as well as it is dependent on the type of operation to be executed (e.g., synchronization, discovery, or data transmission) or information to be sent (emergency, data, voice). If the preferred band is not available, then a next higher band shall be selected, if available. If not, lower quality bands are considered. This procedure is further shown and explained in FIG. 34.

Figure 34:
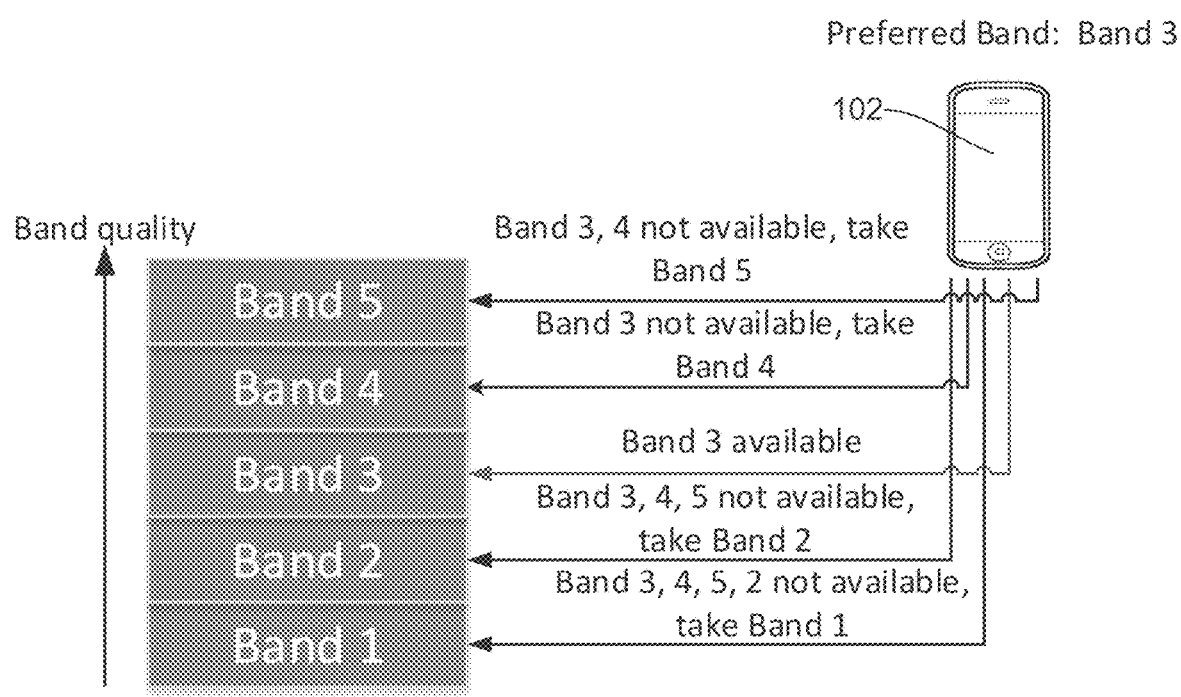
FIG. 34 shows a diagram illustrating a band selection process according to some aspects.

FIG. 34 shows an exemplary diagram 3400 illustrating a band selection process according to some aspects. It is appreciated that diagram 3400 is exemplary in nature and may therefore be simplified for purposes of this explanation.

In diagram 3400, the preferred band is shown as being Band 3. As previously explained, the preferred band is the band which provides the minimum requirements necessary to transmit the intended transmission, e.g. meet minimum data latency/QoS requirements.

Diagram 3400 illustrates the method for choosing a band to transmit on if the preferred band is not available. The band quality for Bands 1-5 is shown on the left and is determined based on the radio link measurement information obtained by the Multi-Band Scheduler 3302. In this example, the Bands are shown to be prioritized in ascending order, but it is appreciated that other orders may be implemented within the described schemes. Each of Bands 1-5 may correspond, for example, to a frequency band such as the 900 MHz band, 2.4 GHz band, 5.8 GHz band, and other bands supporting wireless communications, e.g. LTE frequency bands as implemented by the 3GPP.

The Multi-Band Scheduler 3302 takes into account that, based on the available bandwidth, the maximum transmission (Tx) power, the current congestion and/or interference situation, and the propagation conditions in general, some bands are more scarce or more valuable than others. Based on the requirements for the intended transmission, the multi-band scheduler 3302 is configured to pick a suitable band that is "good enough" to complete the intended transmission, but associated with the least cost (least scarce and/or valuable) for the intended transmission, i.e. determine the preferred band. This may be achieved, for example, by shifting traffic from a long-range 900 MHz to a shorter range but wider 2.4 GHz band so that other users needing the longer range or having more critical transmissions will find a less crowded 900 MHz band.

Lastly, the Multi-Band Scheduler 3302 may be configured with a distributor configured to distribute the intended transmission for communication based on the preferred band determiner's determination. The distributor may also be configured to distribute the intended transmission over multiple carriers.

Figure 35:
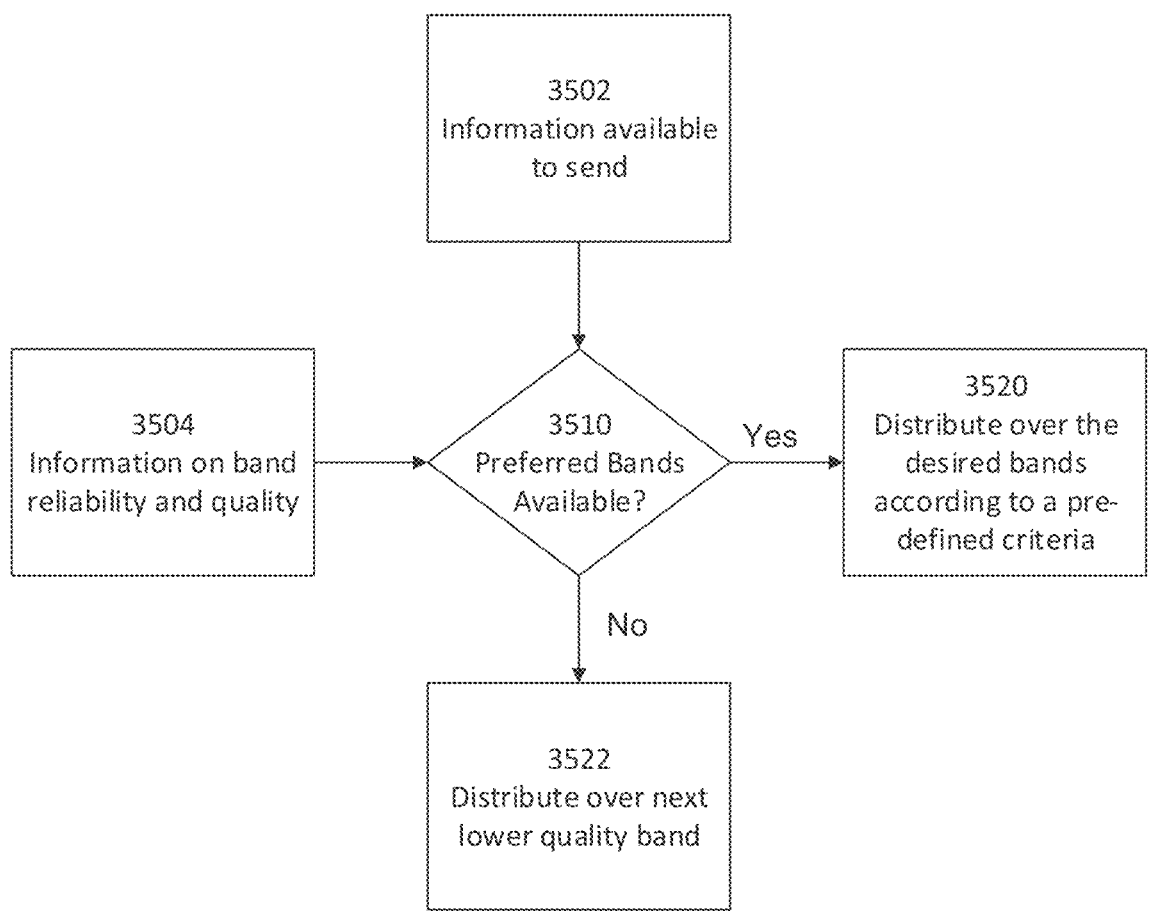
FIG. 35 shows a flowchart illustrating a process for distributing an information to send in an intended transmission according to some aspects.

FIG. 35 shows a flowchart 3500 illustrating a process for distributing an information to send in an intended transmission according to some aspects. It is appreciated that flowchart 3500 is exemplary in nature and may therefore be simplified for purposes of this explanation.

Before starting a transmission, the multi-band scheduler 3302 collects information on channel characteristics and fading profiles, which is used in 3504. In decentralized systems, users can collect and/or share their own channel characteristics through a dedicated channel directly or via a relay (mesh-type networks). In centralized systems, this can be directly done by a central node, e.g. a base station. Also, information on regional spectrum regulations will be available to the scheduler prior to information distribution.

The multi-band scheduler 3302 assesses the information available to send in the intended transmission 3502. This may include, for example, determining one or more types of information including determining whether the one or more types of information include control, emergency, and/or a type of data (voice, other user data, etc.) to be sent if the preferred band(s) are available 3510.

If available, the multi-band scheduler 3302 may distribute over the desired bands according to a pre-defined criteria 3520. The pre-defined criteria may include QoS or latency requirements for a particular type of information to be sent. If not available, the multi-band scheduler 3302 may distribute over the next lower quality band(s) 3522.

The receiver of the information transmitted from wireless device 102 configured with the multi-band scheduler 3302 may be a single user or multiple users depending on how information has been distributed. For example, emergency information sent on one band can be received by multiple users at the same time and data information on another band can be received only by dedicated single users. At the receiver, information from only one or multiple bands can be received. In case of multiple bands, the scheduler will combine and decode information from all bands.

Various implementation/use-case examples are discussed to further illustrate the devices and methods described herein.

In a first use-case scenario example for implementing the multi-band scheduler 3302, a wireless device 102 in a congested area, i.e. an area with many sources of interference, is considered. The preferred band will the band where maximum coverage can be achieved, considering current channel conditions. That means, for example, the 900 MHz band will be the desired preferred band for critical information and operations such as synchronization, discovery, or emergency messaging. Transmissions with less stringent requirements, such as normal data or voice transmissions to nearby users, can be scheduled on less preferred bands such as the 2.4 GHz band. Due to the wider available bandwidth in the 2.4 GHz band, higher throughputs can be achieved. Due to the shorter range, more spatial reuse is possible at 2.4 GHz, thereby freeing the 900 MHz band from further congestion and benefiting users with more critical or long range transmissions.

In a second use-case scenario example for implementing the multi-band scheduler 3302, wireless device 102 can transmit its packets across all suitable available bands so that the receiver(s) can then combine the received signal across the different bands. For the splitting of the transmission over different bands multiple strategies can be employed by the multi-band scheduler 3302.

A first strategy may be based on per-band channel quality information available at the wireless device 102 (i.e. the attenuation/gain of that band between the transmitter and the receiver). The transmitter can apply a water filling algorithm that distributes the available transmission power budget to frequency bands in a way that optimizes the overall capacity. The transmitter would put (up to maximum power level allowed per band) the most transmission power on the band with the lowest attenuation and lower-quality bands with higher attenuation are only used if the lower attenuation bands have reached their respective power limits or the marginal benefit of adding more power to lower attenuation bands becomes smaller than the marginal benefit of using a higher attenuation band.

Another strategy used by the multi-band scheduler 3302 may be based on increasing the reliability of the reception of the intended transmission. Accordingly, the multi-band scheduler 3302 may either perform channel coding across the frequency bands. In other words, by receiving on more than one band, the receiving peer device(s) can obtain more redundancy bits or simple repetitions that facilitate the decoding of the intended transmission. As an alternative, e. g. in multi-cast/broadcast scenarios, the wireless device 102 may transmit, for example, a low-resolution version of an audio/video transmission on a lower-rate/wider-reaching band while transmitting additional information for higher resolution on higher-rate/shorter-reaching bands.

In a third use-case scenario example for implementing the multi-band scheduler 3302, the control plane information, e.g., synchronization and discovery information, is exchanged at lower frequency bands (due to higher coverage) or at bands with less interference. The goal here is to ensure the reliable exchange of the control plane information. The data plane information can then be exchanged over less reliable bands, by taking advantage of frequency diversity as explained above in the second use-case scenario example.

In a third use-case scenario example for implementing the multi-band scheduler 3302, the scheduler may exploit the fact that the transmission on different bands is synchronized but that the different phases of the repeating frame structure are not time-aligned across the different bands. For example, if user A is able to transmit to user B on multiple different bands, user A could at time t make use of a less-preferred band if on their preferred band no transmission is possible in that timeframe because, e.g., the preferred band is reserved for a control or discovery channel at that time. In this operation mode, the multi-band scheduler 3302 would interleave transmissions to different bands based on their availability.

Figure 36:
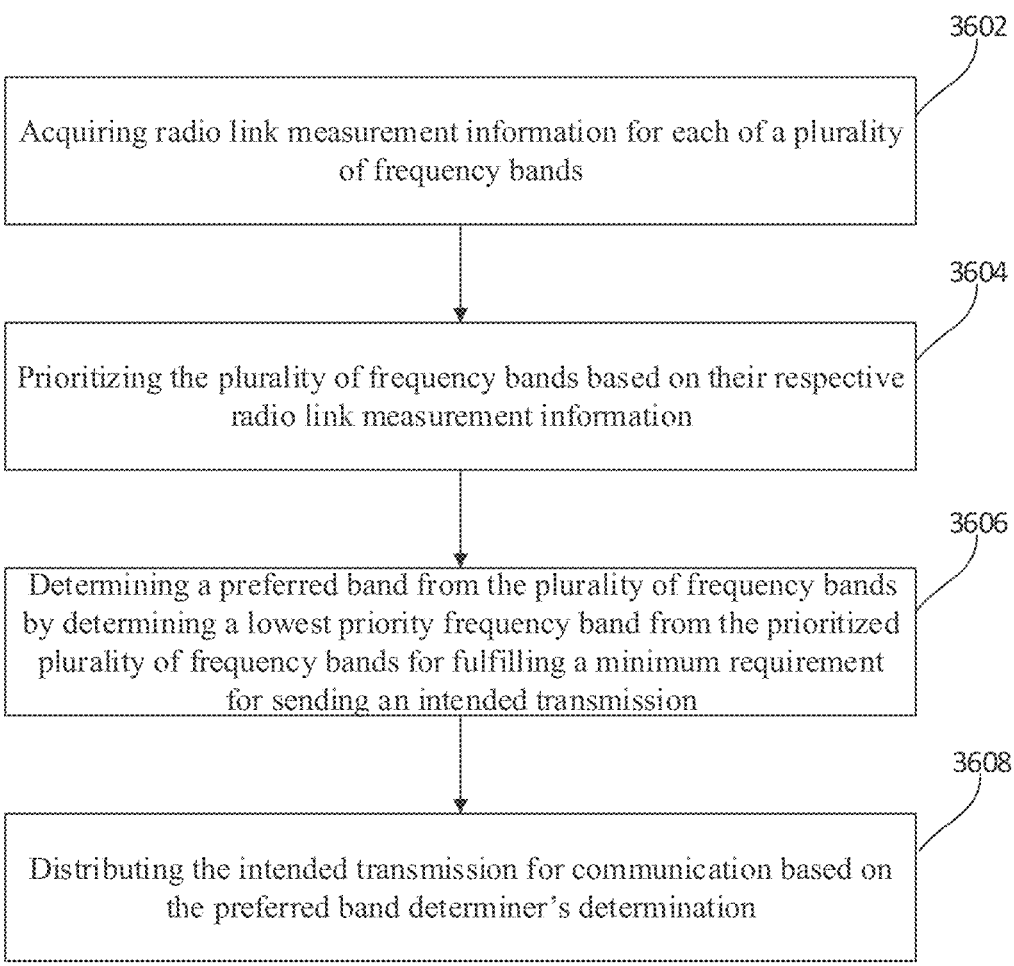
FIG. 36 shows a flowchart illustrating a method for a multi-band scheduler according to some aspects.

FIG. 36 shows a flowchart 3600 illustrating a method for a multi-band scheduler according to some aspects. It is appreciated that flowchart 3600 is exemplary in nature and may therefore be simplified for purposes of this explanation.

The method may include acquiring radio link measurement information for each of a plurality of frequency bands 3602; prioritizing the plurality of frequency bands based on their respective radio link measurement information 3604; determining a preferred band from the plurality of frequency bands by determining a lowest priority frequency band from the prioritized plurality of frequency bands for fulfilling a minimum requirement for sending an intended transmission 3606; and distributing the intended transmission for communication based on the preferred band determiner's determination 3608.

Figure 37:
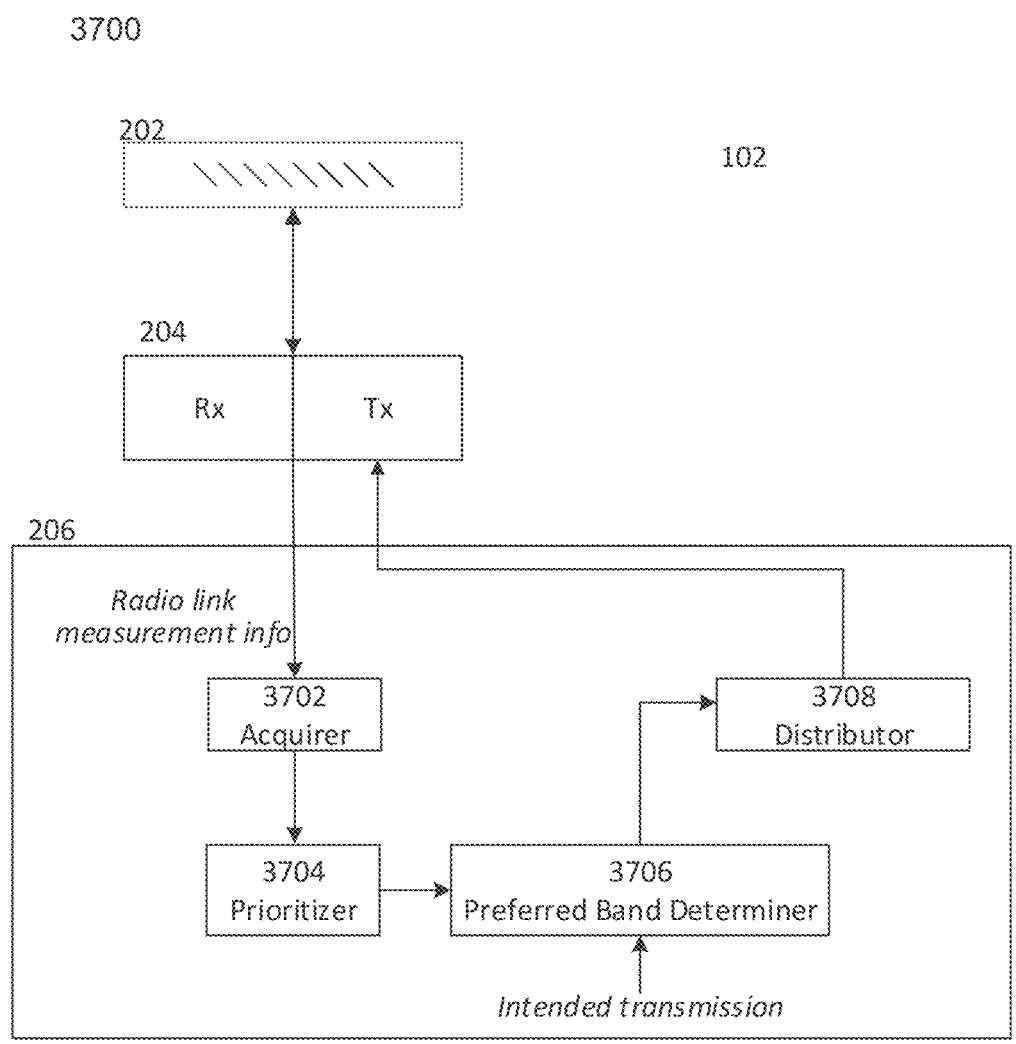
FIG. 37 shows an internal diagram for a wireless device according to some aspects.

FIG. 37 shows an internal diagram 3700 for a wireless device 102 depicting components according to some aspects. Accordingly, the illustrated depiction of FIG. 37 may omit certain components of wireless device 102 that are not directly related to the methods described herein. Additionally, components depicted as being separate in FIG. 37 may be incorporated into a single, hybrid component that performs the same functions as the separate components, and, similarly, single components may be split into two or more separate components that perform the same function as the single component.

As shown in FIG. 37, the baseband modem 206 may include an acquirer 3702 configured to acquire radio link measurement information for each of a plurality of frequency bands; a prioritizer 3704 configured to prioritize the plurality of frequency bands based on their respective radio link measurement information; a preferred band determiner 3706 configured to determine a preferred band from the plurality of frequency bands by determining a lowest priority frequency band from the prioritized plurality of frequency bands for fulfilling a minimum requirement for sending an intended transmission; and a distributor 3708 configured to distribute the intended transmission for communication based on the preferred band determiner's determination.

In well-planned and organized networks, every network node, i.e. wireless device, should be able to communicate with each other. In a network where all the nodes are in close proximity, direct Device-to-Device (D2D) communications between these nodes may be possible. In contrast, in a network where the nodes are spread across a large spatial area, there may be nodes which are unable to establish direct D2D links with other nodes in the network. In this latter scenario, communications between two nodes unable to establish direct D2D links with each other becomes possible only through relaying in a decentralized network, i.e. in a network not relying on one or more base stations providing network coverage. In the disclosure herein, it is appreciated that the term node, network node, wireless device, communication device, terminal device, or the like may be used interchangeably.

In a typical cellular network, this relaying occurs mainly via the cellular infrastructure, i.e. wireless device A to base station A to the core network to base station B to wireless device B. In decentralized networks, for example, in networks relying on the D2D technology, there is no cellular infrastructure support is available, and therefore, this relaying has to be accomplished by the network nodes (i.e. wireless devices) themselves through the establishment of a mesh network. A mesh network may include two or more wireless devices configured to perform wireless communications directly, e.g. via D2D communications on the LTE interface, with at least one other wireless device.

A mesh network ensures that any two nodes, within the mesh network, are able to connect to each other. An essential element of mesh networking is the capability to establish communication routes between any two mesh nodes. This process may be accomplished through a routing protocol. The role of a routing protocol is the specification of (1) which information needs to be shared between the nodes and (2) how it is combined at each node to establish these routes.

An important aspect of (1) is how often this information should be exchanged, which is associated with the nodes' mobility, nodes' activity, the wireless channel conditions, interference conditions and operating frequency band. Furthermore, the extension of the operation of the D2D technology from a single frequency to simultaneous operation in multiple bands (ranging from sub 1 GHz, sub-6 GHz up to mmW), impacts both (1) as well as (2).

In some aspects, methods and devices are configured for implementing mesh networking schemes and the associated routing protocols as disclosed herein. Furthermore, these schemes and routing protocols may enable the establishment of mesh networking in a multi-frequency band setting.

Current mesh network solutions are designed for specific wired and wireless systems. For wireless systems, there is IEEE 802.11s, which enables mesh networking on top of the IEEE 802.11 PHY and MAC layers; and "Thread", which enables mesh networking on top of the IEEE 802.15.4 PHY and MAC layers. However, these solutions target use cases different from those described herein. Namely, they are designed for short range networks with little to no mobility. For example, in the case of IEEE 802.11s, the mesh networking occurs over Wifi access points. Furthermore, none of these solutions consider mobility, interference and multi-band operation.

The methods and devices of this disclosure are configured to implement a routing protocol that enables the establishment and maintenance of communication routes in a mesh network while taking into account multi-band operation and the dynamic conditions (e.g. propagation, interference, and mobility) of the links between the nodes in the mesh network. Upon connecting to the mesh network, a node (i.e. wireless device) may request, or receive without a request, from its peer devices a Connectivity Update payload. This payload includes necessary information for the node to create an internal map of the mesh network topology, and the node may use it to establish communication routes to any other node in the mesh network. During its normal operation (and while connected to the mesh network), the node will periodically transmit and receive Connectivity Updates to and from its peers allowing it to keep an updated record of all available communication routes.

The methods and schemes described herein allow for wireless devices to join and/or create mesh networks capable of operating in multiple frequency-bands and cope with dynamic environment conditions, such as mobility, interference, device activity and propagation. This is achieved through a distributed and adaptive control of the rate of mesh neighbor information exchanges. While the ensuing explanation focuses on D2D technology, it is appreciated that disclosure herein may be applied to any other type of decentralized networks operating in a mesh network mode, e.g. vehicle to vehicle (V2V) technology. As used herein, a mesh network may include any network of a plurality of peer devices configured to exchange information with one another without the need for an established wireless infrastructure, i.e. without base stations, Wifi access points, etc.

Current D2D communication technologies allow for the operation with a D2D protocol stack to support direct communications with one or more proximal peer devices. In this setting, however, whenever two nodes (i.e. wireless devices) are not able to establish a direct connection, then they are not able to communicate at all.

In some aspects of this disclosure, methods and devices are configured to create and/or maintain a mesh network in order to allow for any two or more nodes of the mesh network to communicate with each other via relaying provided by the other nodes in the network. An essential element of mesh networking, therefore, is having the requisite knowledge (or a procedure to obtain this knowledge in a timely manner) at each network node of nearby nodes and their connection to other nodes. In other words, each node in the mesh network needs to be able to keep an updated network map, i.e. the set of all possible routes between any two nodes in the mesh network. Since decentralized D2D networks can operate in multi-bands (e.g. in 900 MHz, 2.4 Ghz, 5 GHz, or other bands), the mesh networking schemes described herein are extended to support multiple bands. In this disclosure, these schemes will be denoted as multi-band mesh networks.

In a multi-band mesh networks, there are four main challenges which need to be considered when keeping an updated network connectivity map. These challenges are illustrated in an exemplary mesh network diagram 3800 of FIG. 38 and further described below. While the two bands in diagram 3800 are shown as the mmW band component of the mesh network (top) and the 2.4 GHz band component of the mesh network (bottom), it is appreciated that other bands substituted or added in order to create a multi-band mesh network.

Mobility—as the devices move, their closest peers change over time, as such the routes need to be kept updated to reflect these changes in network topology. This is shown as node D moves position from t1 to t2.

Mesh Interference—in an uncoordinated network the interference conditions change over time, affecting the quality of the communications of the node and its closest peers. In a mesh network there are typically two types of interference: inter and intra-flow interference. In the case of inter-flow interference, the interference is caused by the transmission flows pertaining to different end-to-end nodes. While intra-flow interference is caused by interference coming from the transmission from the same communication flow.

Long range operation—leads to the interference conditions being different at the transmitter and receiver, i.e. a good quality link in A to B is not necessarily a good link from B to A.

Multi-Band operation—with multiple bands available for operation, the nodes need to keep track of the link quality with their nearby peers across these multiple bands, i.e. shows as the mmW band and the 2.4 GHz band in diagram 3800.

In accordance with various aspects, a wireless device may connect to a mesh network by going through a connection establishment process.

Figure 38:
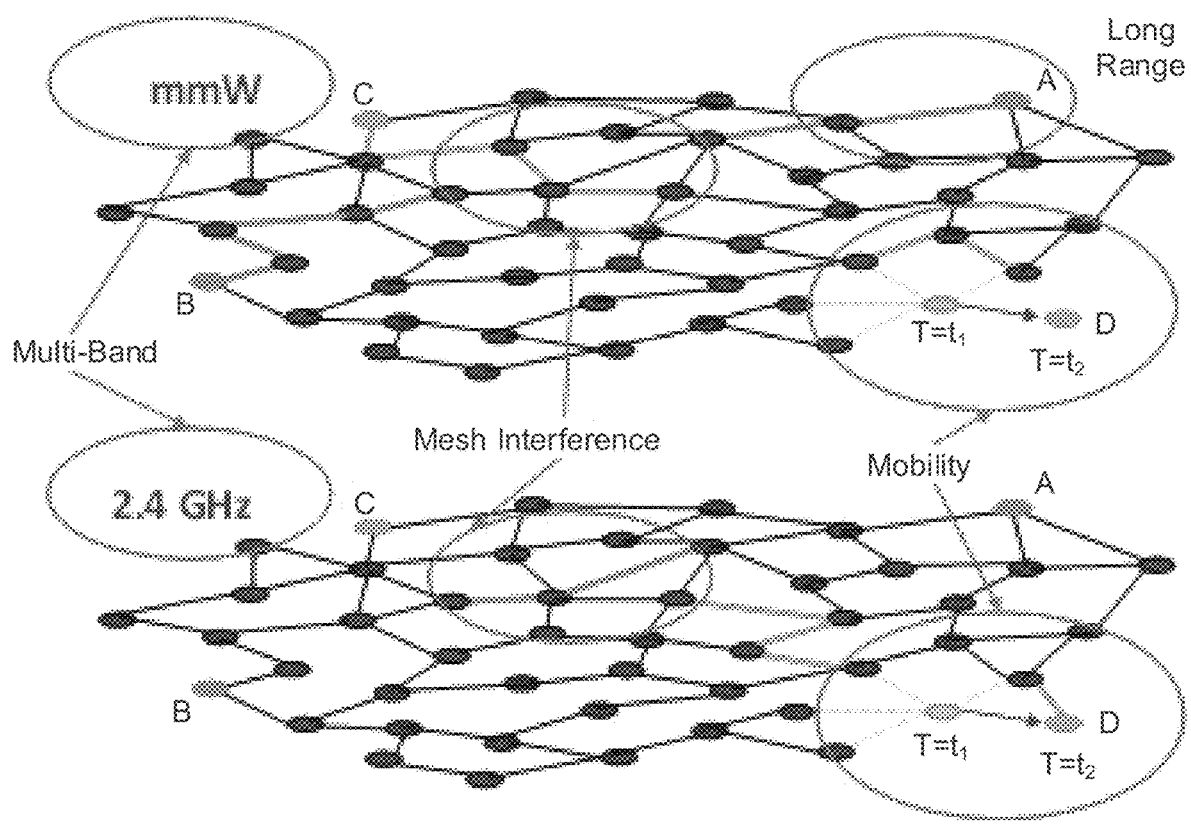
FIG. 38 shows a mesh network diagram according to some aspects.
Figure 39:
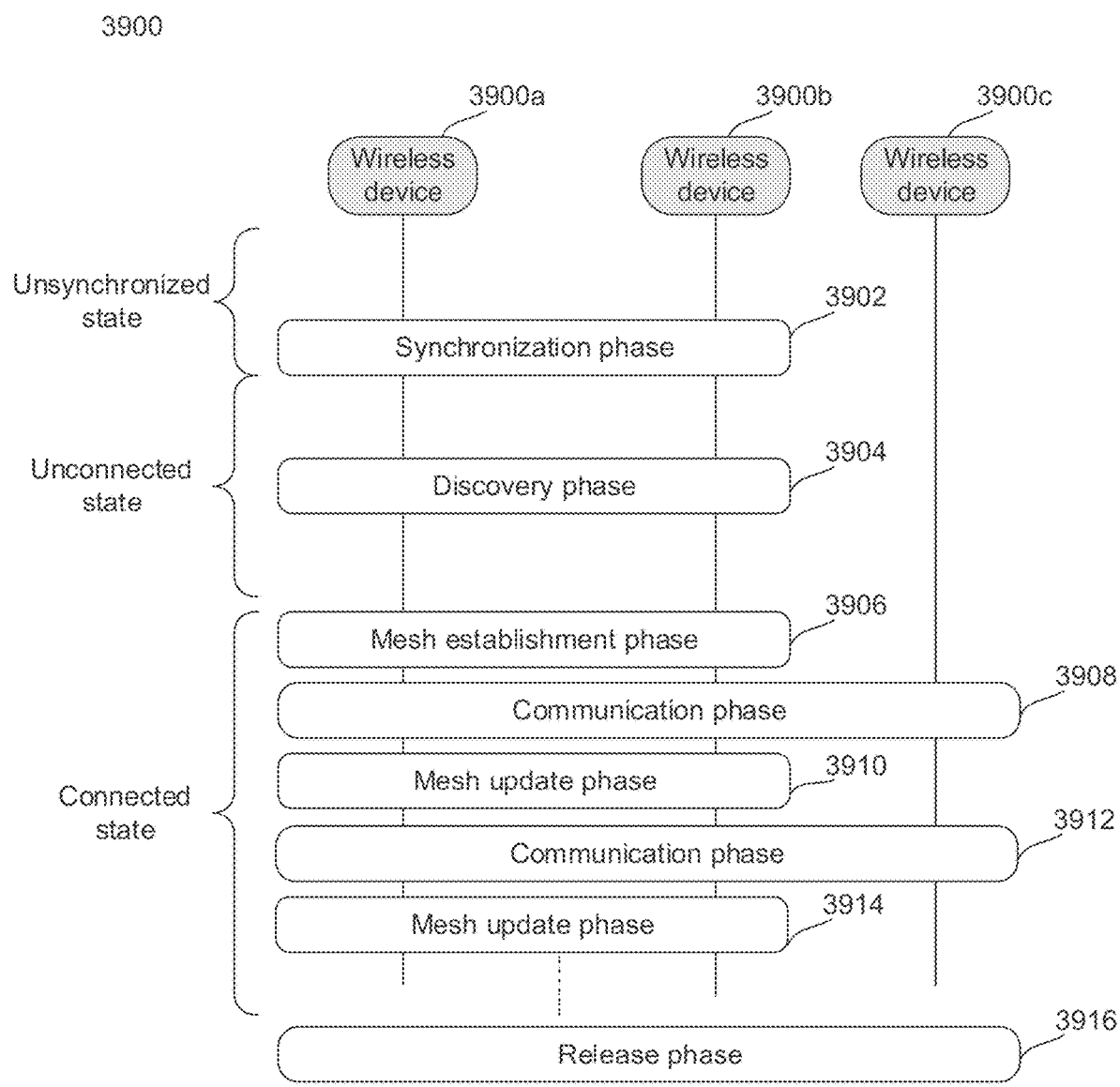
FIG. 39 shows MSC illustrating a connection establishment process for wireless device according to some aspects.

FIG. 39 shows an exemplary connection establishment process 3900 for exemplary wireless devices 3900a, 3900b and 3900c representative of a potentially larger mesh network potentially including further wireless devices, e.g. as shown in the mesh network illustrated in FIG. 38, that are not illustrated for purposes of this explanation. While the exact order and number of steps is chosen for illustrative purposes, a connection establishment process may include additional or less stages as compared to the one shown in FIG. 39. As shown in process 3900, wireless device 3900a may establish connection with a D2D mesh network via wireless device 3900b and may then communicate with wireless device 3900c, for example via wireless device 3900b acting as relay for communication between wireless devices 3900a and 3900c. As shown, the connection establishment process 3900 may in certain aspects be initiated with a synchronization phase 3902 where wireless device 3900a may establish time, frequency and/or phase synchronization with wireless devices 3900b and 3900c. For example, wireless device 3900a may receive a synchronization signal which may be periodically broadcasted by wireless device 3900b which in accordance with certain aspects may assume a role of a synchronization master device. In another example, wireless devices 3900a-c may receive a synchronization information when communicating with a centralized network, e.g. base station or a cloud server, and wireless devices may store this synchronization information for later use.

Wireless device 3900a may discover neighboring wireless devices of the D2D mesh network during a discovery phase at stage 3904. For example, wireless devices 3900a and 3900b may use the time and frequency synchronization to align their respective discovery operations in time and frequency. For example, wireless devices 3900a and 3900b may operate on a slotted communication schedule that allocates certain time slots and frequencies (discovery resources) for discovery during each frame (or sequence of frames). Discovery operations may include exchanging discovery messages (e.g., a discovery initiation message and a discovery confirmation message) on the discovery resources.

Being in a connected state after discovery, wireless devices 3900a and 3900b may enter a mesh establishment phase at stage 3906 where wireless device 3900a may obtain information related to mesh connectivity provided by neighboring wireless devices to which wireless device 3900a may directly connect to. In other words, in accordance with certain aspects, wireless device 3900a may obtain the mentioned connectivity map (i.e. network map), e.g. a dataset, including at least part of or all possible routes between any two nodes included in the mesh network. In certain aspects, wireless device 3900a may obtain the connectivity map via a signaling sequence including a request for an updated connectivity map transmitted from the wireless device 3900a to the mesh network (e.g. to wireless device 3900b and/or to at least one or all wireless devices to which the wireless device 3900a may be able to directly connect to) and a corresponding response from the mesh network. The response may be transmitted to wireless device 3900a for example from wireless device 3900b (i.e. for example from the wireless device currently assuming the role of a master also for synchronization) and/or from at least one or all wireless devices to which the wireless device 500a may be able to directly connect to.

Having obtained the mesh connectivity, wireless device 3900a may enter a communication phase at stage 3908 during which wireless device 3900a may exchange payload data for example with wireless device 3900c either directly or via one or more relays (e.g. via wireless device 3900b). While being in the connected state, each wireless device may periodically enter mesh update phases (for example at stages 3910, 3914) where each wireless device may share its current connectivity, for example a list of wireless devices it may directly and/or indirectly connect to, within the mesh network. To this end, each wireless device may in accordance with certain aspects transmit information representing its current connectivity to at least one or each wireless devices it may directly connect to. Such information may be periodically shared between the wireless devices forming the mesh network such that each wireless device may periodically update its connectivity map. Alternatively or additionally, in accordance with certain aspects, mesh update phases may be actively triggered by a wireless device connected to the mesh network. For example, in accordance with various aspects, a wireless device may assume a role of a mesh network control device which may control an interval between mesh update phases. In certain aspects, a length of mesh update intervals may be controlled based on a rate of change of a mesh network topology, e.g. based on a rate of changes in number of wireless devices forming the mesh network and a rate of changes of a respective connectivity of each wireless device included in the mesh network. In certain aspects, the device assuming the role of the mesh network control device may be the same device assuming the role of a synchronization master device. As illustrated in FIG. 39, communication phases (such as communication phases 3908, 3912) and mesh update phases (such as mesh update phases 3910, 3914) may continue to alternate for example until wireless device 3900a has completed its communication and enters a release phase 3916 where wireless device 3900a may release its connection to the mesh network and may return to an unconnected state.

When updating connectivity during the mesh update phase, in accordance with certain aspects, each wireless device may update information on quality of each direct link it may establish with neighboring wireless devices, e.g. based on corresponding SINR measurements of respective incoming links from said neighboring wireless devices and/or based on corresponding SINR measurements of respective outgoing links from the wireless device to the neighboring wireless devices, information on these SINR measurements being reported back to the wireless device. Further, when updating connectivity during mesh update phases, in accordance with certain aspects, each wireless device may update information on possible relayed routes towards wireless devices it may not connect directly to and corresponding information on a cost of each route for example in terms of link quality (e.g. based on SINR) of respective direct links between relaying wireless devices along a route.

In the Mesh Establishment Phase 3906, since the wireless device has just established connection to the mesh network, it requires updated information related to the mesh connectivity provided by its nearby peer devices. This request can be made in a unicast or multicast manner, although the multicast approach is more efficient in terms signaling overhead as it requires an a priori scheduling mechanism to ensure that the replies from the peers do not collide. This can be accomplished by providing a mapping between a wireless device identification (ID) and a time slot in the time domain based on the discovered peer devices found during the discovery phase 3904.

Figure 40:
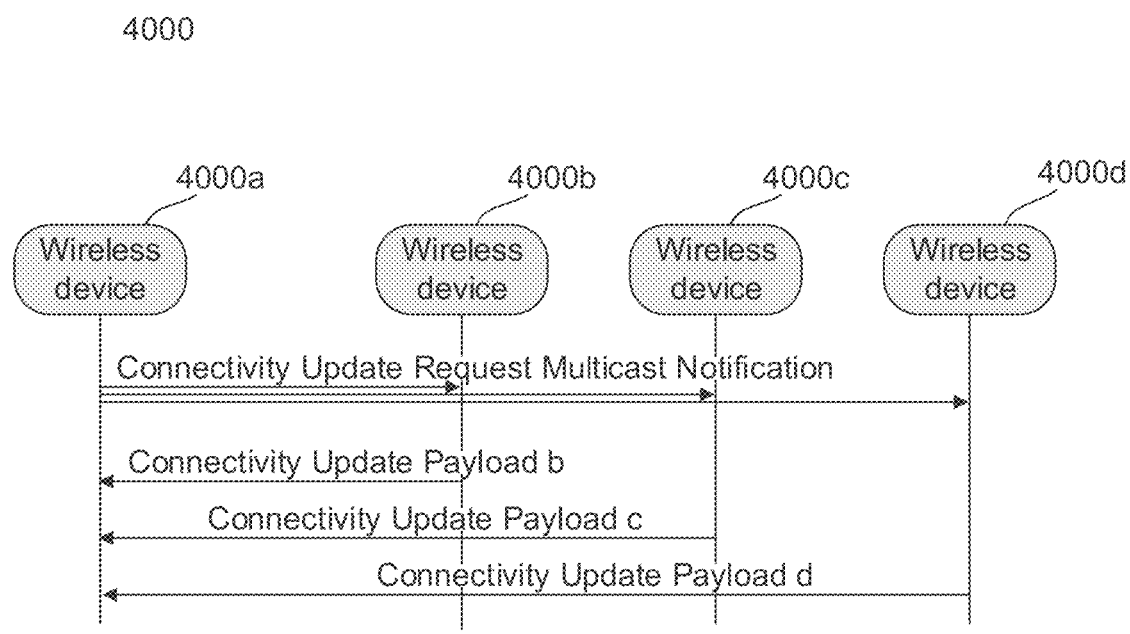
FIG. 40 shows a process illustrating signaling exchanges for requesting a connectivity update in a multicast method for wireless devices according to some aspects.

FIG. 40 shows an exemplary process 4000 illustrating signaling exchanges for requesting a connectivity update in a multicast method for wireless device 4000a and wireless devices 4000b-d according to some aspects. It is appreciated that process 4000 may be simplified for purposes of this explanation.

The multicast method shown in process 4000 includes two types of messages: (1) the Connectivity Update Request Notification (which is multicast from wireless device 4000a to wireless devices 4000b-d), and (2) the "Connectivity Update" payload, which is transmitted from each of wireless devices 4000b-d back to the wireless device 4000a. The responses from each of the wireless devices 4000b-d may be staggered in order to avoid collisions. In a unicast setting, the sequence of messages would be the same with the difference that the initial Connectivity Update Request Notification would be sent individually to each of wireless device 4000b-d.

In the Mesh Update Phase 3910, any one of the wireless devices may share with its peers the status of its own connectivity to the peers. This information is gathered by the wireless device directly when communicating with its peers and from the "Connectivity Update Payload" shared by each of its respective peer wireless devices. These updates are shared between the wireless devices in the mesh network periodically, where the periodicity is proportional to the rate of change of connectivity within the mesh. If the link conditions changes rapidly (e.g. due to mobility or interference), then the connectivity updates may be triggered to occur more often. On the other hand, if the link conditions are quasi-static, then the rate of connectivity updates can be reduced.

Figure 41:
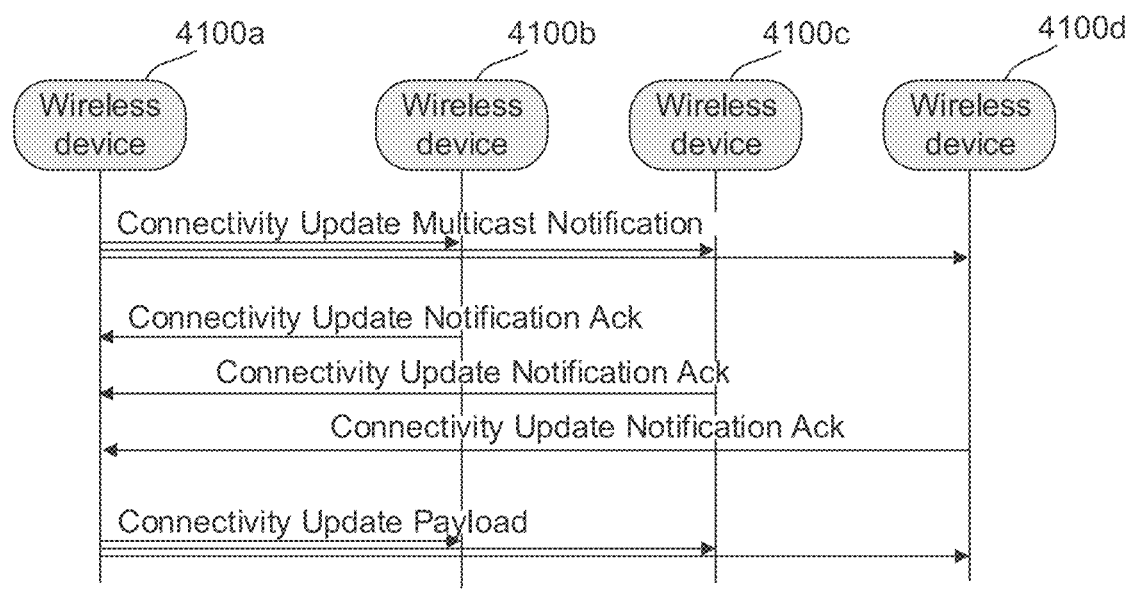
FIG. 41 shows a process illustrating signaling exchanges for providing a connectivity update in a multicast method for wireless devices according to some aspects.

FIG. 41 shows an exemplary process 4100 illustrating signaling exchanges for providing a connectivity update in a multicast method for wireless device 4100a and wireless devices 4100b-d according to some aspects. It is appreciated that process 4100 may be simplified for purposes of this explanation.

Process 4100 includes a first type of message, Connectivity Update Multicast Notification, in which wireless device 4100a alerts other wireless devices 4100b-d of a pending change in its Connectivity Update Payload. One or more of the other wireless devices 4100b-d may respond with an acknowledgement (Ack). The Acks may be used for Channel Estimation and/or Modulation and Coding Scheme (MCS) selection. The Acks from each of the wireless devices 4100b-d may be staggered in order to avoid collisions. Wireless device 4100a may then transmit the Connectivity Update Payload to one or more of wireless devices 4100b-d so that each of the devices may update its network connectivity map. In a unicast setting, the sequence of messages would be the same with the difference that the initial Connectivity Update Notification would be sent individually to each of wireless device 4100b-d. In another aspect of this disclosure, wireless device may simply transmit (multicast or unicast) the Connectivity Update Payload without first sending the Connectivity Update Multicast (or Unicast) Notification.

In some aspects, if no Ack is received from one of wireless devices 4100b-d, this wireless device may receive wireless device's 4100a Connectivity Update Payload from one of the other wireless devices which successfully received the update.

The degree of freedom given by the multi-band operation allows the connectivity information (besides pertaining to multiple bands) to be exchanged across one or multiple bands. However, it may be desired to use lower frequency bands because the propagation conditions may be more reliable. Accordingly, in some aspects, the preferential medium for the exchange of the Connectivity Updates may be transmitted on these lower frequency bands, e.g. the 900 MHz band.

Each wireless device in the mesh network may keep track of two types of connectivity, across the multiple operating bands, with the other wireless devices in the mesh network. The first type of connectivity is direct connectivity, which keeps track of the direct links with all the other wireless device in the mesh network. This information is denoted as the direct link set structure (i.e. Link_Set) for which an exemplary set of contents provided in Table 1.

TABLE 1

Destination Node ID - Identification of the destination node, e.g. node B ID;
Frequency Band Quality - Set of bidirectional link quality values for each band;

TABLE 1-continued

ID of the Frequency Band - Identifier of the band for which the quality
values correspond to;
SINR Measured - Latest measured SINR corresponding to the incoming
link, i.e. from B to A;
Outgoing Link Quality - Quantized link quality for the link in the A to
B direction. This value may be the result of the latest measurement of
the transmission from A to B (which was reported to A in a previous
connectivity update originated from B)
Incoming Link Quality - Quantized link quality for the link in the B to
A direction. This value is the result of the measurement of the
transmission from B to A;
Last Update Record Age - Keeps track of the age of the recorded
information.

Table 1 provides information to aid the description with respect to a wireless device A, e.g. as shown in FIG. 38. The term "node" as used in Table 1 (and throughout this disclosure) corresponds to a wireless device. The quality indicator may be quantized with a large enough range to provide meaningful information about the link. For example, '−∞' may denote a case with an insufficient link quality to establish a direct connection. This quantization is obtained from the measured SINR at each receiver which is then mapped to a link quality and direct link cost. An example of such a mapping is provided in Table 2.

TABLE 2

| SINR | Quality | Direct Link Cost |
| --- | --- | --- |
| 20 dB < x < 40 dB | 3 | 1 |
| 10 dB < x < 20 dB | 2 | 2 |
| 0 dB < x < 10 dB | 1 | 4 |
| <0 dB | −∞ | ∞ |

The conversion from link quality to link cost may be denoted by a function Cost(x), where x is the link quality. Here, the link cost given is only a function of SINR, but other metrics may be used, such as, but not limited to, battery available at the relay wireless device, ongoing transmission between the relay wireless device and destination wireless device, and/or status of the relay wireless device buffers. For example, if there is an ongoing transmission at the relay wireless device, this ongoing transmission may be used to facilitate the transmission of an intended communication (i.e. via piggy-backing).

The second type of connectivity is the relayed connectivity, which keeps track of all routes towards the other wireless devices in the mesh network. An example of this information is denoted as the routing set structure (i.e. Routing_Set) provided in Table 3.

TABLE 3

Destination Node ID - Identification of the destination node, e.g. node B ID;
Frequency Band Route - Set of routing information within the band
    ID of the Frequency Band - Identifier of the band for which the route belongs to;
    Next Hop Node ID - Identification of the next node in the route;
    In-Band Route Cost - Route cost when operating in in-band mode;
Multi-Band Next Hop - Next hop in the route
    ID of the Frequency Band - Identifier of the band to be used in the next hop;
    Next Hop Node ID - Identification of the next node in the route;
Multi-Band Route Cost - Route cost when operating in multi-band mode.

The information stored in the Routing_Set is illustrated, for multi-band routing, with exemplary values for wireless devices A-D (i.e. nodes A-D) of a mesh network in Table 4310 of FIG. 43B.

Table 4310 illustrates that the routing cost from node C to node A is asymmetric, since from C to A the cost is 3, while the reverse link the cost is 1. This route asymmetry is due to the links between each hop being asymmetric. This link asymmetry may come from the interference conditions experienced at each receiver. A hop may be described as a link between any two nodes (i.e. wireless devices) of a route in the mesh network.

In some aspects, the wireless devices of the mesh network described herein are configured to transmit a communication from a source to a destination using a plurality of hops between the nodes of the mesh network, wherein each of the plurality of hops may communicated on a same or a different frequency band as the preceding hop of the communication route.

Figure 42:
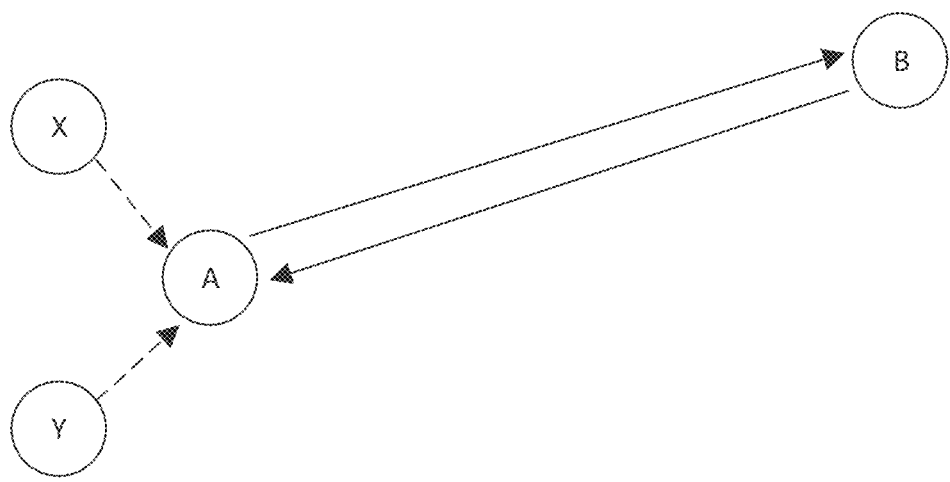
FIG. 42 shows a diagram of asymmetrical link quality according to some aspects.

FIG. 42 shows an exemplary diagram 4200 of asymmetrical link quality according to some aspects. It is appreciated that diagram 4200 may be simplified for purposes of this explanation.

The receiver at wireless device A may experience increased interference as opposed to the receiver at wireless device B, even in direct communications between the two devices. This interference may be caused by other wireless devices X and Y (interference illustrated with dashed lines).

The direct link and routing set structures are updated through the wireless device's ongoing communications and the received connectivity updates from the other wireless devices in the mesh network. In the case of ongoing communication, whenever at least k failures occur in a specific link or route, then that link quality is set to '0' (absence of connection), wherein k may be any integer selected by one or more wireless devices of the mesh network.

The Connectivity Updates exchanged between the wireless devices of the mesh network are the basis for the establishment of the routes between any two wireless devices in the mesh network. Accordingly, the purpose of sending a Connectivity Update is to share the wireless device's link and routing costs to any destination wireless device in the mesh network. The view of the routing costs an exemplary wireless device A to other wireless devices B, C, and D is illustrated by the dashed box FIG. 43A; and this information is part of the Connectivity Update Payload communicated from wireless device A.

The Connectivity Update payload may contain some or all of the information shown in Table 5 for each of the bands in which D2D communications is operating. In Table 5, it is assumed that A is the originator of the payload and B the receiver.

TABLE 5

ID of the originator node - Identifier of the originator node in the mesh
Quality and route to destination node - Set of quality and routes across the different bands
    ID of the destination node - Identifier of the destination node in the mesh;
    Band quality - Set of bidirectional link quality values for each band
        ID of the band - Identifier of the band for which the quality values
        correspond to;

TABLE 5-continued

Incoming link quality - Quantized link quality for the link in the B -> A direction. This value is the result of the measurement of the transmission from B to A;
In-band route cost - Cost of the route if only in-band hops are used;
Multi-band route cost - Cost of the route if the shortest path across the multiple available bands are used.

The computation of the route cost (for in-band and multi-band) is computed at each wireless device (i.e. node) based on its own connectivity database and the received connectivity updates from the other wireless devices of the mesh network. Route cost can be further influenced by band quality and available resources, for example. Furthermore, multi-band operation allows for transmitting different kinds of information across multiple bands, e.g. data over higher frequency bands and control over lower frequency bands.

The contents of the different fields which may be included in the Connectivity Update payload are populated based on the latest information available in the transmitter's internal connectivity structures (e.g. Link_Set and the Routing_Set). An exemplary procedure used to generate a Connectivity Update at the mth node (i.e. mth wireless device in the mesh network) is described in Table 6. Table 6 may include the link quality as well as routing cost in the Connectivity Update since the actual routing cost when using a specific node as a relay is the link cost+relaying node routing cost.

TABLE 6

FOR each destination node n in the mesh network (excluding the originating node)
    FOR each band i where the iD2D mesh operates
        % Record the ID of the band
        Node(n).Band(i).ID of the band = Link_Set.Frequency Band Quality(i).ID of the Frequency Band
        % Record the incoming link quality from the node's n transmission
        to the m node
        Node(n).Band(i).Incoming link quality = Link_Set(n).Frequency Band Quality(i).Incoming Link Quality
        % Record the outgoing in-band cost
        Node(n).Band(i).In-band route cost = Routing Set(n).Frequency Band Route(i).In-Band Route Cost
    END
    % Record the outgoing multi-band route cost
    Node(n).Multi-band route cost = Routing_Set(n).Multi-Band Route Cost
END In Table 7, an exemplary distributed algorithm is illustrated which ensures that the shortest path information is available towards each mesh node at a single band and across the multiple bands. Upon the reception of a Connectivity Update from node m, node g uses the received information to update its own internal connectivity structures (e.g. Link_Set and the Routing_Set). The routing decision of which intermediate node to transmit a packet (i.e. the selecting the relay node to use) when the goal is to transmit a packet towards the $n^{th}$ node is made at each transmitting node based on the related entries in the Routing_Set (e.g. Routing_Set(n). Multi-Band Next Hop. Next Hop Node ID and the associated band to use). The transmission of a packet towards the $n^{th}$ node over the mesh network may only occur if the routing cost is below the maximum routing cost threshold, which may be a network configuration parameter.

TABLE 7

FOR each destination node n in the mesh network (including the originating
node m)
    FOR each band i where the iD2D mesh operates
        % Update the outgoing link quality from node g (the receiving node) towards m (the "Connectivity Update" transmitting node)
        IF n == g
            Link_Set(m).Frequency Band Quality(i).Outgoing Link Quality = Node(n).Band(i).Incoming link quality
        END
        % Compute the in-band route cost from g towards n record (at node g), using m as the next node
        Route_Cost = Node(n).Band(i).In-band route cost + Cost(Link_Set(m).Frequency Band Quality(i).Outgoing Link Quality)
        % Check if m has a shorter in-band route towards n
        IF Routing_Set(n).Frequency Band Route(i).In-Band Route Cost >
        Route_Cost
            IF Cost(Link_Set(m).Frequency Band Quality(i).Outgoing Link Quality) > Route_Cost
                Routing_Set(n).Frequency Band Route(i).In-Band Route Cost = Route_Cost
                Routing_Set(n).Frequency Band Route(i).Next Hop Node
                ID = m
            ELSE
                Routing_Set(n).Frequency Band Route(i).In-Band Route Cost = Cost(Link_Set(n).Frequency Band Quality(i).Outgoing Link Quality)
                Routing_Set(n).Frequency Band Route(i).Next Hop Node
                ID = n
        END
    END
    % Search for the band with the shortest link cost from g to m
    Next Hop Link Cost = ∞
    Next Hop Frequency ID = −1
    FOR each band i where the iD2D mesh operates
        IF Cost(Link_Set(m).Frequency Band Quality(i).Outgoing Link Quality) < Next Hop Link Cost
            Next Hop Link Cost = Cost(Link_Set(m).Frequency Band Quality(i).Outgoing Link Quality)
            Next Hop Frequency ID = i
        END
    END
    % Check if m has a shorter multi-band route towards n
    IF Routing_Set(n).Multi-Band Route Cost > (Node(n).Multi-band route
    cost + Next Hop Link Cost)
        Routing_Set(n).Multi-Band Route Cost = (Node(n).Multi-band route cost + Next Hop Link Cost)
        Routing_Set(n).Multi-Band Next Hop.ID of the Frequency Band =
        Next Hop Frequency ID
        Routing_Set(n).Multi-Band Next Hop.Next Hop Node ID = m
    END
END The Connectivity Updates may be broadcast based on a direct request from a wireless device (i.e. node) entering the mesh network (as illustrated in FIG. 40) or it may be done randomly to minimize collisions between Connectivity Update broadcasts originated from different nodes according to an internally defined average period between the broadcasts.

The control of the interval between broadcasts can be controlled centrally by one of the wireless devices of the mesh network (acting as a mesh controller) or in a distributed manner at each wireless device. In both cases, the selection of the average broadcast period may be proportional to the rate of change of the mesh network topology. These rate of changes may be detected both based on the number of received Connectivity Updates and their actual routing content. In other words, even if the wireless device receives a high number of Connectivity Updates from other wireless devices, but these updates do not reflect significant updates in the network topology (i.e. which can be detected based on the changes observed in the Routing_Set structure), then the interval between Connectivity Update broadcasts may be increased, e.g. by a predefined scaling factor g. In case the node receives a low number of Connectivity Updates, but it observes significant network topology changes, then the interval between Connectivity Update broadcasts may be decreased, e.g. by a predefined scaling factor g. Through this mechanism, the network is capable of auto-regulating in a distributed manner the rate at which the Connectivity Updates broadcasts occur.

Figure 44:
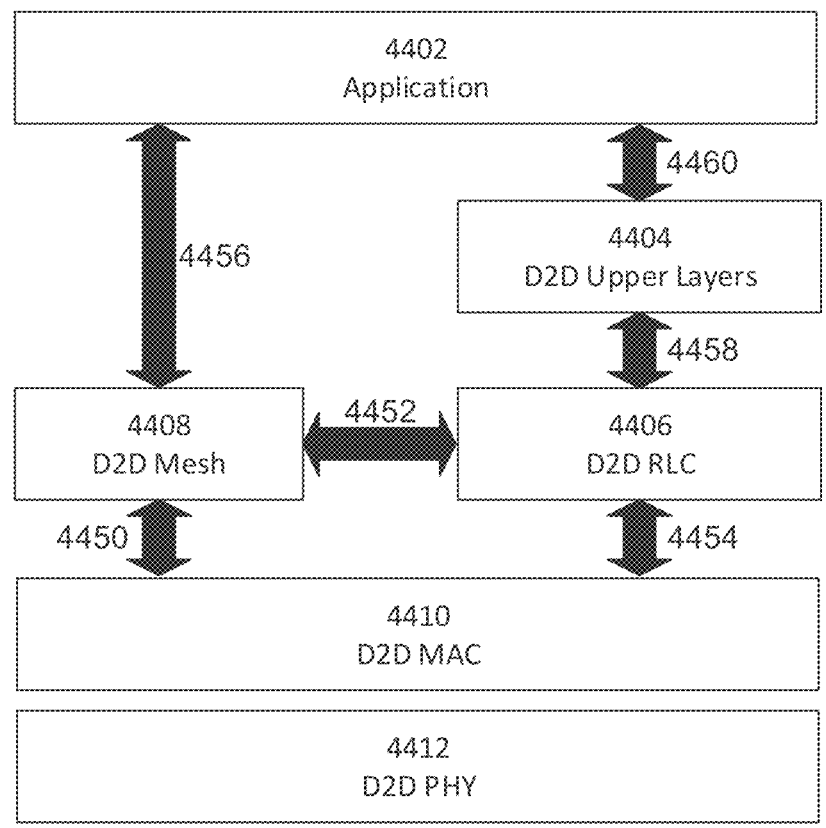
FIG. 44 shows a diagram illustrating a mesh functionality integration for the communication methods along with its interfaces according to some aspects.

FIG. 44 shows an exemplary diagram 4400 illustrating a mesh functionality integration for the communication methods along with its interfaces according to some aspects. It is appreciated that diagram 4300 may be simplified for purposes of this explanation.

To implement the methods and schemes described herein, D2D Mesh 4408 block is introduced into the protocol stack implemented by baseband modem 206. The interactions with the other layers, as illustrated in FIG. 44, may be described as follows: Routing establishment 4450; Support for relay of packets, segmentation and re-assembly of the relayed packets 4452; Control and validation of peer mesh nodes 4456; and 4454, 4458, and 4460 treat the multi-hop communication end-points as, for example, in direct peer communications.

Figure 45:
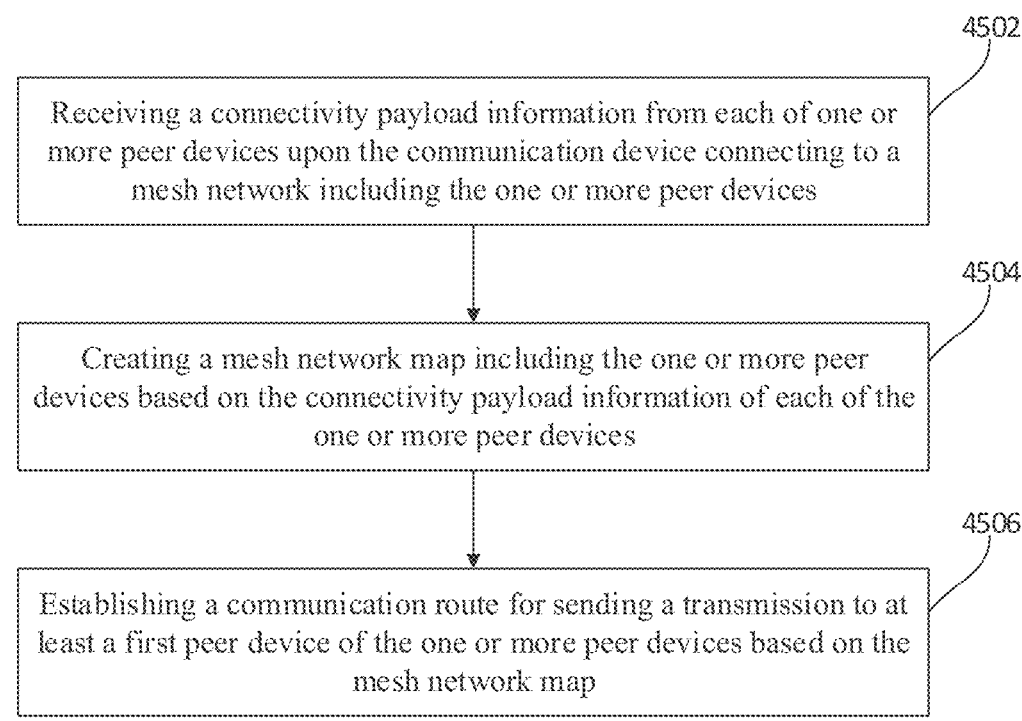
FIG. 45 shows a flowchart describing a method for performing wireless communications according to some aspects.

FIG. 45 is a flowchart 4500 describing a method for performing wireless communications for a communication device (i.e. wireless device) according to some aspects. It is appreciated that flowchart 4500 is exemplary in nature and may therefore be simplified for purposes of this explanation.

The method may include receiving a connectivity payload information from each of a plurality of peer devices upon the communication device connecting to a network including the plurality of peer devices 4502. This connectivity payload information may include Connectivity Update payload information as described herein.

The method may further include creating a network map including the plurality of peer devices based on the connectivity payload information of each of the plurality of peer devices 4504. This network map may include Link_Set and/or Routing_Set information as described herein.

The method may further include establishing a communication route for sending a transmission to one or more peer devices of the plurality of peer devices based on the network map 4506.

Figure 46:
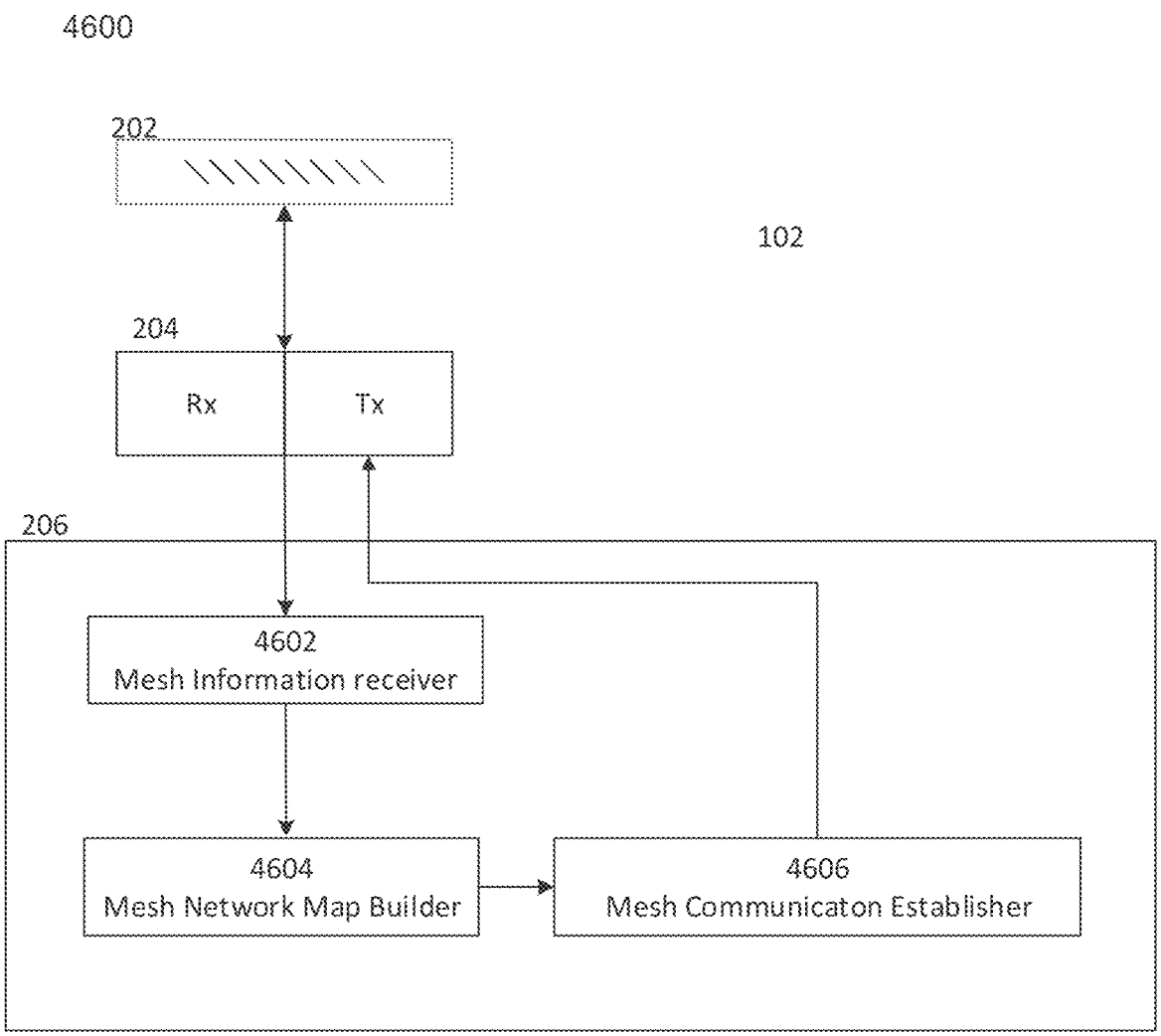
FIG. 46 shows an internal diagram for a wireless device according to some aspects.

FIG. 46 shows an internal diagram 4600 for a wireless device 102 depicting components according to some aspects. Accordingly, the illustrated depiction of FIG. 46 may omit certain components of wireless device 102 that are not directly related to the methods described herein. Additionally, components depicted as being separate in FIG. 46 may be incorporated into a single, hybrid component that performs the same functions as the separate components, and, similarly, single components may be split into two or more separate components that perform the same function as the single component.

As shown in FIG. 46, the baseband modem 206 may include a Mesh Information Receiver 4602 configured to receive a first information from each of a plurality of peer devices upon the communication device connecting to a network including the plurality of peer devices; a Mesh Network Map Builder 4604 configured to create a network map including the plurality of peer devices based on the first information of each of the plurality of peer devices; and a Mesh Network Communication Establisher 4606 configured to establish a communication route for sending a transmission to one or more peer devices of the plurality of peer devices based on the network map.

Various aspects relate generally to using a graphical user interface (GUI) to configure the usage of D2D technology in a wireless device.

FIG. 47 illustrates a comparison of power efficiency between cellular and D2D wireless links over distance between wireless devices within a heterogeneous framework. Ideally a wireless device will achieve communication at the least cost in terms of power, money, efficiency and range. At relatively short distances between wireless devices 4701, power efficiency 4702 is greater utilizing a D2D link 4710 as compared to a cellular link 4720. The power efficiency 4702 of a cellular link 4720 remains constant over the distance between wireless devices 4701 as compared that of a D2D link 4710 which decreases as the distance between wireless devices 4701 increases. At point 4730 the power efficiency 4702 is equal for a D2D link 4710 and a cellular link 4720.

Through the use of a GUI a user may optimize communications at the least cost in terms of power, money, efficiency and range.

Figure 48A:
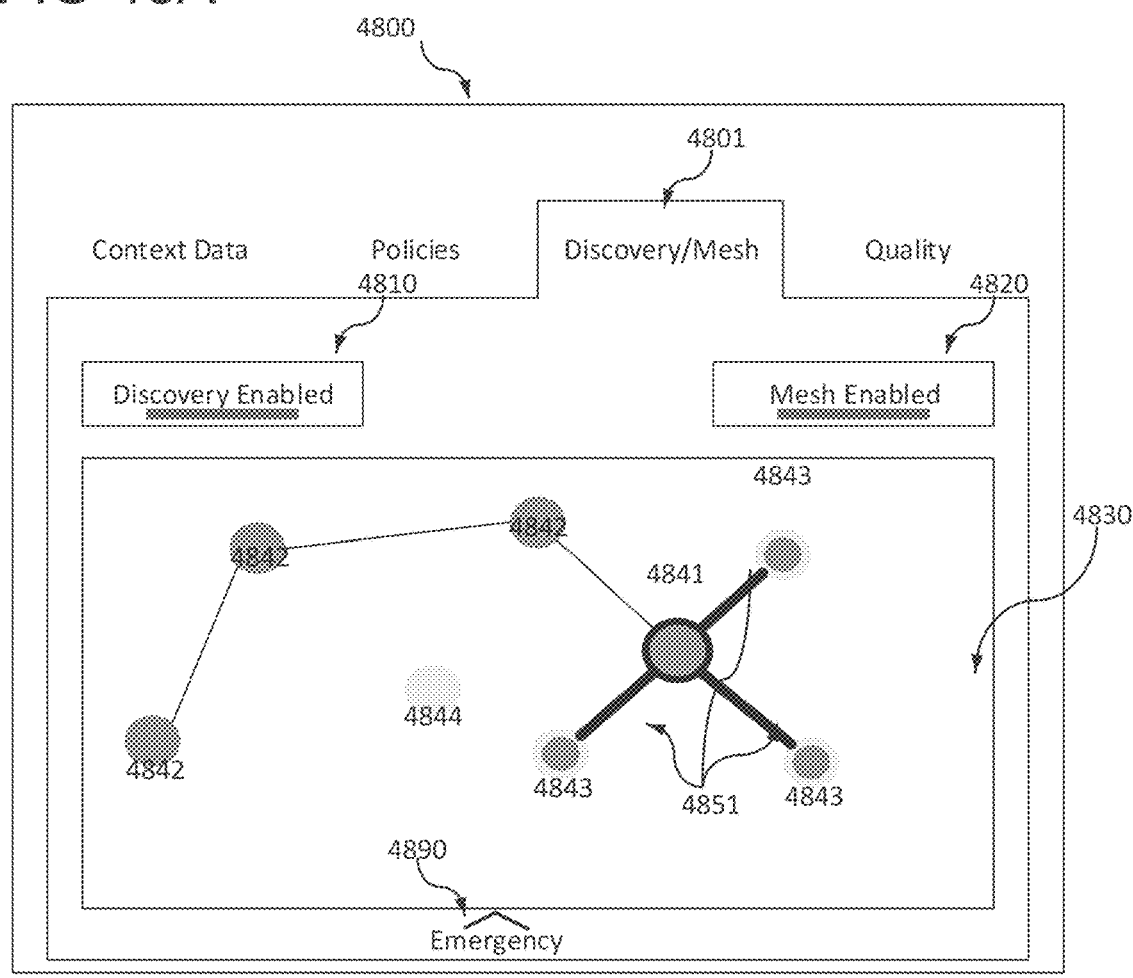
FIG. 48A-J shows exemplary graphical user interfaces (GUIs) in a wireless device according to some aspects.

FIG. 48A illustrates a GUI 4800 with a discovery/mesh display area 4801 for displaying exploration options. The display area includes a discovery toggle 4810 and a mesh toggle 4820. In the example of FIG. 48A, both the discovery toggle 4810 and a mesh toggle 4820 are activated. Activating discovery toggle 4810 allows for the ability to create peer-to-peer links 4851 with target wireless devices enabled with D2D technology. Activating mesh toggle 4820 allows for the ability to create mesh links 4852 with target wireless devices enable with D2D technology and mesh enabled. Mesh toggle 4820 is enabled when discovery toggle 4810 is activated. The network display area 4830 of discovery/mesh display area 4801 includes multiple nodes. Node 4841 represents the own wireless device. Nodes 4843 represent nodes that are available for discovery only. For example, peer nodes that represent a peer device that is within a range for establishing a direct link with the communication device. Peer-to-peer links 4851 can be used to connect node 4841 to nodes 4843. Nodes 4842a-c represent nodes that are available for mesh links. Mesh link 4852 can be used to connect node 4841 and nodes 4842a-c that are mesh enabled. Node 4844 represents a node in the network that is unreachable. FIG. 48A is one example of displaying links between nodes. Links between nodes may be represented in any number of other ways. GUI 4800 includes emergency option 4890 described in further detail below.

Figure 48B:
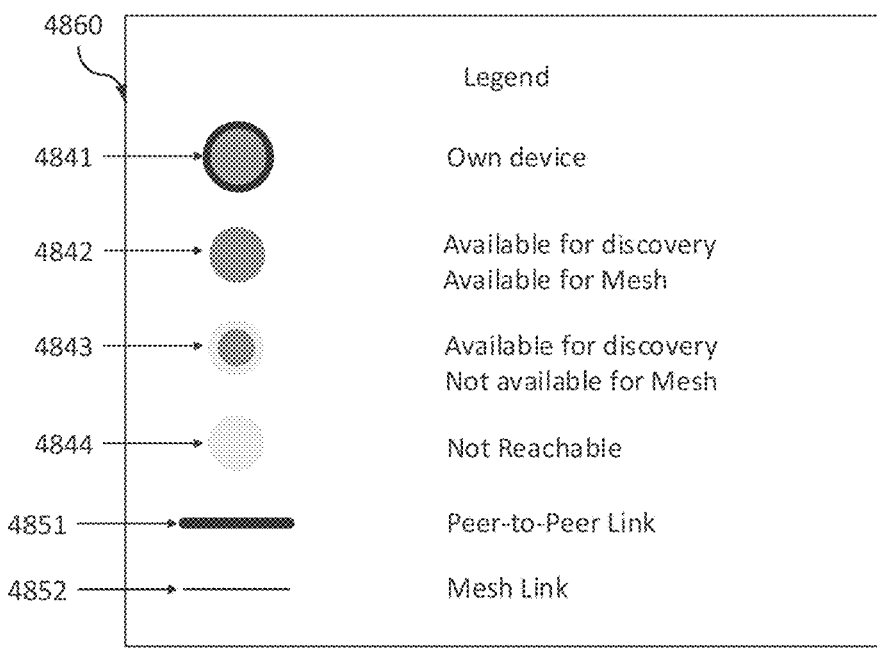

FIG. 48B illustrates a legend 4860 which describes what nodes represent. For example, node 4841 represents the communication device. For example, node 4842 represents peer device. For example node 4843 represents a further device. For example, node 4844 represents a not that cannot be reached by node 4841. For example link 4851 represents a direct link between the communication device and a peer node. For example link 4852 represents a link between peer node and a further node or between two further nodes.

Figure 48C:
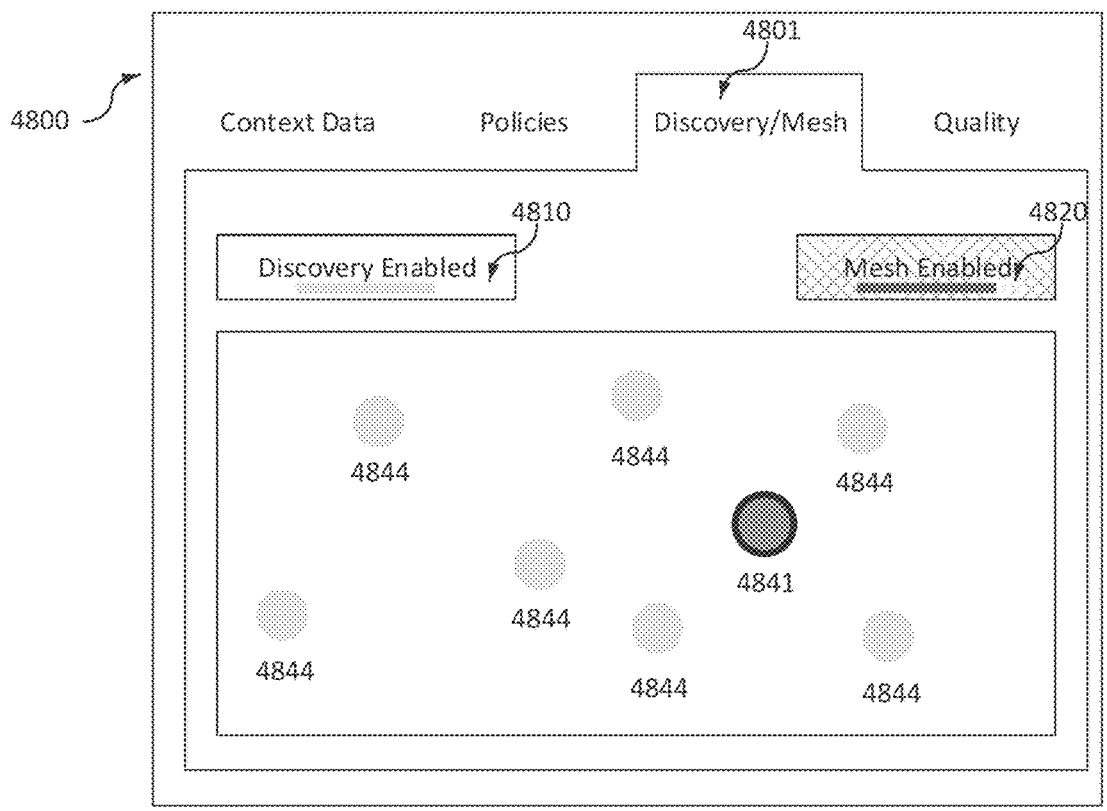

FIG. 48C illustrates discovery/mesh display area 4801 in which discovery toggle 4810 is deactivated. In this case the mesh toggle 4820 is disabled. When the discovery toggle 4810 is deactivated, the own wireless device 4841 is not discoverable by the nearby nodes 4844 and cannot discover nearby nodes 4844. In other words, node 4841 is invisible to the D2D technology network.

Figure 48D:
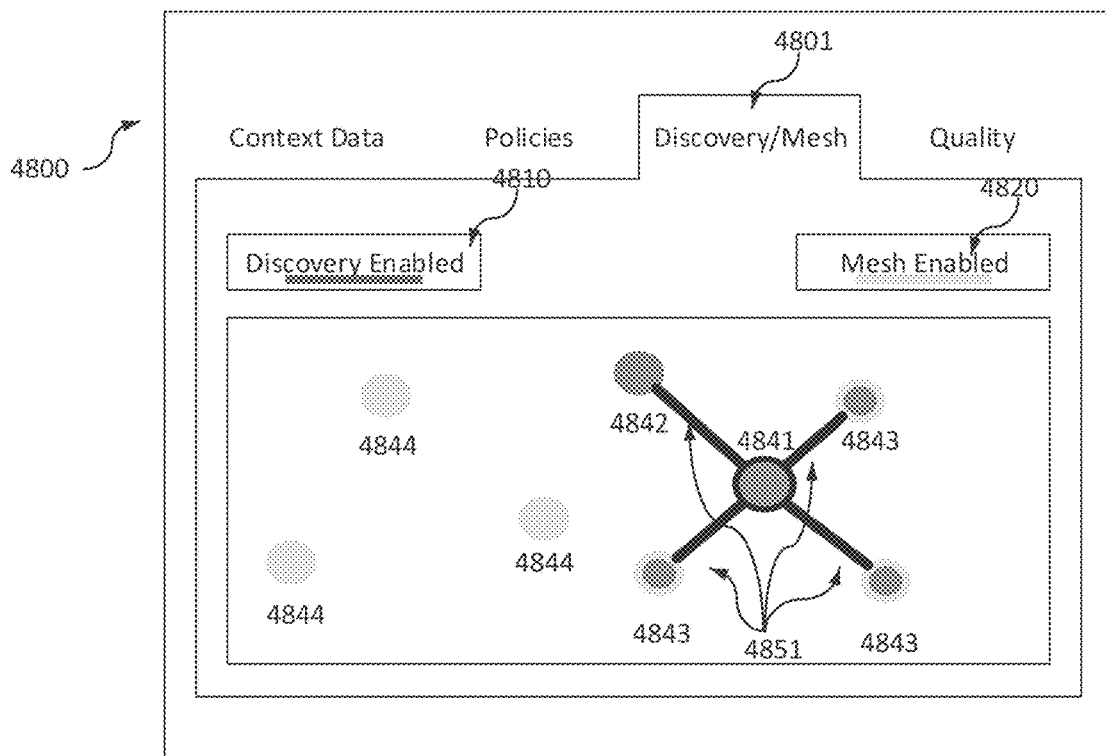

FIG. 48D illustrates discovery/mesh display area 4801 in which discovery toggle 4810 is activated. However, the mesh toggle 4820 is deactivated. When the discovery toggle 4810 is activated, but the mesh toggle 4820 is deactivated the own wireless device 4841 is only able to discover nearby nodes 4843 and 4842 through a peer-to-peer link 4851 and cannot discover nodes 4844.

Figure 48F:
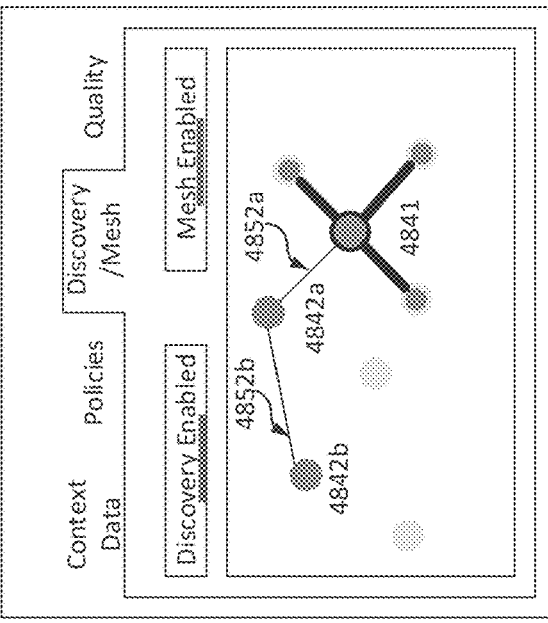
Figure 48G:
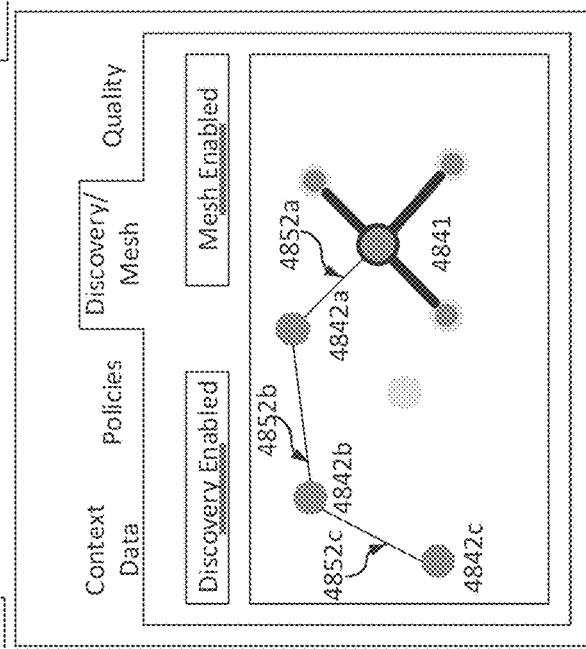
Figure 48E:
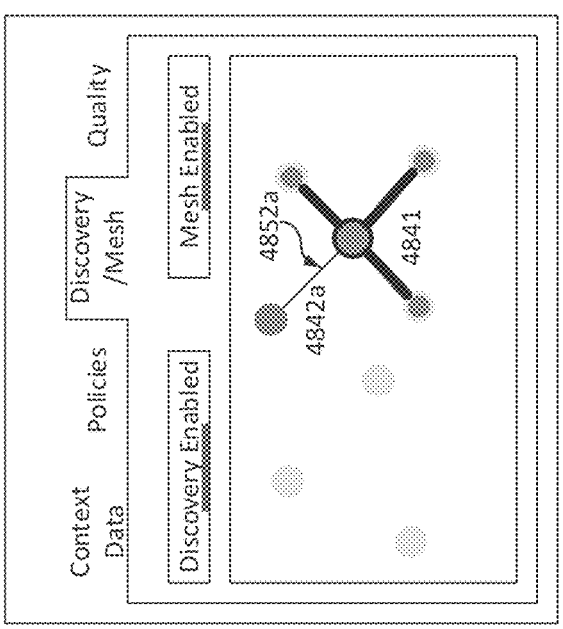

FIGS. 48E-G illustrate discovery of mesh nodes 4842*a*, 4842*b*, and 4842*c*. FIG. 48E illustrates Node 4842*a* connected to node 4841 through node connector 4852*a*. FIG. 48F illustrates a second mesh node 4842*b* connected to node 4841 through node 4842*a* through node connector 4852*b*. FIG. 48G illustrates a third mesh node 4842*c* connected to node 4841 through nodes 4842*a* and 4842*b* through node connector 4852*c*. By generating connectors 4852*a*-4852*c* between the communication device (node 4841), and the target device (node 4842*c*) through relay devices (nodes 4842*a*-4842*b*) a communication channel between the communication device and the target device is represented.

In some aspects, a line such as 4852*a* between a primary node, e.g. node 4841, and a peer node, e.g. node 4842*a*, may referred to as a primary node connector; a line such as 4852*b* between a peer node, e.g. node 4842*a*, and a further node, e.g. node 4842*b*, is a secondary node connector; and a line such as 4852*c* between a further node, e.g. node 4842*b*, and another further node, e.g. node 4842*c*, is a further node connector.

Figure 48H:
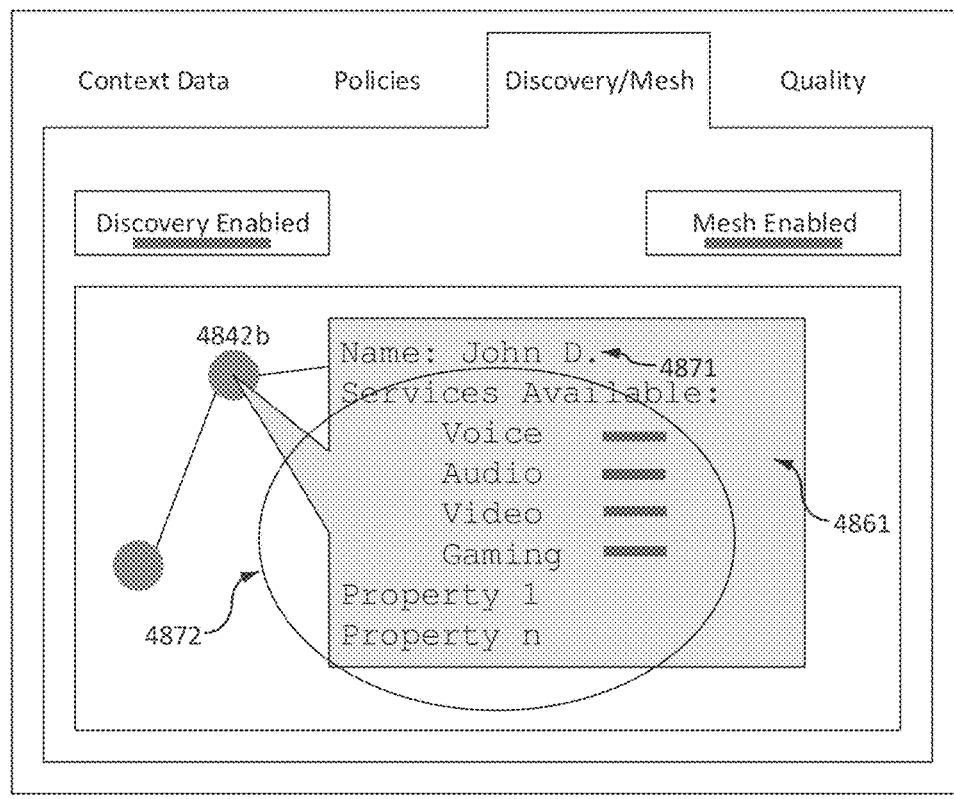
Figure 48I:
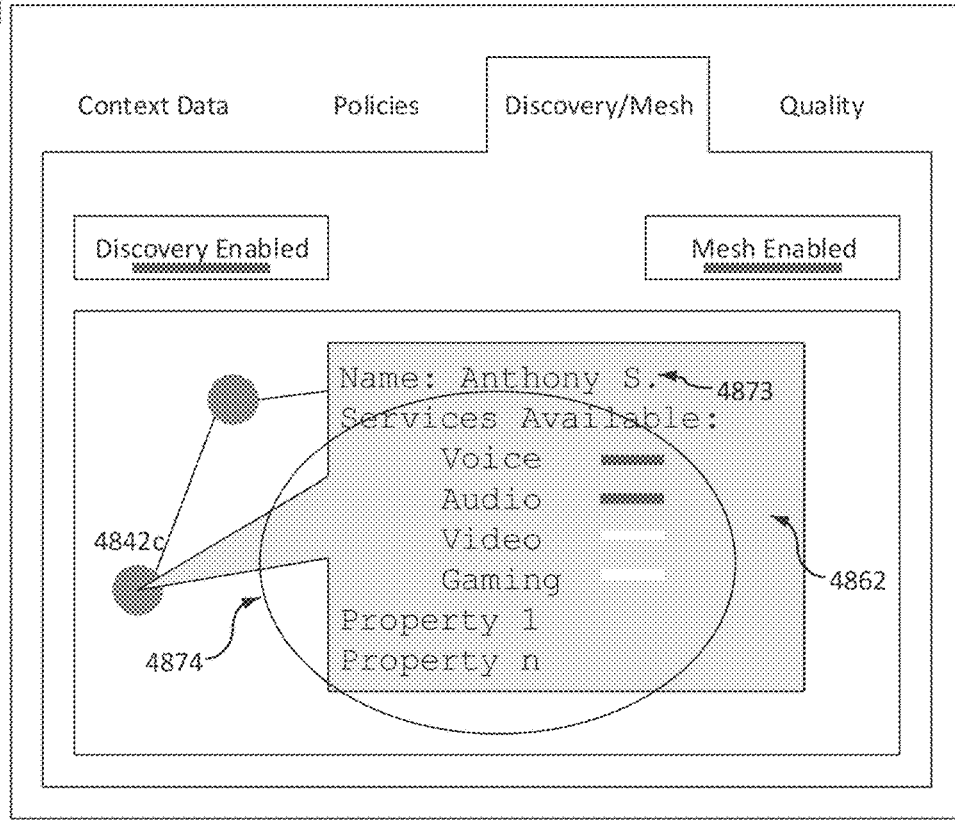

FIGS. 48H-I illustrate node details display area 4861 and 4862 respectively. Node details area 4861 displays details for node 4842*b*. Node details area 4861 displays a username 4871 as well as any number of properties 4872. For example node details area 4861 for node 4842*b* include properties 4872 indicating that the wireless device is enabled for voice, audio, video, and gaming. Node details area 4862 displays details for node 4842*c*. Node details area 4862 displays a username 4873 as well as any number of properties 4874. For example node details area 4862 for node 4842*c* include properties 4874 indicating that the wireless device is enabled for voice and audio, but is disabled for video and gaming.

Figure 48J:
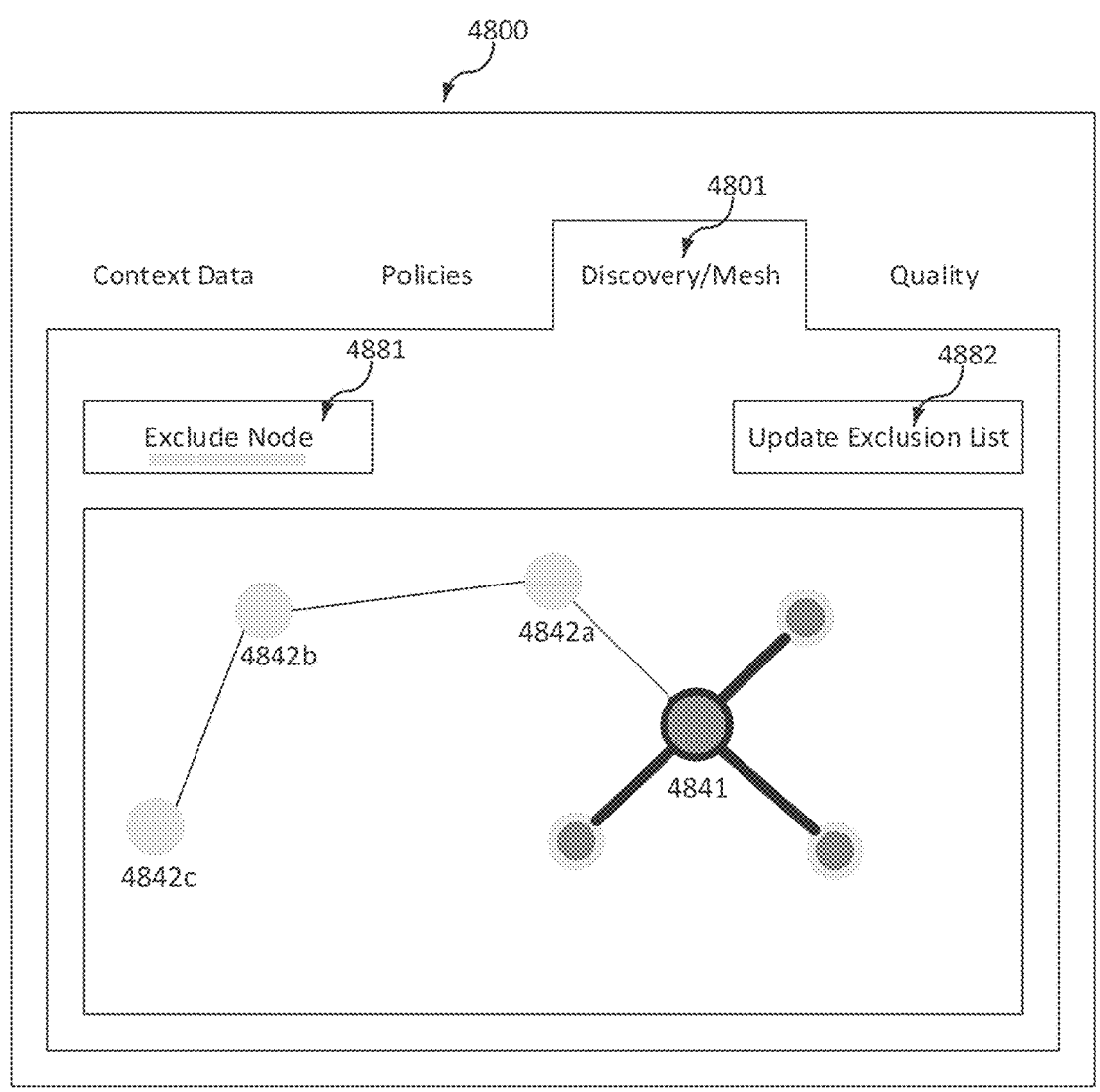

FIG. 48J illustrates GUI 4800 with a discovery/mesh display area 4801 for displaying exploration options. The display area includes an exclude node option 4881. Certain selected nodes 4842*a*-*c* which are connected to own wireless device 4841 may be excluded upon triggering 4881. Optionally, the GUI 4800 may also include an option to include nodes that have been previously excluded. Additionally, nodes may be excluded by default by entering a set of target User IDs to an exclusion list. In this example, selected nodes 4842*a*-*c* may be added to the exclusion list by triggering update exclusion option 4882.

Figure 49A:
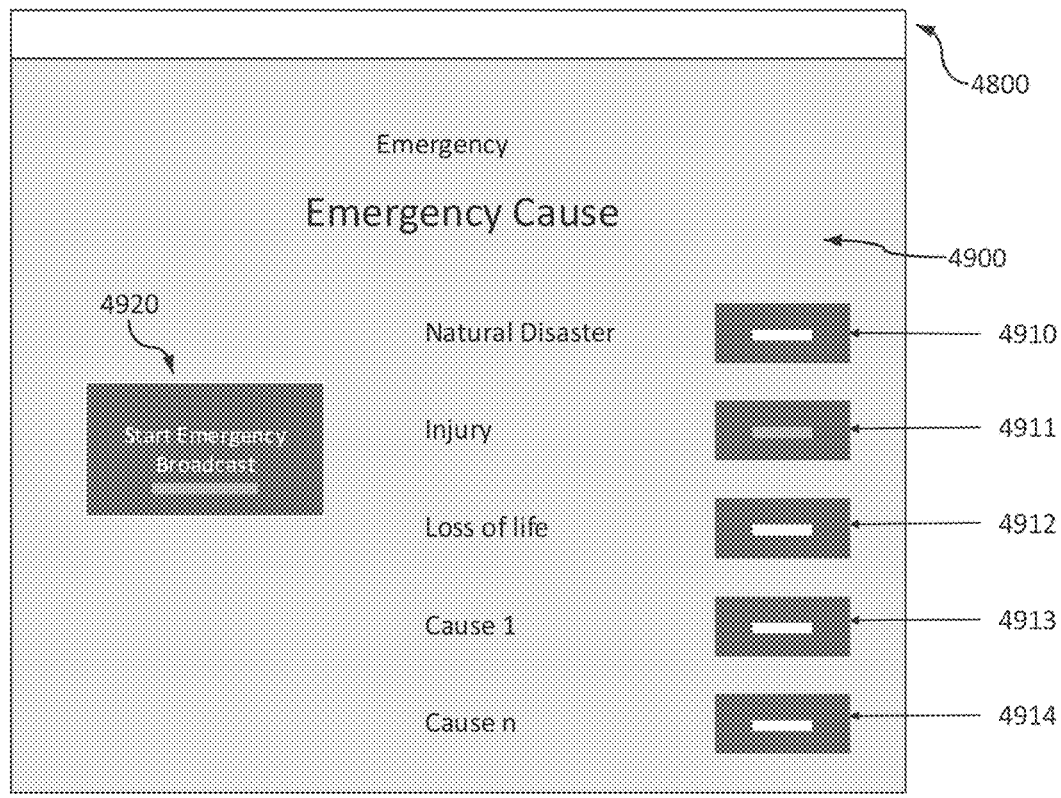
FIG. 49A-B shows exemplary GUIs illustrating an emergency mode in a wireless device according to some aspects.

FIG. 49A illustrates an emergency mode. The emergency menu may be made available in the GUI 4800 in an easy way to access, but without blocking access to the other options. An example is shown in the FIG. 48A. Emergency option 4890 may be triggered to display emergency display 4900. Emergency option 4890 may always be visible in every menu. Emergency display 4900 includes emergency cause options 4910-4914 and emergency broadcast trigger 4920. For example, emergency cause options can include natural disaster 4910, injury 4911, or loss of life 4912. Any number of other causes can be included. One or more emergency cause options 4910-4914 may be selected to indicate the emergency. Emergency broadcast 4920 may be triggered to initiate the broadcast of the emergency signal.

Figure 49B:
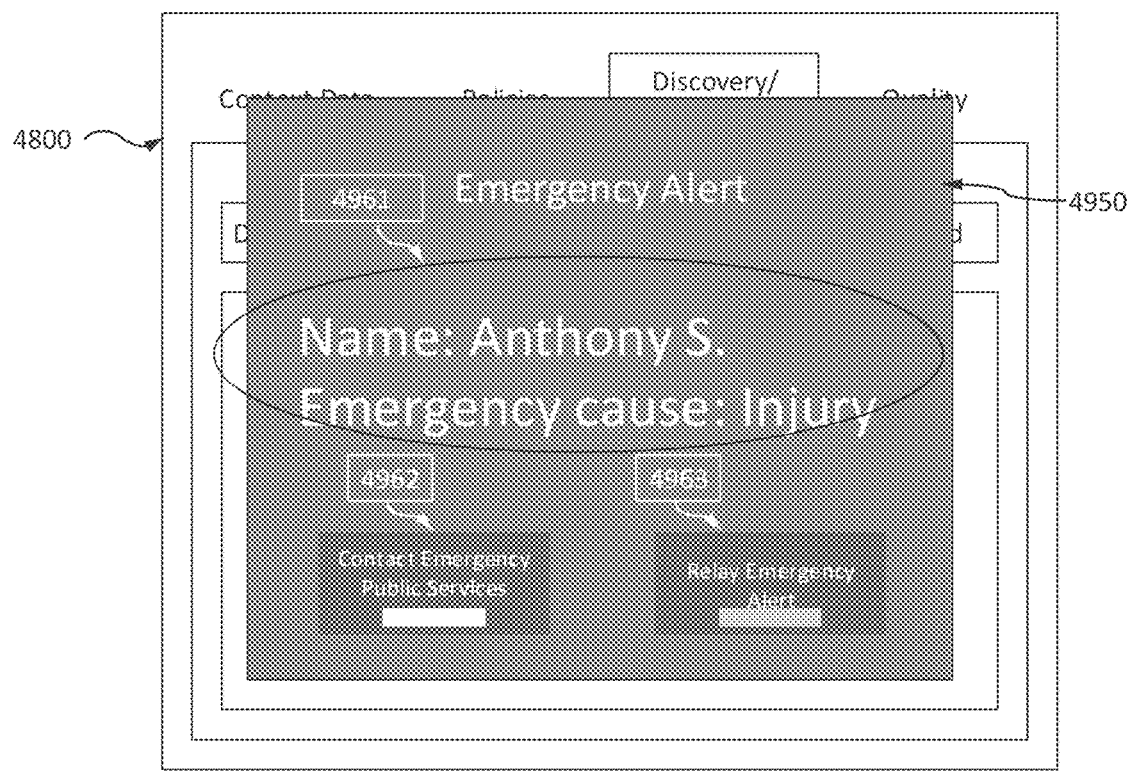

FIG. 49B illustrates emergency alert display 4950. A wireless device may display emergency alert 4950 upon receipt of a signal initiated by triggering emergency broadcast 4920. A connected wireless device may receive emergency alert 4950 to notify the connected wireless device of the emergency. Emergency alert display 4950 includes emergency details 4961. For example, emergency details 4961 may include a user name and emergency cause. Upon receiving emergency alert 4950 a connected user may select how to respond to the emergency. If cellular coverage is available, user may trigger contact emergency public services 4962 to contact the public emergency services. A user may choose to relay the emergency to a target device using D2D links by triggering relay emergency alert 4963.

Figure 50A:
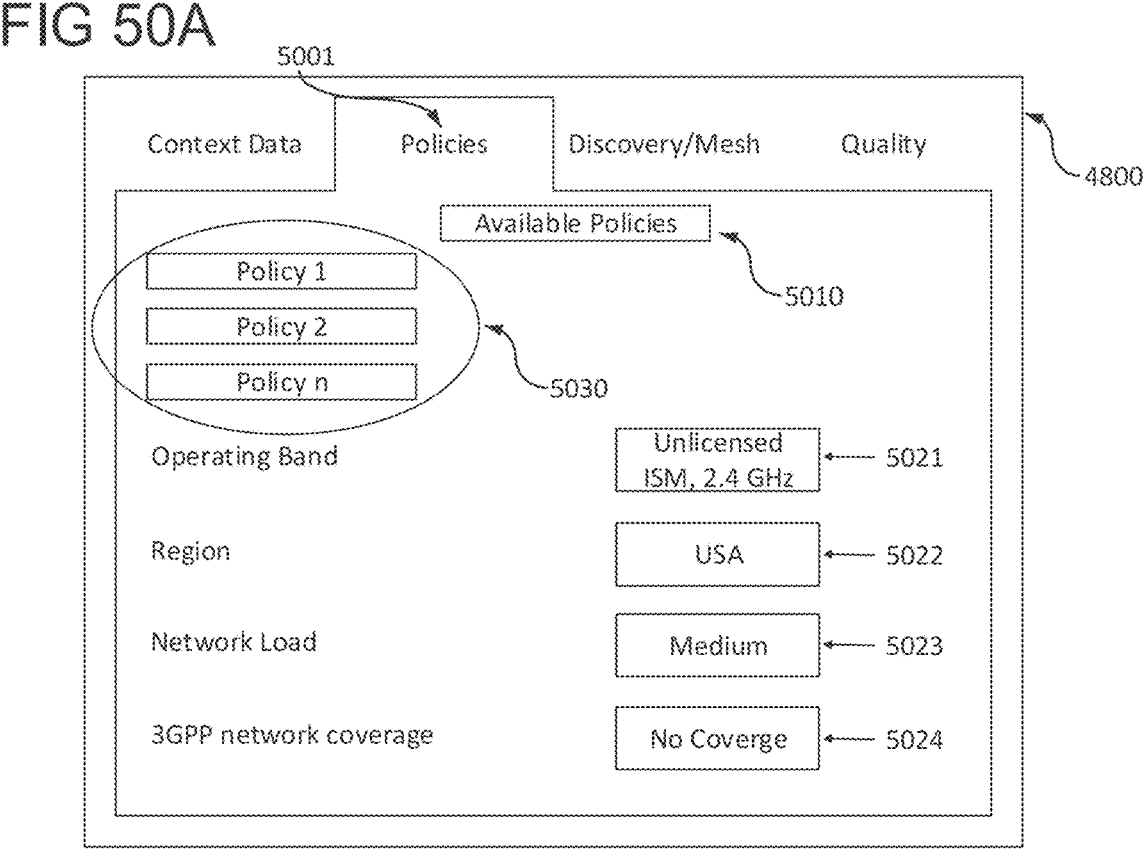
FIG. 50A-B show exemplary GUIs with a policy display area according to some aspects.
Figure 50B:
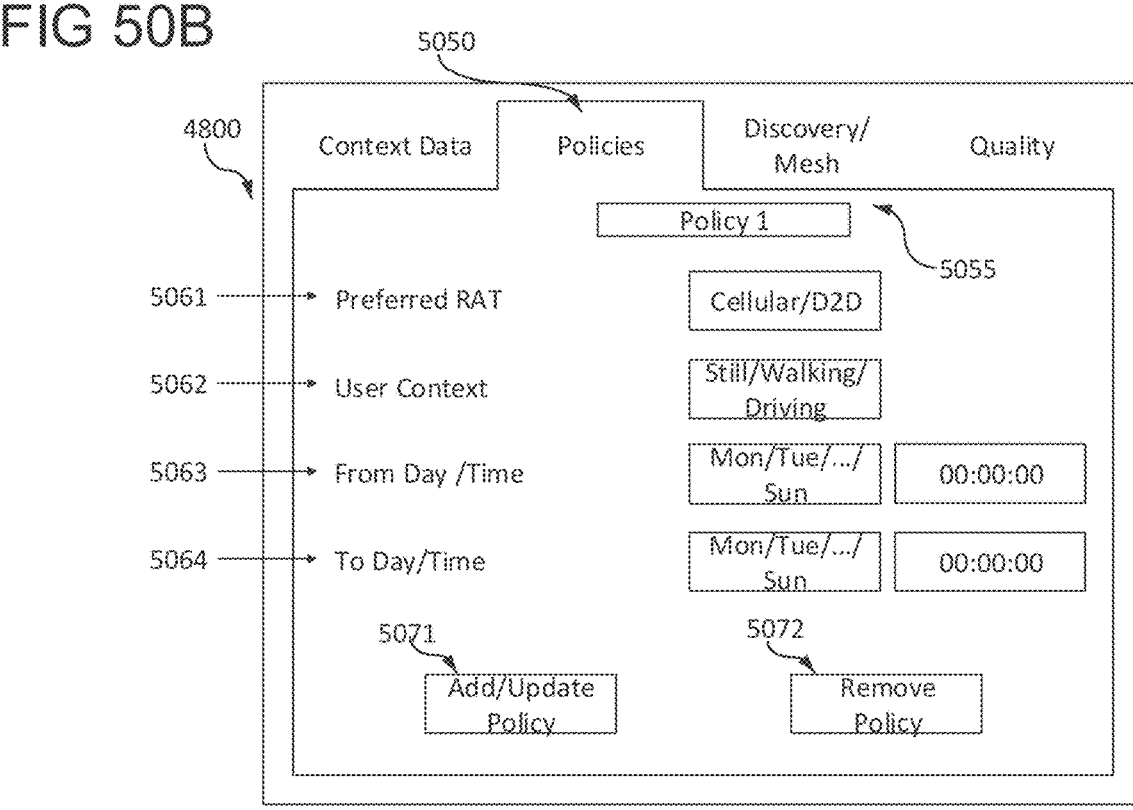

FIGS. 50A-B illustrate GUI 4800 with a policy display area 5001 and policy data display area 5050 respectively. Policy display area 5001 displays available policies option 5010. Available polices for the region may be displayed by triggering available policies option 5010. By default the application displays policy display area 5001 on initiation. Policy display area 5001 displays policy information related to the network and spectrum usage available for each region. For example, policy display area 5001 may include operating band 5021, region 5022, network load 5023, and 3GPP network coverage 5024. Triggering available policies option 5010 displays the available policies 5030 for the current region. For example, a user may select menu option available policies option 5010 to display a list of all the available policies 5030 valid for the current region such as regulatory policies. Upon selecting a policy from the list of available policies 5030, policy data display area 5050 is generated to display the configurable parameters of the selected policy. Policy data display area 5050 may display in a new area or temporarily replace the policy display area 5001 as shown in FIG. 50B. The list of available policy parameters are displayed by policy data display 5050 in response to selecting one of the available polices 5030. Policy data display 5050 may include configurable parameters for the selected policy 5055. For example, configurable parameters preferred Radio Access Technology 5061, user context 5062, from day and time 5063, and to day and time 5064 may be displayed in policy data display 5050. Other configurable parameters may be exposed through Policy data display 5050. The configurable parameters may be changed through policy data display 5050 by modifying any number of the available configurable parameters 5061-5064. Selected policy 5055 may be updated by modifying any number of the available configurable parameters 5061-5064 and initiating update policy 5071. Additionally, update policy 5071 may be used to add new policies. Selected policy 5055 may be removed by initiating remove policy 5072.

Figure 51:
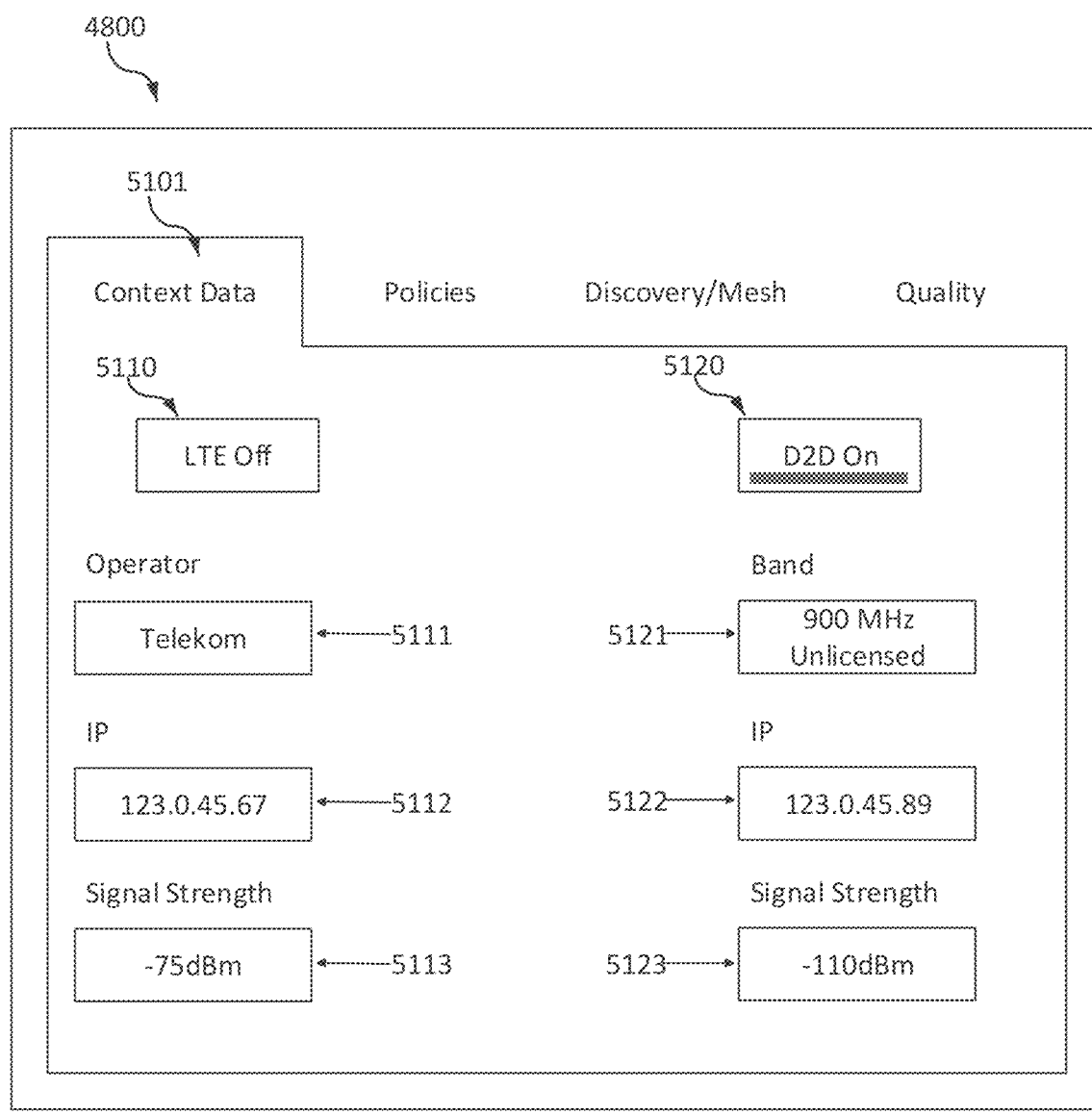
FIG. 51 shows a GUI with a context display area according to some aspects.

FIG. 51 illustrates a GUI 4800 with a context display area 5101. The context display area 5101 displays information on the status of available wireless links. For example link 5110 indicates the name of the wireless link, "LTE", and its status, "Off." As another example link 5120 indicates the name of the wireless link, "D2D", and its status, "On." Other possible statuses include "paused" and "sleep mode", but links may display any number of statuses. Other types of wireless links may be displayed in the context display area 5101. Corresponding information for the wireless links may be displayed along with its status. For example, displaying operator 5111, IP address 5112, and signal strength 5113 display associated with wireless link 5110. As another example, displaying band 5121, IP address 5122, and signal strength 5123 associated with wireless link 5120.

Figure 52:
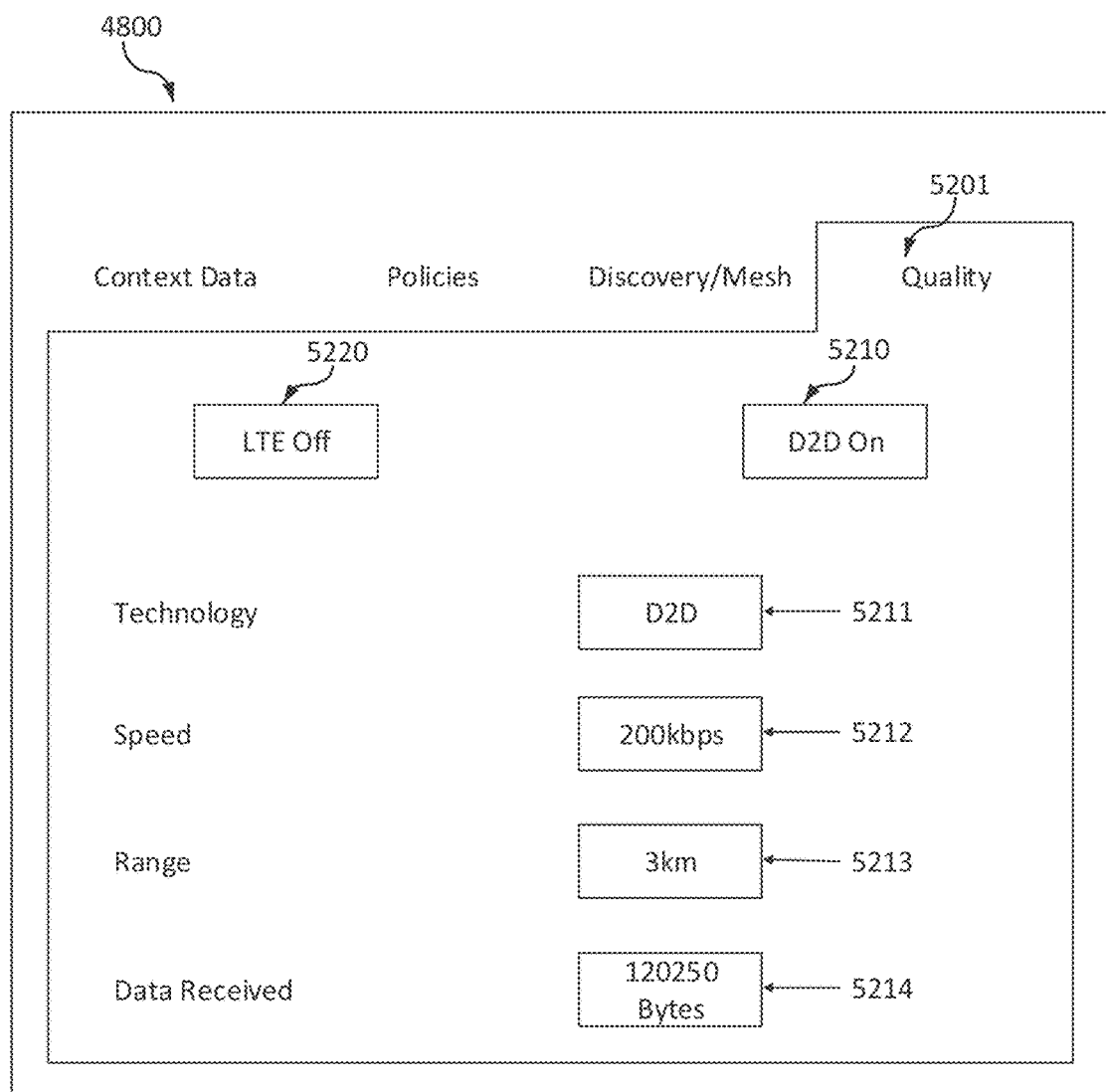
FIG. 52 shows a GUI with a quality display area according to some aspects.

FIG. 52 illustrates GUI 4800 with a quality display area 5201. The quality display area 5201 displays quality information for the activated wireless link 5210. For example, displaying quality information technology 5211, speed 5212, range 5213, and data received 5214 associated with activated wireless link 5210. No quality information is displayed for deactivated wireless link 5220. If wireless link 5220 is activated and its status changes to on, the quality information displayed will be associated with wireless link 5220.

Figure 53:
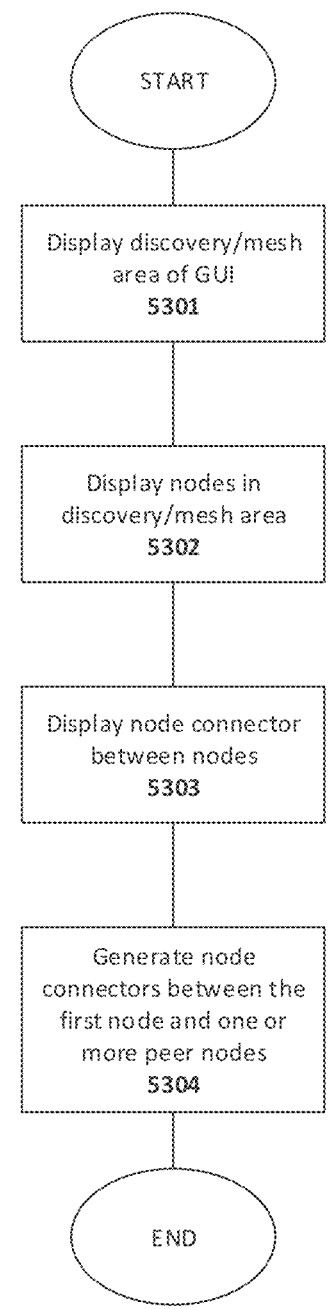
FIG. 53 shows a method for displaying a discovery/mesh area of a GUI according to some aspects.

FIG. 53 illustrates a method (the method may be performed by the one or more processors, e.g. by an Application processor 212) of displaying a discovery/mesh area of a GUI 5301; displaying nodes 5302; displaying node connectors 5303; and generating a node connectors between a first node and one or more peer nodes 5304.

Figure 54:
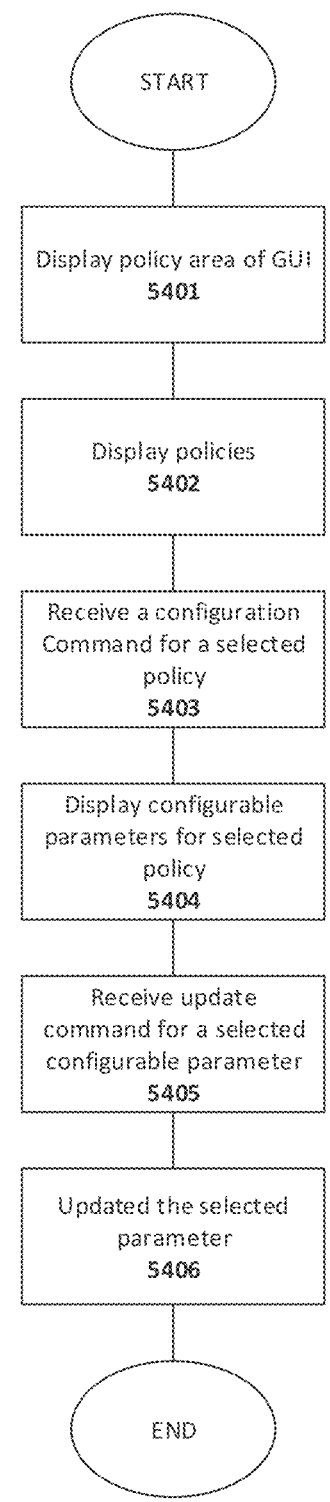
FIG. 54 shows a method for displaying a policy area of a GUI according to some aspects.

FIG. 54 illustrates a method (the method may be performed by the one or more processors, e.g. by an Application processor 212) of displaying a policy area of a GUI 5401; displaying policies 5402; receiving a configuration command for a selected policy 5403; displaying configurable parameters for the selected policy 5404; receiving an update command for a selected configurable parameter 5405; and updating the configurable parameter in response to the update command 5406.

Providing decision making mechanisms locally on a wireless device gives a distinct advantage for a wireless device in a heterogeneous wireless network. Providing a GUI for the decision making process allows a non-expert user to configure their wireless device for D2D technology easily and correctly.

To configure the wireless device for D2D technology the GUI provides several functionalities. The GUI provides a representation of a Multiple Radio Access Technology, including cellular and D2D technology, statuses in the heterogeneous network. The GUI includes quality and context information regarding the Multiple Radio Access Technologies available. The GUI provides representation of regulatory and network policies. The GUI allows for interaction for altering or influencing decisions regarding radio links including the exclusion of mesh nodes. Additionally the GUI may provide an emergency mode.

A wireless device including D2D technology may communicate with similarly enabled nearby wireless devices through a peer-to-peer link using an unlicensed spectrum. A user may decide to activate/deactivate and configure how to use the D2D technology depending on the context of the heterogeneous network. The GUI provides an efficient way for a non-expert user to make a decision when selecting and maintaining radio links based on context and quality information.

The GUI allows for optimum configuration of a wireless device given the heterogeneous network environment. For example, rooming scenarios, crowded networks and remote areas may require a different number of radio links operating simultaneously. Other factors to consider when configuring the wireless device include, the number of synchronized users to avoid battery drain, load balancing of data across different technologies, discoverability of the own wireless device and other devices on the network, inclusion of the own wireless device in the mesh network, and exclusion of other devices in the mesh network.

The GUI allows local decision subject to policies embedded in the wireless device such as regulatory aspects of using an unlicensed band. Typically a user can override some wireless device settings by manual configuration. It is non-trivial to present relevant network information in an easy, understandable, and accessible format for a non-expert user to configure and change the behavior of the wireless device. For example, allowing a user to change the selection of one or more radio links operating simultaneously.

The GUI allows easy and accessible presentation of key decision making parameters. It enables a user to easily interact with the decision making engines to influence or alter the decision making parameters of D2D technology on the wireless device. For example, modifying the selection data rate, range and number of users communicating in parallel. The GUI provides an easy to understand visualization of available links and their characteristics including data rate and range. Additionally the GUI allows a wireless device user to interact with the interface to influence or alter radio links in an intuitive way.

The GUI visualizes key radio link parameters such as available radio links and key performance indicators in an easy to understand way for all wireless device users. Such a GUI allows efficient interaction between the user and the wireless device to alter or influence wireless device decision regarding operating radio links. Additionally the GUI allows the user to choose which peer wireless devices to communicate using D2D technology.

To present the wireless device user with the key parameters related to the available radio links, the GUI may employ one or more of the four menu options described below:

Context Data: This menu item presents information on the status of available wireless links (such as "on", "off", "paused", "sleep mode", etc.), and the corresponding connection names (e.g. group names, user names).

Policies: This menu item presents information on available network coverage such as coverage (sub-option rooming), limited coverage (busy network) and no coverage (unlicensed). Typically, those network policies are highlighted which can be directly influenced by the wireless device User (for example, allow a manual overriding of network preferences). Policies that cannot be influenced by the user may be presented upon need.

Discovery/Mesh: This menu item allows interactive control of the discoverability state of the wireless device, its surrounding peers, the multi-hop/mesh connections;

Quality: The menu item presents information for multi-link quality, including data-rates for the used radio links (cellular vs D2D) as well as information of the total data received.

Typically validity parameters for each policy are presented for active policies and available policies depending on the activated sub menu. By default the user sees the active policy screen when selecting the Policies menu item. The active policy screen displays key parameters related to all relevant policies imposed by the network operator or regulatory body in each region. For example, one or more of the following parameters may be displayed:

Operating Band: This parameter indicates the band the wireless device is currently using, e.g. ISM unlicensed band 900 MHz.

Region: This parameter indicates to the user the current region, e.g. USA, Europe, China, and Canada. In overlapping regions, the user may select a desired band as different rules apply per country.

Network Load: This parameter indicates the load of D2D network, i.e. how many devices using the same D2D technology are in within range.

4G Coverage: This parameter indicates the availability of licensed network coverage, i.e. available, limited, or no coverage.

Concerning overriding a policy, such as a regulatory policy, an eXtensible Markup Language (XML) element may be added within each policy to define if the policy may or may not be overridden by the wireless device user. For example, element <andsfstrict> is added to each policy to define if the policy is "strict" or "not strict" and thus if cannot or can, respectively, be overridden by the wireless device User.

The Policy menu item allows the user to define policies for automatic selection of wireless links. In particular, a policy can define when there should be an automatic switch between cellular and D2D technology links. Typical scenarios on how a user may want to the device to behave are described below.

In scenario 1, if D2D technology connection is more energy efficient from the perspective of wireless device because D2D targets are in close proximity to the wireless device, the wireless device will choose to use D2D technology to communicate with the D2D targets. Otherwise, if D2D targets are not within close proximity, use cellular link to communicate with targets.

In scenario 2, the behavior of the user determines which technology to use. For example, when the user is moving fast a D2D technology connection is likely to break easily. As a result cellular technology is preferred. However if the user is in close proximity of the D2D target and the user is stationary or moving slowly the User may choose the D2D technology link.

In scenario 3, the User may program the preference between D2D technology and cellular technology depending on the time of day. For example, during office hours, D2D technology may be preferred and during out of office hours cellular may be preferred.

The Discovery/Mesh menu item allows the user to enable/disable the discoverability of the device towards the nearby devices, as well as to participate on the mesh networking whenever there are nearby D2D targets.

Figure 55:
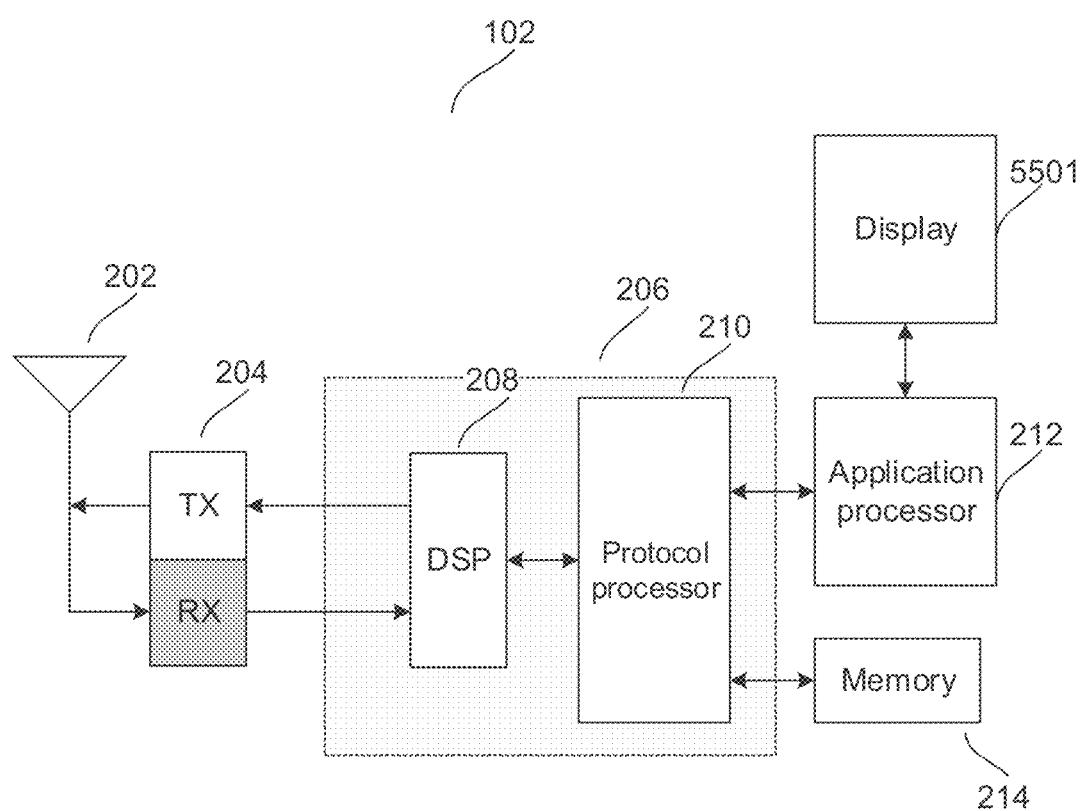
FIG. 55 shows an internal configuration of a wireless device according to some aspects.

FIG. 55 illustrates an internal configuration of wireless device 102 with a physical display 5501 according to some aspects. FIG. 55 is meant to complement the wireless device 102 shown in FIG. 2 with the addition of physical display 5501.

Application processor 212 may be configured to support user interactions with a user via physical display 5501, which may be, for example, a conventional touch display such as a Liquid Crystal (LCD) display, or, if display 5501 is not a touch display, a keypad (not pictured) may be provided for a user to operate the wireless device 102 in conjunction with display 5501.

Physical display 5501 may therefore be configured to provide the user with one or more of the screen displays, or other displays providing similar information, as shown in FIG. 48-52.

The application processor 212 may be configured to receive communications type information, e.g. mesh network information, from the baseband modem 206 and perform the methods described herein to convey wireless communications information including D2D technology information via physical display 5501.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples pertain to further aspects of this disclosure:

In Example 1, a communication device configured to perform wireless communications, including: a detector configured to monitor a frequency band for one or more other Radio Access Technologies (RATs); a determiner configured to determine one or more periods of a reduced interference with the one or more other RATs in one or more frequencies of the monitored frequency band; and a communicator configured to communicate a first signal during the one or more periods in the more or more frequencies, and communicate a second signal in the frequency band based on the communication of the first signal.

In Example 2, the subject matter of Example 1 may include wherein the first signal and the second signal are sent on different frequencies of the frequency band.

In Example 3, the subject matter of Example(s) 1-2 may include wherein the first signal is a control-type signal.

In Example 4, the subject matter of Example(s) 3 may include wherein the control-type signal is a discovery signal for Device to Device (D2D) communications.

In Example 5, the subject matter of Example(s) 3-4 may include wherein the control-type signal is a synchronization signal for D2D Communications.

In Example 6, the subject matter of Example(s) 3-5 may include wherein the control-type signal is a Transmission Request for D2D Communications.

In Example 7, the subject matter of Example(s) 3-6 may include wherein the control-type signal is a Transmission Request Acknowledgement for D2D Communications.

In Example 8 the subject matter of Example(s) 1-7 may include wherein the second signal is a data signal.

In Example 9, the subject matter of Example(s) 8 may include wherein the data signal includes D2D data.

In Example 10, the subject matter of Example(s) 1-9 may include wherein the first signal includes information indicating one or more frequencies for the communication of the second signal.

In Example 11, the subject matter of Example(s) 10 may include wherein the information includes multiple frequencies for the communication of the data signal.

In Example 12, the subject matter of Example(s) 10-11 may include wherein the data signal is communicated over the one or more indicated frequencies.

In Example 13, the subject matter of Example(s) 12 may include wherein the data signal is communicated over two or more frequencies.

In Example 14, the subject matter of Example(s) 1-13 may include the determiner configured to determine an energy for each of the one or more frequencies of the frequency band.

In Example 15, the subject matter of Example(s) 14 may include the determiner configured to determine the one or more period of reduced interference by comparing the energy of each of the respective frequency of the one or more frequencies to a power threshold.

In Example 16, the subject matter of Example(s) 15 may include wherein the determiner is configured to determine that the one or more frequencies are occupied when the energy is greater than the power threshold and determine that the one or more frequencies are unoccupied when the energy is less than the power threshold.

In Example 17, the subject matter of Example(s) 16 may include wherein the determiner is configured to determine that the one or more frequencies are occupied when the energy is equal to the power threshold.

In Example 18, the subject matter of Example(s) 16 may include wherein the determiner is configured to determine that the one or more frequencies are unoccupied when the energy is equal to the power threshold.

In Example 19, the subject matter of Example(s) 15-18 may include the determiner further configured to initiate a back off period on the respective frequency when the respective energy is greater than the power threshold.

In Example 20, the subject matter of Example(s) 19 may include wherein the back off period is determined based on a frame length for the RAT corresponding to the first and second signal.

In Example 21, the subject matter of Example(s) 1-20 may include wherein the first signal and second signal are transmitted via a RAT that is different from the one or more other RATs.

In Example 22, the subject matter of Example(s) 21 may include wherein the RAT is a D2D long-range communications technology.

In Example 23, the subject matter of Example(s) 1-22 may include wherein the one or more other RATs include Wifi or an 802.11 wireless technology.

In Example 24, the subject matter of Example(s) 23 may include wherein the one or more frequencies include one or more guard bands used in Wifi or the 802.11 wireless technology communications.

In Example 25, the subject matter of Example(s) 1-24 may include wherein the one or more other RATs include Bluetooth.

In Example 26, the subject matter of Example(s) 1-25 may include wherein the detector is configured to monitor the one or more frequencies prior to each respective communication of the first signal and the second signal.

In Example 27, the subject matter of Example(s) 1-26 may include the detector operatively coupled to a transceiver.

In Example 28, the subject matter of Example(s) 27 may include the transceiver operatively coupled to an antenna.

In Example 29, the subject matter of Example(s) 27-28 may include wherein at least one of the transceiver or the antenna are configured to operate for a plurality of RATs.

In Example 30, the subject matter of Example(s) 29 may include wherein the plurality of RATs include D2D and at least one of Wifi or Bluetooth.

In Example 31, a method for performing wireless communications, the method including: monitoring a frequency band for one or more other Radio Access Technologies (RATs); determining one or more periods of a reduced interference with the one or more other RATs in one or more frequencies of the monitored frequency band; and communicating a first signal during the one or more periods in the more or more frequencies, and communicating a second signal in the frequency band based on the communication of the first signal.

In Example 32, the subject matter of Example(s) 31 may include communicating the first signal and the second signal on different frequencies of the frequency band.

In Example 33, the subject matter of Example(s) 31-32 may include wherein the first signal is a control-type signal.

In Example 34, the subject matter of Example(s) 33 may include wherein the control-type signal is a discovery signal for Device to Device (D2D) communications.

In Example 35, the subject matter of Example(s) 33-34 may include wherein the control-type signal is a synchronization signal for D2D Communications.

In Example 36, the subject matter of Example(s) 33-35 may include wherein the control-type signal is a Transmission Request for D2D Communications.

In Example 37, the subject matter of Example(s) 33-36 may include wherein the control-type signal is a Transmission Request Acknowledgement for D2D Communications.

In Example 38, the subject matter of Example(s) 31-37 may include wherein the second signal is a data signal.

In Example 39, the subject matter of Example(s) 38 may include wherein the data signal includes D2D data.

In Example 40, the subject matter of Example(s) 31-39 may include wherein the first signal includes information indicating one or more frequencies for the communication of the second signal.

In Example 41, the subject matter of Example(s) 40 may include wherein the information includes multiple frequencies for the communication of the data signal.

In Example 42, the subject matter of Example(s) 40-41 may include communicating the data signal over the one or more indicated frequencies.

In Example 43, the subject matter of Example(s) 42 may include communicating the data signal over two or more frequencies.

In Example 44, the subject matter of Example(s) 31-43 may include determining an energy for each of the one or more frequencies of the frequency band.

In Example 45, the subject matter of Example(s) 44 may include determining the one or more period of reduced interference by comparing the energy of each of the respective frequency of the one or more frequencies to a power threshold.

In Example 46, the subject matter of Example(s) 45 may include determining that the one or more frequencies are occupied when the energy is greater than the power threshold and determine that the one or more frequencies are unoccupied when the energy is less than the power threshold.

In Example 47, the subject matter of Example(s) 46 may include determining that the one or more frequencies are occupied when the energy is equal to the power threshold.

In Example 48, the subject matter of Example(s) 46 may include determining that the one or more frequencies are unoccupied when the energy is equal to the power threshold.

In Example 49, the subject matter of Example(s) 45-48 may include initiating a back off period on the respective frequency when the respective energy is greater than the power threshold.

In Example 50, the subject matter of Example(s) 49 may include determining the back off period is based on a frame length for the RAT corresponding to the first and second signal.

In Example 51, the subject matter of Example(s) 31-50 may include wherein the first signal and second signal are transmitted via a RAT that is different from the one or more other RATs.

In Example 52, the subject matter of Example(s) 51 may include wherein the RAT is a D2D long-range communications technology.

In Example 53, the subject matter of Example(s) 31-52 may include wherein the one or more other RATs includes Wifi or an 802.11 wireless technology.

In Example 54, the subject matter of Example(s) 53 may include wherein the one or more frequencies include one or more guard bands used in Wifi or the 802.11 wireless technology communications.

In Example 55, the subject matter of Example(s) 31-54 may include wherein the one or more other RATs include Bluetooth.

In Example 56, the subject matter of Example(s) 31-55 may include monitoring the one or more frequencies prior to each respective communication of the first signal and the second signal.

In Example 57, the subject matter of Example(s) 31-56 may include sharing an antenna for communication of the one or more RATs and communication of the first signal and the second signal.

In Example 58, one or more non-transitory computer-readable media storing instructions thereon that, when executed by at least one processor of a communication device, direct the communication device to perform the subject matter of any one of Examples 31-57.

In Example 59, a communication device with one or more processors configured to: monitor a frequency band for one or more other Radio Access Technologies (RATs); determine one or more periods of a reduced interference with the one or more other RATs in one or more frequencies of the monitored frequency band; and communicate a first signal during the one or more periods in the more or more frequencies, and communicate a second signal in the frequency band based on the communication of the first signal. The one or more processors of the communication device of Example 59 may further be configured to perform the subject matter of any one of Examples 32-57.

In Example 60, a communication device including means to monitor a frequency band for one or more other Radio Access Technologies (RATs); means to determine one or more periods of a reduced interference with the one or more other RATs in one or more frequencies of the monitored frequency band; and means to communicate a first signal during the one or more periods in the more or more frequencies, and communicate a second signal in the frequency band based on the communication of the first signal. The communication device of Example 60 may further include means to perform the subject matter of any one of Examples 32-57, In Example 61, a communication device including; a resource determiner configured to determine a first resource requirement needed to communicate via a first Radio Access Technologies (RAT) and a second resource requirement needed to communicate via a second RAT, wherein the first RAT has a higher priority to a resource set than the second RAT; and an aligner configured to allocate a first subset of the resource set to the first RAT based on the first resource requirement and a second subset of the resource set to the second RAT based on the second resource requirement, wherein the first subset and the second subset are aligned to minimize interruptions in communications of the second RAT due to the first RAT.

In Example 62, the subject matter of Example(s) 61 may include wherein the resource set includes time and/or frequency resources.

In Example 63, the subject matter of Example(s) 61-62 may include wherein the time and/or frequency resources are shared by the first RAT and the second RAT.

In Example 64, the subject matter of Example(s) 61-63 may include wherein the aligner is configured to allocate the first subset and the second subset using a coexistence frame structure for communicating via the first RAT and the second RAT.

In Example 65, the subject matter of Example(s) 64 may include wherein the frame structure includes a plurality of slots in a shared frequency band of the first RAT and the second RAT.

In Example 66, the subject matter of Example(s) 65 may include wherein the aligner is configured to allocate a first set of slots of the plurality of slots for control signaling of the second RAT.

In Example 67, the subject matter of Example(s) 66 may include wherein the aligner is configured to allocate a second set of slots of the plurality of slots for data signaling of the second RAT.

In Example 68, the subject matter of Example(s) 66-67 may include wherein the aligner is configured to allocate a third set of slots of the plurality of slots to the first RAT.

In Example 69, the subject matter of Example(s) 68 may include wherein the aligner is configured to allocate the third set of slots so as not to coincide with the first set of slots.

In Example 70, the subject matter of Example(s) 66-69 may include wherein the aligner is configured to allocate a third set of slots of the plurality of slots during guard intervals of the first set of slots and/or the second set of slots.

In Example 71, the subject matter of Example(s) 66-70 may include wherein the aligner is configured to allocate the first set of slots based on a transmission profile of the first RAT.

In Example 72, the subject matter of Example(s) 71 may include wherein the first RAT is Bluetooth and the transmission profile is at least one of a Hands-Free Profile (HFP), an Advanced Audio Distribution Profile (A2DP), a Basic Printing Profile (BPP), a Dial-Up Networking (DUN) or an Object Push Profile (OPP).

In Example 73, the subject matter of Example(s) 71 may include wherein the first RAT is Wifi or an 802.11 wireless technology.

In Example 74, the subject matter of Example(s) 66-73 may include wherein the aligner is configured to dynamically allocate the third set of slots based on a change in a transmission profile of the first RAT, wherein the dynamic allocation of the third set modifies the second set of slots.

In Example 75, the subject matter of Example(s) 61-74 may include wherein the aligner is configured to determine secondary allocations of the first subset and the second subset, wherein the secondary allocations include alignments of the first subset and the second subset that are also aligned to minimize interruptions in communications of the second RAT due to the first RAT.

In Example 76, the subject matter of Example(s) 61-75 may include a distributor configured to communicate the allocation of the first subset and the second subset to a peer device.

In Example 77, the subject matter of Example(s) 76 may include wherein the distributor is configured to communicate the secondary allocations to the peer device.

In Example 78, the subject matter of Example(s) 77 may include wherein the distributor is further configured to receive from the peer device at least one of the peer device's allocation of a peer device's first subset of resources of the first RAT and a peer device's second subset of resources of the second RAT; or the peer device's secondary allocations including other possible allocations of the peer device's first subset of resources of the first RAT and the peer device's second subset of resources of the second RAT.

In Example 79, the subject matter of Example(s) 78 may include wherein the aligner is configured to align the allocation of the first subset and the second subset based on information received from the peer device.

In Example 80, the subject matter of Example(s) 61-79 may include wherein the second RAT is a Device to Device (D2D) wireless technology.

In Example 81, a method for wireless communications, the method including: determining a first resource requirement needed to communicate via a first Radio Access Technologies (RAT) and a second resource requirement needed to communicate via a second RAT, wherein the first RAT has a higher priority to a resource set than the second RAT; and allocating a first subset of the resource set to the first RAT based on the first resource requirement and a second subset of the resource set to the second RAT based on the second resource requirement, wherein the first subset and the second subset are aligned to minimize interruptions in communications of the second RAT due to the first RAT.

In Example 82, the subject matter of Example(s) 81 may include wherein the resource set includes time and/or frequency resources.

In Example 83, the subject matter of Example(s) 81-82 may include wherein the time and/or frequency resources are shared by the first RAT and the second RAT.

In Example 84, the subject matter of Example(s) 81-83 may include allocating the first subset and the second subset using a coexistence frame structure for communicating via the first RAT and the second RAT.

In Example 85, the subject matter of Example(s) 84 may include wherein the frame structure includes a plurality of a shared frequency band of the first RAT and the second RAT.

In Example 86, the subject matter of Example(s) 85 may include allocating a first set of slots of the plurality of slots for control signaling of the second RAT.

In Example 87, the subject matter of Example(s) 86 may include allocating a second set of slots of the plurality of slots for data signaling of the second RAT.

In Example 88, the subject matter of Example(s) 86-87 may include allocating a third set of slots of the plurality of slots to the first RAT.

In Example 89, the subject matter of Example(s) 88 may include allocating the third set of slots so as not to coincide with the first set of slots.

In Example 90, the subject matter of Example(s) 86-89 may include allocating a third set of slots of the plurality of slots during guard intervals of the first set of slots and/or the second set of slots.

In Example 91, the subject matter of Example(s) 86-90 may include allocating the first set of slots based on a transmission profile of the first RAT.

In Example 92, the subject matter of Example(s) 91 may include wherein the first RAT is Bluetooth and the transmission profile is at least one of a Hands-Free Profile (HFP), an Advanced Audio Distribution Profile (A2DP), a Basic Printing Profile (BPP), a Dial-Up Networking (DUN) or an Object Push Profile (OPP).

In Example 93, the subject matter of Example(s) 91 may include wherein the first RAT is Wifi or an 802.11 wireless technology.

In Example 94, the subject matter of Example(s) 86-93 may include dynamically allocating the third set of slots based on a change in a transmission profile of the first RAT, wherein the dynamic allocation of the third set modifies the second set of slots.

In Example 95, the subject matter of Example(s) 81-94 may include determining secondary allocations of the first subset and the second subset, wherein the secondary allocations include alignments of the first subset and the second subset that are also aligned to minimize interruptions in communications of the second RAT due to the first RAT.

In Example 96, the subject matter of Example(s) 81-95 may include communicating the allocation of the first subset and the second subset to a peer device.

In Example 97, the subject matter of Example(s) 96 may include communicating the secondary allocations to the peer device.

In Example 98, the subject matter of Example(s) 97 may include receiving from the peer device at least one of the peer device's allocation of a peer device's first subset of resources of the first RAT and a peer device's second subset of resources of the second RAT; or the peer device's secondary allocations including other possible allocations of the peer device's first subset of resources of the first RAT and the peer device's second subset of resources of the second RAT.

In Example 99, the subject matter of Example(s) 98 may include aligning the allocation of the first subset and the second subset based on information received from the peer device.

In Example 100, the subject matter of Example(s) 81-99 may include wherein the second RAT is a Device to Device (D2D) wireless technology.

In Example 101, one or more non-transitory computer-readable media storing instructions thereon that, when executed by at least one processor of a communication device, direct the communication device to perform the subject matter of any one of Examples 81-100.

In Example 102, a communication device with one or more processors configured to: determine a first resource requirement needed to communicate via a first Radio Access Technologies (RAT) and a second resource requirement needed to communicate via a second RAT, wherein the first RAT has a higher priority to a resource set than the second RAT; and allocate a first subset of the resource set to the first RAT based on the first resource requirement and a second subset of the resource set to the second RAT based on the second resource requirement, wherein the first subset and the second subset are aligned to minimize interruptions in communications of the second RAT due to the first RAT. The one or more processors of the communication device of Example 102 may further be configured to perform the subject matter of Examples 82-100.

In Example 103, a communication device including means to determine a first resource requirement needed to communicate via a first Radio Access Technologies (RAT) and a second resource requirement needed to communicate via a second RAT, wherein the first RAT has a higher priority to a resource set than the second RAT; and means to allocate a first subset of the resource set to the first RAT based on the first resource requirement and a second subset of the resource set to the second RAT based on the second resource requirement, wherein the first subset and the second subset are aligned to minimize interruptions in communications of the second RAT due to the first RAT. The communication device of Example 104 may also include means to perform the subject matter of Examples 82-100.

In Example 104, a communication device configured to communicate via at least a first Radio Access Technology (RAT) and a second RAT, the communication device including: a minislot determiner configured to determine, for each slot of a plurality of slots in a wireless communication frame of the first RAT, a plurality of minislots, wherein the duration of each of the plurality of minislots is based on a duration of communicating via the second RAT based on at least one second RAT communication profile; and a scheduler configured to schedule communications for the first RAT using the plurality of slots or the plurality of minislots, wherein communications for the first RAT are prevented during slots or minislots associated with communications for the second RAT based on the at least one second RAT communication profile.

In Example 105, the subject matter of Example(s) 104 may include wherein the duration of each of the minislots is a multiple of the duration of communicating via the second RAT based on the second RAT communication profile, wherein the duration of communicating via the second RAT is a minimum duration according to the at least one second RAT communication profile.

In Example 106, the subject matter of Example(s) 104-105 may include wherein the second RAT is Bluetooth.

In Example 107, the subject matter of Example(s) 106 may include wherein the at least one second RAT communication profile is at least one of Hands-Free Profile (HFP), Advanced Audio Distribution Profile (A2DP) for streaming stereo music, Basic Printing Profile (BPP), Dial-Up Networking (DUN), Object Push Profile (OPP).

In Example 108, the subject matter of Example(s) 104-105 may include wherein the second RAT is Wifi or an 802.11 wireless technology.

In Example 109, the subject matter of Example(s) 104-108 may include wherein the scheduler is configured to schedule communications for the first RAT and the second RAT symmetrically so that there is a substantially equal number of the plurality of slots or the plurality of minislots during which communications for the first RAT are scheduled as there are for during which communication for the first RAT are prevented.

In Example 110, the subject matter of Example(s) 104-109 may include wherein the scheduler is configured to schedule communications for the first RAT and the second RAT asymmetrically so that there is a greater portion of the plurality of slots or the plurality of minislots during which communications for the first RAT are scheduled as there are for during which communications for the first RAT are prevented.

In Example 111, the subject matter of Example(s) 104-110 may include a sharer configured to share the schedule of the communications of the first RAT with a peer device.

In Example 112, the subject matter of Example(s) 111 may include the sharer further configured to receive a peer device schedule of communications of the first RAT from the peer device.

In Example 113, the subject matter of Example(s) 112 may include wherein the scheduler is configured to modify the schedule for communication of the first RAT based on the peer device schedule of communications.

In Example 114, a method for performing wireless communications, the method including: determining, for each slot of a plurality of slots in a wireless communication frame of the first RAT, a plurality of minislots, wherein the duration of each of the plurality of minislots is based on a duration of communicating via the second RAT based on at least one second RAT communication profile; and scheduling communications for the first RAT using the plurality of slots or the plurality of minislots, wherein communications for the first RAT are prevented during slots or minislots associated with communications for the second RAT based on the at least one second RAT communication profile.

In Example 115, the subject matter of Example(s) 114 may include wherein the duration of each of the minislots is a multiple of the duration of communicating via the second RAT based on the second RAT communication profile, wherein the duration of communicating via the second RAT is a minimum duration according to the at least one second RAT communication profile.

In Example 116, the subject matter of Example(s) 114-115 may include wherein the second RAT is Bluetooth.

In Example 117, the subject matter of Example(s) 116 may include wherein the at least one second RAT communication profile is at least one of Hands-Free Profile (HFP), Advanced Audio Distribution Profile (A2DP) for streaming stereo music, Basic Printing Profile (BPP), Dial-Up Networking (DUN), Object Push Profile (OPP).

In Example 118, the subject matter of Example(s) 114-115 may include wherein the second RAT is Wifi or an 802.11 wireless technology.

In Example 119, the subject matter of Example(s) 114-118 may include scheduling communications for the first RAT and the second RAT symmetrically so that there is a substantially equal number of the plurality of slots or the plurality of minislots during which communications for the first RAT are scheduled as there are for during which communication for the first RAT are prevented.

In Example 120, the subject matter of Example(s) 114-118 may include scheduling communications for the first RAT and the second RAT asymmetrically so that there is a greater portion of the plurality of slots or the plurality of minislots during which communications for the first RAT are scheduled as there are for during which communications for the first RAT are prevented.

In Example 121, the subject matter of Example(s) 114-120 may include sharing the schedule of the communications of the first RAT with a peer device.

In Example 122, the subject matter of Example(s) 121 may include receiving from a peer device schedule of communications of the first RAT.

In Example 123, the subject matter of Example(s) 122 may include modifying the schedule for communication of the first RAT based on the peer device schedule of communications.

In Example 124, one or more non-transitory computer-readable media storing instructions thereon that, when executed by at least one processor of a communication device, direct the communication device to perform the subject matter of any one of Examples 114-123.

In Example 125, a communication device with one or more processors configured to: determine, for each slot of a plurality of slots in a wireless communication frame of the first RAT, a plurality of minislots, wherein the duration of each of the plurality of minislots is based on a duration of communicating via the second RAT based on at least one second RAT communication profile; and schedule communications for the first RAT using the plurality of slots or the plurality of minislots, wherein communications for the first RAT are prevented during slots or minislots associated with communications for the second RAT based on the at least one second RAT communication profile. The one or more processors of the communication device of Example 125 may be further configured to perform the subject matter of Examples 115-123.

In Example 126, a communication device including means to determine, for each slot of a plurality of slots in a wireless communication frame of the first RAT, a plurality of minislots, wherein the duration of each of the plurality of minislots is based on a duration of communicating via the second RAT based on at least one second RAT communication profile; and means to schedule communications for the first RAT using the plurality of slots or the plurality of minislots, wherein communications for the first RAT are prevented during slots or minislots associated with communications for the second RAT based on the at least one second RAT communication profile. The communication device of Example 126 may include means to perform the subject matter of Examples 115-123.

In Example 127, a communication device including: an acquirer configured to acquire radio link measurement information for each of a plurality of frequency bands; a prioritizer configured to prioritize the plurality of frequency bands based on their respective radio link measurement information; a preferred band determiner configured to determine a preferred band from the plurality of frequency bands by determining a lowest priority frequency band from the prioritized plurality of frequency bands for fulfilling a minimum requirement for sending an intended transmission; and a distributor configured to distribute the intended transmission for communication based on the preferred band determiner's determination.

In Example 128, the subject matter of Example(s) 127 may include wherein the preferred band determiner is configured to determine whether the preferred band is available.

In Example 129, the subject matter of Example(s) 128 may include wherein when preferred band determiner determines that the preferred band is available, the distributor is configured to distribute the intended transmission for communication over the preferred band.

In Example 130, the subject matter of Example(s) 128-129 may include wherein when preferred band determiner determines that the preferred band is unavailable, the distributor is configured to distribute the intended transmission for communication over a frequency band with a next higher priority frequency band than the preferred frequency band from the prioritized plurality of frequency bands which is available.

In Example 131, the subject matter of Example(s) 130 may include wherein when preferred band determiner determines that the none of the next higher priority frequency bands are available, the distributor is configured to distribute the intended transmission for communication over a frequency band with a next lower priority frequency band than the preferred frequency band from the prioritized plurality of frequency bands which is available.

In Example 132, the subject matter of Example(s) 127-131 may include wherein the radio link measurement information includes at least one of an available frequency, a maximum radio frequency (RF) output power, a power budget, or bandwidth and/or band-specific power amplifier (PA) duty cycles.

In Example 133, the subject matter of Example(s) 127-132 may include wherein the radio link measurement information includes desired Quality of Service (QoS) information including at least one of data rate, latency, or jitter buffer.

In Example 134, the subject matter of Example(s) 127-133 may include wherein the radio link measurement information includes channel characteristics.

In Example 135, the subject matter of Example(s) 134 may include wherein the channel characteristics include one or more of channel fading, scattering, reflection, diffraction, Doppler Shift, or impulse response.

In Example 136, the subject matter of Example(s) 135 may include wherein the channel fading includes one or more of a large scale fading, a small scale fading, a flat fading, or a frequency selective fading.

In Example 137, the subject matter of Example(s) 127-136 may include wherein the radio link measurement information includes regulatory requirements.

In Example 138, the subject matter of Example(s) 127-137 may include wherein the radio link measurement information includes information about the reachability of one or more desired receivers.

In Example 139, the subject matter of Example(s) 127-138 may include wherein the preferred band determiner is configured to determine the minimum requirement for the intended transmission based on a type of operation to be sent via the intended transmission.

In Example 140, the subject matter of Example(s) 139 may include wherein the type of operation is one of a synchronization, discovery, or a data transmission.

In Example 141, the subject matter of Example(s) 140 may include wherein the data transmission includes an information to be sent including at least one of an emergency, voice, or data communication.

In Example 142, the subject matter of Example(s) 127-141 may include wherein the preferred band determiner is configured to determine the preferred band based on a maximum potential coverage of each of the plurality of frequency bands.

In Example 143, the subject matter of Example(s) 142 may include wherein the preferred band for the intended transmission including synchronization, discovery, or emergency communications is a 900 MHz frequency band.

In Example 144, the subject matter of Example(s) 142-143 may include wherein the preferred band for the intended transmission including data or voice communications is a 2.4 GHz frequency band.

In Example 145, the subject matter of Example(s) 127-144 may include a transceiver configured to receive radio link information for each of the plurality of frequency bands and transmitting the intended communication.

In Example 146, the subject matter of Example(s) 127-145 may include wherein the communication device is configured to share the radio link measurement information for each of the plurality of frequency bands with one or more peer devices.

In Example 147, a method for performing wireless communications, the method including: acquiring radio link measurement information for each of a plurality of frequency bands; prioritizing the plurality of frequency bands based on their respective radio link measurement information; determining a preferred band from the plurality of frequency bands by determining a lowest priority frequency band from the prioritized plurality of frequency bands for fulfilling a minimum requirement for sending an intended transmission; and distributing the intended transmission for communication based on the preferred band determiner's determination.

In Example 148, the subject matter of Example(s) 147 may include determining whether the preferred band is available.

In Example 149, the subject matter of Example(s) 148 may include wherein upon determining that the preferred band is available, further including distributing the intended transmission for communication over the preferred band.

In Example 150, the subject matter of Example(s) 148-149 may include wherein upon determining that the preferred band is unavailable, further including distributing the intended transmission for communication over a frequency band with a next higher priority frequency band than the preferred frequency band from the prioritized plurality of frequency bands which is available.

In Example 151, the subject matter of Example(s) 150 may include wherein upon determining that none of the next higher priority frequency bands are available, further including distributing the intended transmission for communication over a frequency band with a next lower priority frequency band than the preferred frequency band from the prioritized plurality of frequency bands which is available.

In Example 152, the subject matter of Example(s) 147-151 may include wherein the radio link measurement information includes at least one of an available frequency, a maximum radio frequency (RF) output power, a power budget, or bandwidth and/or band-specific power amplifier (PA) duty cycles.

In Example 153, the subject matter of Example(s) 147-152 may include wherein the radio link measurement information includes desired Quality of Service (QoS) information including at least one of data rate, latency, or jitter buffer.

In Example 154, the subject matter of Example(s) 147-153 may include wherein the radio link measurement information includes channel characteristics.

In Example 155, the subject matter of Example(s) 154 may include wherein the channel characteristics include one or more of channel fading, scattering, reflection, diffraction, Doppler Shift, or impulse response.

In Example 156, the subject matter of Example(s) 155 may include wherein the channel fading includes one or more of a large scale fading, a small scale fading, a flat fading, or a frequency selective fading.

In Example 157, the subject matter of Example(s) 147-156 may include wherein the radio link measurement information includes regulatory requirements.

In Example 158, the subject matter of Example(s) 147-157 may include wherein the radio link measurement information includes information about the reachability of one or more desired receivers.

In Example 159, the subject matter of Example(s) 147-158 may include determining the minimum requirement for the intended transmission based on a type of operation to be sent via the intended transmission.

In Example 160, the subject matter of Example(s) 159 may include wherein the type of operation is one of a synchronization, discovery, or a data transmission.

In Example 161, the subject matter of Example(s) 160 may include wherein the data transmission includes an information to be sent including at least one of an emergency, voice, or data communication.

In Example 162, the subject matter of Example(s) 147-161 may include determining the preferred band based on a maximum potential coverage of each of the plurality of frequency bands.

In Example 163, the subject matter of Example(s) 162 may include wherein the preferred band for the intended transmission including synchronization, discovery, or emergency communications is a 900 MHz frequency band.

In Example 164, the subject matter of Example(s) 162-163 may include wherein the preferred band for the intended transmission including data or voice communications is a 2.4 GHz frequency band.

In Example 165, the subject matter of Example(s) 147-164 may include sharing the radio link measurement information for each of the plurality of frequency bands with one or more peer devices.

In Example 166, one or more non-transitory computer-readable media storing instructions thereon that, when executed by at least one processor of a communication device, direct the communication device to perform the subject matter of any one of Examples 147-165.

In Example 167, a communication device with one or more processors configured to: acquire radio link measurement information for each of a plurality of frequency bands; prioritize the plurality of frequency bands based on their respective radio link measurement information; determine a preferred band from the plurality of frequency bands by determining a lowest priority frequency band from the prioritized plurality of frequency bands for fulfilling a minimum requirement for sending an intended transmission; and distribute the intended transmission for communication based on the preferred band determiner's determination. The one or more processors of the communication device of Example may further be configured to perform the subject matter of Examples 148-165.

In Example 168, a communication device including means to acquire radio link measurement information for each of a plurality of frequency bands; means to prioritize the plurality of frequency bands based on their respective radio link measurement information; means to determine a preferred band from the plurality of frequency bands by determining a lowest priority frequency band from the prioritized plurality of frequency bands for fulfilling a minimum requirement for sending an intended transmission; and means to distribute the intended transmission for communication based on the preferred band determiner's determination. The communication device of Example 168 may include means to perform the subject matter of Examples 148-165.

In Example 169, a communication device including: a mesh information receiver configured to receive a connectivity payload information from each of one or more peer devices upon the communication device connecting to a mesh network including the one or more peer devices; a mesh network map builder configured to create a mesh network map including the one or more peer devices based on the connectivity payload information of each of the one or more peer devices; and a mesh communication establisher configured to establish a communication route for sending a transmission to at least a first peer device of the one or more peer devices based on the mesh network map.

In Example 170, the subject matter of Example(s) 169 may include wherein the mesh information receiver is configured to synchronize in time, phase, and one or more frequencies with each of the one or more peer devices.

In Example 171, the subject matter of Example(s) 169-170 may include wherein the mesh information receiver is configured to discover the one or more peer devices through a Device-to-Device (D2D) discovery procedure.

In Example 172, the subject matter of Example(s) 169-171 may include wherein the mesh information receiver is configured to request to receive the connectivity payload information in a response from each of the one or more peer devices in a unicast manner.

In Example 173, the subject matter of Example(s) 169-172 may include wherein the mesh information receiver is configured to request to receive the connectivity payload information from multiple peer devices of the one or more peer devices in a multicast manner.

In Example 174, the subject matter of Example(s) 173 may include wherein the mesh information receiver is configured to, in the request, instruct the multiple peer devices to stagger a timing of their respective responses.

In Example 175, the subject matter of Example(s) 169-174 may include wherein the mesh information receiver is configured to request one or more updates of the connectivity payload information from each of the one or more peer devices after a pre-determined duration from receiving the connectivity payload information from each of the one or more peer devices.

In Example 176, the subject matter of Example(s) 175 may include wherein the predetermined duration is based on a detected change in the mesh network.

In Example 177, the subject matter of Example(s) 176 may include wherein the detected change is at least one of a change in interference conditions at one or more devices in the mesh network, a change in mobility of one or more devices in the mesh network, or a change in wireless link conditions at one or more devices in the mesh network.

In Example 178, the subject matter of Example(s) 175-177 may include wherein pre-determined duration may be increased or decreased based on a rate of change of connectivity between at least two devices in the mesh network.

In Example 179, the subject matter of Example(s) 169-178 may include wherein the mesh network map builder is configured to maintain a record of direct links with each of the one or more peer devices.

In Example 180, the subject matter of Example(s) 179 may include wherein the record of direct links for each respective peer device of the one or more peer devices includes a wireless device ID of the peer device and one or more band qualities for each of a respective frequency band between the communication device and the respective peer device.

In Example 181, the subject matter of Example(s) 180 may include wherein each of the one or more band qualities includes link quality values in both directions for a respective frequency band between the communication device and the respective peer device.

In Example 182, the subject matter of Example(s) 180-181 may include wherein the one or more band qualities includes one or more of a Signal to Noise Interference Ratio (SINR) value, a value for battery available at the respective peer device, an ongoing transmission between the peer device and a destination of an intended communication from communication device, or a status of the respective peer device buffers.

In Example 183, the subject matter of Example(s) 180-182 may include wherein the one or more band qualities includes a direct link cost between the communication device and the respective peer device.

In Example 184, the subject matter of Example(s) 169-183 may include wherein the mesh network map builder is configured to maintain a record of route links including a relayed connectivity information which tracks one or more potential routes to other devices in the mesh network, wherein the other devices are not included in the one or more peer devices.

In Example 185, the subject matter of Example(s) 184 may include wherein each of the one or more potential routes includes a respective other device identification and one or more of a frequency band route, multi-band next hop, or a multi-band route cost.

In Example 186, the subject matter of Example(s) 185 may include wherein the frequency band route includes one or more of an identifier of the respective frequency band for which the potential route belongs to, an identification of a next wireless device in the respective potential route, or a route cost of the respective potential route.

In Example 187, the subject matter of Example(s) 185-186 may include wherein the multi-band next hop includes at least one of an identifier of a frequency band to be used in a next hop in the mesh network or an identification of device for the next hop of the potential route.

In Example 188, the subject matter of Example(s) 169-187 may include wherein the communication route is a shortest path to a destination device with the mesh network for receiving the transmission.

In Example 189, the subject matter of Example(s) 169-187 may include wherein the communication route is a highest quality path to a destination device with the mesh network for receiving the transmission, wherein the highest quality path is determined based on link qualities of each of the respective hops of the potential route.

In Example 190, the subject matter of Example(s) 169-189 may include wherein the mesh network map includes a plurality of frequency bands supported by at least one device of the mesh network.

In Example 191, the subject matter of Example(s) 169-190 may include the mesh information receiver configured to receive a peer transmission from one of the one or more peer devices for forwarding of the peer transmission to another peer device of the one or more peer devices.

In Example 192, the subject matter of Example(s) 191 may include wherein a determination of the forwarding to another peer device is made based on the mesh network map.

In Example 193, the subject matter of Example(s) 191-192 may include wherein the receiving of the peer transmission and the forwarding of the peer transmission to another peer device are done on different frequency bands.

In Example 194, the subject matter of Example(s) 193 may include wherein a frequency band for forwarding of the peer transmission is determined based on a link quality between the communication device and the another peer device.

In Example 195, the subject matter of Example(s) 169-194 may include a transceiver operatively coupled to the mesh information receiver and configured to communicate with the mesh network.

In Example 196, the subject matter of Example(s) 169-195 may include wherein the mesh network is a decentralized network.

In Example 197, the subject matter of Example(s) 196 may include wherein the decentralized network may effectively operate without control signaling from a base station or other wireless communications access point.

In Example 198, the subject matter of Example(s) 169-187 may include a memory operatively coupled to the mesh network map builder and configured to store the mesh network map.

In Example 199, a method for a communication device to perform wireless communications, the method including: receiving a connectivity payload information from each of one or more peer devices upon the communication device connecting to a mesh network including the one or more peer devices; creating a mesh network map including the one or more peer devices based on the connectivity payload information of each of the one or more peer devices; and establishing a communication route for sending a transmission to at least a first peer device of the one or more peer devices based on the mesh network map.

In Example 200, the subject matter of Example(s) 199 may include synchronizing in time, phase, and one or more frequencies with each of the one or more peer devices.

In Example 201, the subject matter of Example(s) 199-200 may include discovering the one or more peer devices through a Device-to-Device (D2D) discovery procedure.

In Example 202, the subject matter of Example(s) 199-201 may include requesting to receive the connectivity payload information in a response from each of the one or more peer devices in a unicast manner.

In Example 203, the subject matter of Example(s) 199-202 may include requesting to receive the connectivity payload information from multiple peer devices of the one or more peer devices in a multicast manner.

In Example 204, the subject matter of Example(s) 203 may include, in the request, instructing the multiple peer devices to stagger a timing of their respective responses.

In Example 205, the subject matter of Example(s) 199-204 may include requesting one or more updates of the connectivity payload information from each of the one or more peer devices after a pre-determined duration from receiving the connectivity payload information from each of the one or more peer devices.

In Example 206, the subject matter of Example(s) 205 may include wherein the predetermined duration is based on a detected change in the mesh network.

In Example 207, the subject matter of Example(s) 206 may include wherein the detected change is at least one of a change in interference conditions at one or more devices in the mesh network, a change in mobility of one or more devices in the mesh network, or a change in wireless link conditions at one or more devices in the mesh network.

In Example 208, the subject matter of Example(s) 205-207 may include wherein pre-determined duration may be increased or decreased based on a rate of change of connectivity between at least two devices in the mesh network.

In Example 209, the subject matter of Example(s) 199-208 may include maintaining a record of direct links with each of the one or more peer devices.

In Example 210, the subject matter of Example(s) 209 may include wherein the record of direct links for each respective peer device of the one or more peer devices includes a wireless device ID of the peer device and one or more band qualities for each of a respective frequency band between the communication device and the respective peer device.

In Example 211, the subject matter of Example(s) 210 may include wherein each of the one or more band qualities includes link quality values in both directions for a respective frequency band between the communication device and the respective peer device.

In Example 212, the subject matter of Example(s) 210-211 may include wherein the one or more band qualities includes one or more of a Signal to Noise Interference Ratio (SINR) value, a value for battery available at the respective peer device, an ongoing transmission between the peer device and a destination of an intended communication from communication device, or a status of the respective peer device buffers.

In Example 213, the subject matter of Example(s) 210-212 may include wherein the one or more band qualities includes a direct link cost between the communication device and the respective peer device.

In Example 214, the subject matter of Example(s) 199-213 may include maintaining a record of route links including a relayed connectivity information which tracks one or more potential routes to other devices in the mesh network, wherein the other devices are not included in the one or more peer devices.

In Example 215, the subject matter of Example(s) 214 may include wherein each of the one or more potential routes includes a respective other device identification and one or more of a frequency band route, multi-band next hop, or a multi-band route cost.

In Example 216, the subject matter of Example(s) 215 may include wherein the frequency band route includes one or more of an identifier of the respective frequency band for which the potential route belongs to, an identification of a next wireless device in the respective potential route, or a route cost of the respective potential route.

In Example 217, the subject matter of Example(s) 215-216 may include wherein the multi-band next hop includes at least one of an identifier of a frequency band to be used in a next hop in the mesh network or an identification of device for the next hop of the potential route.

In Example 218, the subject matter of Example(s) 199-217 may include wherein the communication route is a shortest path to a destination device with the mesh network for receiving the transmission.

In Example 219, the subject matter of Example(s) 199-218 may include wherein the communication route is a highest quality path to a destination device with the mesh network for receiving the transmission, wherein the highest quality path is determined based on link qualities of each of the respective hops of the potential route.

In Example 220, the subject matter of Example(s) 199-219 may include wherein the mesh network map includes a plurality of frequency bands supported by at least one device of the mesh network.

In Example 221, the subject matter of Example(s) 199-220 may include receiving a peer transmission from one of the one or more peer devices for forwarding of the peer transmission to another peer device of the one or more peer devices.

In Example 222, the subject matter of Example(s) 221 may include, wherein a determination of the forwarding to another peer device is made based on the mesh network map.

In Example 223, the subject matter of Example(s) 221-222 may include wherein the receiving of the peer transmission and the forwarding of the peer transmission to another peer device are done on different frequency bands.

In Example 224, the subject matter of Example(s) 223 may include wherein a frequency band for forwarding of the peer transmission is determined based on a link quality between the communication device and the another peer device.

In Example 225, the subject matter of Example(s) 199-224 may include wherein the mesh network is a decentralized network.

In Example 226, the subject matter of Example(s) 225 may include, wherein the decentralized network may effectively operate without control signaling from a base station or other wireless communications access point.

In Example 227, the subject matter of Example(s) 199-226 may include storing the mesh network map in a memory of the communication device.

In Example 228, one or more non-transitory computer-readable media storing instructions thereon that, when executed by at least one processor of a communication device, direct the communication device to perform the method of any one of Examples 199-227.

In Example 229, a communication device with one or more processors configured to: receive a connectivity payload information from each of one or more peer devices upon the communication device connecting to a mesh network including the one or more peer devices; create a mesh network map including the one or more peer devices based on the connectivity payload information of each of the one or more peer devices; and establish a communication route for sending a transmission to at least a first peer device of the one or more peer devices based on the mesh network map. The one or more processors of the communication device of Example 229 may be further configured to perform the subject matter of Examples 200-227.

In Example 230, a communication device including: means to receive a connectivity payload information from each of one or more peer devices upon the communication device connecting to a mesh network including the one or more peer devices; means to create a mesh network map including the one or more peer devices based on the connectivity payload information of each of the one or more peer devices; and means to establish a communication route for sending a transmission to at least a first peer device of the one or more peer devices based on the mesh network map. The communication device of Example 230 may further include means to perform the subject matter of Examples 200-227.

In Example 231, a method for a communication device to display a plurality of nodes in a device-to-device network, the method including displaying a discovery/mesh area of a graphical user interface, the discovery/mesh area including the plurality of nodes, wherein a first node of the plurality of nodes represents the communication device; displaying zero or more node connectors; and generating one or more node connectors between the first node and one or more peer nodes from the plurality of nodes.

In Example 232, the subject matter of Example(s) 231 may include wherein each of the one or more peer nodes represents a respective peer device, wherein each of the one or more primary node connectors is a line representing a wireless link between the communication device and the respective peer device.

In Example 233, the subject matter of Example(s) 231-232 may include generating one or more secondary node connectors between at least one of the one or more peer nodes and one or more further nodes of the plurality of nodes, wherein each of the one or more further nodes represents a respective further device, wherein each of the secondary node connectors is a line representing a wireless link between the peer device and the respective further device.

In Example 234, the subject matter of Example(s) 231-233 may include generating one or more further node connectors between at least two further nodes, wherein each further node connector of the one or more further node connectors is a line representing a wireless link between the at least two further nodes.

In Example 235, the subject matter of Example(s) 231-234 may include wherein at least one of the plurality of nodes represents an available for discovery but not available for mesh node.

In Example 236, the subject matter of Example(s) 231-235 may include wherein at least one of the plurality of nodes represents an available for discovery available and available for mesh node.

In Example 237, the subject matter of Example(s) 231-236 may include wherein at least one of the plurality of nodes represents a not available for discovery and not available for mesh node.

In Example 238, the subject matter of Example(s) 231-237 may include displaying a mesh toggle wherein the discovery/mesh area of the graphical user interface includes the mesh toggle.

In Example 239, the subject matter of Example(s) 238 may include deactivating the mesh toggle; removing the one or more secondary node connectors; removing the one or more further node connectors; and disabling the ability to generate secondary node connectors or further node connectors.

In Example 240, the subject matter of Example(s) 231-239 may include displaying a discovery toggle wherein the discovery/mesh area of the graphical user interface includes the discovery toggle.

In Example 241, the subject matter of Example(s) 240 may include deactivating the discovery toggle; removing the one or more primary node connectors; disabling the mesh toggle; and disabling the ability to generate primary node connectors.

In Example 242, the subject matter of Example(s) 231-241 may include selecting at least one of the plurality of nodes; and displaying a node information display area associated with the selected node.

In Example 243, the subject matter of Example(s) 231-242 may include displaying an exclude node option wherein the discovery/mesh area of the graphical user interface includes the exclude node option.

In Example 244, the subject matter of Example(s) 243 may include selecting at least one of the plurality of nodes wherein the at least one of a selected node does not represent the communication device; selecting the exclude node option; removing all node connectors connected to the at least one of a selected node; and disabling the ability to create node connectors connected to the at least one of a selected node.

In Example 245, the subject matter of Example(s) 231-244 may include displaying an exclusion list wherein the discovery/mesh area of the graphical user interface includes the exclusion list.

In Example 246, the subject matter of Example(s) 231-245 may include selecting at least one of the plurality of nodes wherein the at least one of a selected node does not represent the communication device; selecting the exclusion list node option; adding the at least one of a selected node to an exclusion list; removing all node connectors connected to the at least one of a selected node; and disabling the ability to create node connectors connected to the selected node.

In Example 247, the subject matter of Example(s) 231-246 may include generating the one or more node connectors in response to a connect command.

In Example 248, the subject matter of Example(s) 231-237 may include displaying a context data area wherein the graphical user interface includes the context area.

In Example 249, the subject matter of Example(s) 231-248 may include displaying a quality of service area wherein the graphical user interface includes the quality of service area.

In Example 250, the subject matter of Example(s) 231-249 may include displaying an emergency option wherein the graphical user interface includes the emergency option.

In Example 251, the subject matter of Example(s) 250 may include selecting the emergency option; and displaying an emergency cause area wherein the emergency cause area includes: a plurality of emergency causes; and a start broadcast option.

In Example 252, the subject matter of Example(s) 251 may include selecting zero or more of the plurality of emergency causes; and selecting the start broadcast option.

In Example 253, one or more non-transitory computer-readable media storing instructions thereon that, when executed by at least one processor of a communication device, direct the communication device to perform the method of any one of Examples 231-252.

In Example 254, a communication device including: a physical display configured to provide a discovery/mesh area of a graphical user interface; one or more processors configured to, providing for display via the physical display the discovery/mesh area of the graphical user interface, the discovery/mesh area including the plurality of nodes, wherein a first node of the plurality of nodes represents the communication device; providing for display via the physical display zero or more node connectors; and generating one or more node connectors between the first node and one or more peer nodes from the plurality of nodes.

In Example 255, the subject matter of Example(s) 254 may include wherein each of the one or more peer nodes represents a respective peer device, wherein each of the one or more primary node connectors is a line representing a wireless link between the communication device and the respective peer device.

In Example 256, the subject matter of Example(s) 254-255 may include the one or more processors configured to generate one or more secondary node connectors between at least one of the one or more peer nodes and one or more further nodes of the plurality of nodes, wherein each of the one or more further nodes represents a respective further device, wherein each of the secondary node connectors is a line representing a wireless link between the peer device and the respective further device.

In Example 257, the subject matter of Example(s) 254-256 may include the one or more processors configured to generate one or more further node connectors between at least two further nodes, wherein each further node connector of the one or more further node connectors is a line representing a wireless link between the at least two further nodes.

In Example 258, the subject matter of Example(s) 254-257 may include wherein at least one of the plurality of nodes represents an available for discovery but not available for mesh node.

In Example 259, the subject matter of Example(s) 254-258 may include wherein at least one of the plurality of nodes represents an available for discovery available and available for mesh node.

In Example 260, the subject matter of Example(s) 254-259 may include wherein at least one of the plurality of nodes represents a not available for discovery and not available for mesh node.

In Example 261, the subject matter of Example(s) 254-260 may include the one or more processors configured to provide for display via the physical display a mesh toggle wherein the discovery/mesh area of the graphical user interface includes the mesh toggle.

In Example 262, the subject matter of Example(s) 261 may include the one or more processors configured to: deactivate the mesh toggle; remove the one or more secondary node connectors; remove the one or more further node connectors; and disable the ability to generate secondary node connectors or further node connectors.

In Example 263, the subject matter of Example(s) 261-262 may include the one or more processors configured to provide for display via the physical display a discovery toggle wherein the discovery/mesh area of the graphical user interface includes the discovery toggle.

In Example 264, the subject matter of Example(s) 263 may include the one or more processors configured to: deactivate the discovery toggle; remove the one or more primary node connectors; disable the mesh toggle; and disable the ability to generate primary node connectors.

In Example 265, the subject matter of Example(s) 254-264 may include the one or more processors configured to select at least one of the plurality of nodes; and provide for display via the physical display a node information display area associated with the selected node.

In Example 266, the subject matter of Example(s) 254-265 may include the one or more processors configured to provide for display via the physical display an exclude node option wherein the discovery/mesh area of the graphical user interface includes the exclude node option.

In Example 267, the subject matter of Example(s) 266 may include the one or more processors configured to: select at least one of the plurality of nodes wherein the at least one of a selected node does not represent the communication device; select the exclude node option; remove all node connectors connected to the at least one of a selected node; and disable the ability to create node connectors connected to the at least one of a selected node.

In Example 268, the subject matter of Example(s) 254-267 may include the one or more processors configured to provide for display via the physical display an exclusion list wherein the discovery/mesh area of the graphical user interface includes the exclusion list.

In Example 269, the subject matter of Example(s) 268 may include the one or more processors configured to: select at least one of the plurality of nodes wherein the at least one of a selected node does not represent the communication device; select the exclusion list node option; add the at least one of a selected node to an exclusion list; remove all node connectors connected to the at least one of a selected node; and disable the ability to create node connectors connected to the selected node.

In Example 270, the subject matter of Example(s) 254-269 may include the one or more processors configured to generate the one or more node connectors in response to a connect command.

In Example 271, the subject matter of Example(s) 254-270 may include the one or more processors configured to provide for display via the physical display a context data area, wherein the graphical user interface includes the context area.

In Example 272, the subject matter of Example(s) 254-271 may include the one or more processors configured to provide for display via the physical display a quality of service area, wherein the graphical user interface includes the quality of service area.

In Example 273, the subject matter of Example(s) 254-272 may include the one or more processors configured to provide for display via the physical display an emergency option, wherein the graphical user interface includes the emergency option.

In Example 274, the subject matter of Example(s) 273 may include the one or more processors configured to: select the emergency option; and provide for display via the physical display an emergency cause area wherein the emergency cause area includes: a plurality of emergency causes; and a start broadcast option.

In Example 275, the subject matter of Example(s) 274 may include the one or more processors configured to: select zero or more of the plurality of emergency causes; and select the start broadcast option.

In Example 276, a communication device including means to display a discovery/mesh area of a graphical user interface, the discovery/mesh area including the plurality of nodes, wherein a first node of the plurality of nodes represents the communication device; means to display zero or more node connectors; and means to generate one or more node connectors between the first node and one or more peer nodes from the plurality of nodes. The communication device of Example 276 may also include means to perform the subject matter of Example(s) 231-252.

In Example 277, a method for a communication device to display device-to-device network information, the method including: displaying an available policies area of a graphical user interface; displaying a current region; and in response to a command, displaying one or more policies associated with the current region.

In Example 278, the subject matter of Example(s) 277 may include dynamically displaying an operating band.

In Example 279, the subject matter of Example(s) 277-278 may include dynamically displaying a network load status.

In Example 280, the subject matter of Example(s) 277-279 may include dynamically displaying a 3GPP network coverage status.

In Example 281, the subject matter of Example(s) 277-280 may include receiving a configuration command directed to a selected policy; and in response to the configuration command, displaying one or more configurable parameters associated with the selected policy.

In Example 282, the subject matter of Example(s) 281 may include receiving an update command directed to a selected configurable parameter; and updating the selected configurable parameter based on the update command.

In Example 283, the subject matter of Example(s) 282 may include wherein at least one of the configurable parameters is a preferred Radio Access Technology.

In Example 284, the subject matter of Example(s) 282-283 may include wherein at least one of the configurable parameters is a user context.

In Example 285, the subject matter of Example(s) 282-284 may include wherein at least one of the configurable parameters is a start time frame.

In Example 286, the subject matter of Example(s) 282-285 may include wherein at least one of the configurable parameters is an end time frame.

In Example 287, one or more non-transitory computer-readable media storing instructions thereon that, when executed by at least one processor of a communication device, direct the communication device to perform the method of any one of Examples 277-286.

In Example 288, machine-readable storage including machine-readable instructions, when executed, to implement a method or realize an apparatus as described in any preceding Example.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A communication device configured to perform wireless communications, comprising:
    a detector configured to monitor a frequency band for one or more other Radio Access Technologies (RATs);
    a determiner configured to determine one or more periods of reduced interference with the one or more other RATs in one or more frequencies of the monitored frequency band; and
    a communicator configured to communicate a first signal during the one or more periods of reduced interference in the one or more frequencies of the monitored frequency band, and communicate a second signal in the monitored frequency band based on the communication of the first signal, wherein the first signal is a control signal and the second signal is a data signal.

2. The communication device of claim 1, wherein the communicator is configured to communicate the first signal and the second signal on different frequencies of the frequency band; and wherein the second signal is communicated during the one or more periods of reduced interference.

3. The communication device of claim 1, wherein the first signal is an acknowledgment (ACK) signal.

4. The communication device of claim 1, wherein the first signal is a negative acknowledgement (NACK) signal.

5. The communication device of claim 1, wherein the determiner is configured to determine an energy for each of the one or more frequencies of the frequency band.

6. The communication device of claim 5, wherein the determiner is configured to determine the one or more periods of reduced interference by comparing the energy of each of the respective frequencies of the one or more frequencies to a power threshold.

7. The communication device of claim 6, wherein the determiner is configured to initiate a back off period on the respective frequency when the respective energy is greater than the power threshold.

8. The communication device of claim 7, wherein the back off period is determined based on a frame length for the RAT corresponding to the first signal and the second signal.

9. A communication device configured to communicate via at least a first Radio Access Technology (RAT) and a second RAT, the communication device comprising:
    a minislot determiner configured to determine a plurality of minislots for each slot of a plurality of slots in a wireless communication frame of the first RAT, wherein the duration of each of the plurality of minislots is based on a duration of communicating via the second RAT based on at least one second RAT communication protocol; and
    a scheduler configured to schedule communications for the first RAT using the plurality of slots or the plurality of minislots, wherein communications for the first RAT are prevented during slots or minislots associated with communications for the second RAT based on the at least one second RAT communication protocol.

10. The communication device of claim 9, wherein the duration of each of the minislots is a multiple of the duration of communicating via the second RAT based on the second RAT communication protocol, wherein the duration of communicating via the second RAT is a minimum duration according to the at least one second RAT communication protocol.

11. The communication device of claim 9, wherein the scheduler is configured to schedule a substantially equal number of the plurality of slots or the plurality of minislots for communications of the first RAT and for communications of the second RAT.

12. The communication device of claim 9, further comprising:
a sharer configured to share the schedule of the communications of the first RAT with a peer device.

13. A communication device comprising:
an acquirer configured to acquire radio link measurement information for each of a plurality of frequency bands;
a prioritizer configured to prioritize the plurality of frequency bands based on their respective radio link measurement information;
a preferred band determiner configured to determine a preferred band from the plurality of frequency bands by determining that at least one of the plurality of frequency bands fulfills a minimum requirement for sending an intended transmission; and
a distributor configured to distribute the intended transmission for communication based to the preferred band on the preferred band determiner's determination.

14. The communication device of claim 13, wherein the radio link measurement information includes at least one of an available frequency; a maximum radio frequency (RF) output power; a power budget; bandwidth; band-specific power amplifier (PA) duty cycles; desired Quality of Service (QoS) information including at least one of data rate, latency, or jitter buffer; channel characteristics; regulatory requirements; or information about the reachability of one or more desired receivers.

15. The communication device of claim 13, wherein the preferred band determiner is configured to determine the minimum requirement for the intended transmission based on a type of operation to be sent via the intended transmission or based on a maximum potential coverage of each of the plurality of frequency bands.

16. The communication device of claim 13, further comprising:
a transceiver configured to receive radio link information for each of the plurality of frequency bands and transmitting the intended communication.

17. A communication device comprising:
a physical display configured to provide a discovery/mesh area of a graphical user interface; and
one or more processors configured to:
display via the discovery/mesh area of the graphical user interface, a plurality of nodes, wherein a first node of the plurality of nodes represents the communication device; and
display via the discovery/mesh area of the graphical user interface one or more node connectors, wherein the one or more node connectors are configured between the first node and one or more peer nodes from the plurality of nodes.

18. The communication device of claim 17, wherein the one or more processors are configured to display one or more secondary node connectors between at least one of the one or more peer nodes and one or more further nodes of the plurality of nodes, wherein each of the one or more further nodes represents a respective further device, wherein each of the secondary node connectors is a line representing a wireless link between the peer device and the respective further device.

19. The communication device of 17, wherein the one or more processors are configured to display via the physical display a mesh toggle wherein the discovery/mesh area of the graphical user interface includes the mesh toggle.

20. The communication device of 17, wherein the one or more processors are configured to select at least one of the plurality of nodes; and provide via the physical display a node information display area associated with the selected node.

* * * * *